United States Patent
Rosenberg

[19]

[11] Patent Number: 6,061,004
[45] Date of Patent: May 9, 2000

[54] PROVIDING FORCE FEEDBACK USING AN INTERFACE DEVICE INCLUDING AN INDEXING FUNCTION

[75] Inventor: Louis B. Rosenberg, Pleasanton, Calif.

[73] Assignee: Immersion Corporation, San Jose, Calif.

[21] Appl. No.: 09/087,022

[22] Filed: May 29, 1998

Related U.S. Application Data

[62] Division of application No. 08/756,745, Nov. 26, 1995, Pat. No. 5,825,308.

[51] Int. Cl.$^7$ ...................................................... G09G 3/02
[52] U.S. Cl. ........................... 341/20; 345/163; 345/167; 345/145; 341/27; 364/709.1
[58] Field of Search ................................... 341/20, 34, 35, 341/27; 345/179, 161, 156, 157, 158, 163, 164, 165, 166, 184, 168; 74/471 XY; 364/709.01

[56] References Cited

U.S. PATENT DOCUMENTS

| | | | |
|---|---|---|---|
| 3,919,691 | 11/1975 | Noll | 340/172.5 |
| 4,654,648 | 3/1987 | Herrington et al. | 340/710 |
| 4,712,101 | 12/1987 | Culver | 340/710 |
| 4,724,715 | 2/1988 | Culver | 74/471 |
| 4,734,685 | 3/1988 | Watanabe | 340/710 |
| 4,782,327 | 11/1988 | Kley et al. | 340/365 |
| 4,787,051 | 11/1988 | Olson | 364/518 |
| 4,800,721 | 1/1989 | Cemenska et al. | 60/393 |
| 4,811,608 | 3/1989 | Hilton | 73/862.04 |
| 4,839,838 | 6/1989 | LaBiche et al. | 364/709.11 |

(List continued on next page.)

FOREIGN PATENT DOCUMENTS

| | | |
|---|---|---|
| 626634A2 | 11/1994 | European Pat. Off. . |
| WO95/20787 | 8/1995 | WIPO . |
| WO95/20788 | 8/1995 | WIPO . |
| WO95/32459 | 11/1995 | WIPO . |

OTHER PUBLICATIONS

Kelley, A.J. et al., "MagicMouse: Tactile and Kinesthetic Feedback in the Human–Computer Interface using an Electromagnetically Actuated Input/Output Device," Dept. of Elec. Engineering, Univ. of British Columbia, 1993.

Hannaford, B. et al., "Force Feedback Cursor Control," NASA Tech Brief, vol. 13, No. 11, Item #21, 1989, pp. 1–4.

Minsky, Margaret et al., "Feeling and Seeing: Issues in Force Display,"ACM 1990, pp. 235–242.

Rosenberg, Louis B., "Virtual haptic overlays enhance performance in telepresence tasks", Stanford University, Center for Mechanical Engineering, Stanford, CA 94305.

Colgate, J. Edward et al., "Implementation of Stiff Virtual Walls in Force–Reflecting Interfaces," 1993, pp. 1–9.

Adlestein, Bernard D. et al., "Design and Implementation of a Force Reflecting Manipulandum for Manual Control Research," 1992, pp. 1–24.

Atkinston, William D. et al, "Computing with Feeling," Comput. & Graphics, vol. 2, No. 2–E, pp. 97–103.

(List continued on next page.)

*Primary Examiner*—Michael Horabik
*Assistant Examiner*—Albert K. Wong
*Attorney, Agent, or Firm*—James R. Riegel

[57] ABSTRACT

A method and apparatus for providing force feedback including an indexing function. A force feedback interface device is coupled to a host computer system displaying a graphical environment. A position of a user-manipulated physical object in a degree of freedom, such as a planar workspace, is sensed by the device, and a user-controlled graphical object is dislplayed on a display screen at a position corresponding to the physical object position. An indexing indication is provided by the user to activate an indexing mode, during which the user-controlled graphical object is displayed at a fixed position on said display screen, regardless of the position of the physical object. The user is able to redefine an offset between the position of the physical object and the position of tile user-controlled graphical object during the indexing mode. A safety switch can be used to activate the indexing mode.

28 Claims, 16 Drawing Sheets

U.S. PATENT DOCUMENTS

| | | | |
|---|---|---|---|
| 4,868,549 | 9/1989 | Affinito et al. | 340/710 |
| 4,896,554 | 1/1990 | Culver | 74/471 |
| 4,935,728 | 6/1990 | Kley | 340/709 |
| 4,961,138 | 10/1990 | Gorniak | 364/200 |
| 4,983,786 | 1/1991 | David et al. | 178/18 |
| 5,044,956 | 9/1991 | Behensky et al. | 434/45 |
| 5,065,145 | 11/1991 | Purcell | 340/706 |
| 5,095,303 | 3/1992 | Clark et al. | 340/710 |
| 5,103,404 | 4/1992 | McIntosh | 318/568.22 |
| 5,107,080 | 4/1992 | Rosen | 200/6 A |
| 5,107,262 | 4/1992 | Cadoz et al. | 341/22 |
| 5,139,261 | 8/1992 | Openiano | 273/148 B |
| 5,143,505 | 9/1992 | Burdea et al. | 414/5 |
| 5,146,566 | 9/1992 | Hollis, Jr. | 395/275 |
| 5,181,181 | 1/1993 | Glynn | 364/566 |
| 5,185,561 | 2/1993 | Good et al. | 318/432 |
| 5,186,629 | 2/1993 | Rohen | 434/114 |
| 5,193,963 | 3/1993 | McAffee et al. | 414/5 |
| 5,195,179 | 3/1993 | Tokunaga | 395/161 |
| 5,223,776 | 6/1993 | Radke et al. | 318/568.1 |
| 5,230,623 | 7/1993 | Guthrie et al. | 433/72 |
| 5,280,276 | 1/1994 | Kwok | 345/167 |
| 5,296,846 | 3/1994 | Ledley | 345/161 |
| 5,296,871 | 3/1994 | Paley | 345/163 |
| 5,298,890 | 3/1994 | Kanamaru et al. | 345/157 |
| 5,355,148 | 10/1994 | Anderson | 345/166 |
| 5,374,942 | 12/1994 | Gilligan et al. | 345/157 |
| 5,389,865 | 2/1995 | Jacobus et al. | 318/568.11 |
| 5,396,266 | 3/1995 | Brimhall | 345/161 |
| 5,398,044 | 3/1995 | Hill | 345/145 |
| 5,405,152 | 4/1995 | Katanics et al. | 273/438 |
| 5,414,337 | 5/1995 | Schuler | 318/561 |
| 5,457,479 | 10/1995 | Cheng | 345/163 |
| 5,471,571 | 11/1995 | Smith et al. | 395/137 |
| 5,477,237 | 12/1995 | Parks | 345/156 |
| 5,491,477 | 2/1996 | Clark et al. | 341/20 |
| 5,512,919 | 4/1996 | Araki | 345/156 |
| 5,513,100 | 4/1996 | Parker et al. | 364/167.01 |
| 5,530,455 | 6/1996 | Gillick et al. | 345/163 |
| 5,550,562 | 8/1996 | Aoki et al. | 345/163 |
| 5,565,887 | 10/1996 | McCambridge et al. | 345/145 |
| 5,570,111 | 10/1996 | Barrett et al. | 345/157 |
| 5,576,727 | 11/1996 | Rosenberg et al. | 345/179 |
| 5,587,937 | 12/1996 | Massie et al. | 364/578 |
| 5,589,828 | 12/1996 | Armstrong | 341/20 |
| 5,589,854 | 12/1996 | Tsai | 345/161 |
| 5,591,924 | 1/1997 | Hilton | 73/862.043 |
| 5,596,347 | 1/1997 | Robertson et al. | 345/145 |
| 5,629,594 | 5/1997 | Jacobus et al. | 318/568.11 |
| 5,642,469 | 6/1997 | Hannaford et al. | 395/99 |
| 5,643,087 | 7/1997 | Marcus et al. | 463/38 |
| 5,666,138 | 9/1997 | Culver | 345/161 |
| 5,666,473 | 9/1997 | Wallace | 345/420 |
| 5,691,747 | 11/1997 | Amano | 345/167 |
| 5,691,898 | 11/1997 | Rosenberg | 364/190 |
| 5,709,219 | 1/1998 | Chen et al. | 128/782 |
| 5,714,978 | 2/1998 | Yamanaka et al. | 345/157 |
| 5,721,566 | 2/1998 | Rosenberg et al. | 345/161 |
| 5,734,373 | 3/1998 | Rosenberg et al. | 345/161 |
| 5,736,978 | 4/1998 | Hasser et al. | 345/173 |
| 5,742,278 | 4/1998 | Chen et al. | 345/156 |
| 5,755,577 | 5/1998 | Gillio | 434/262 |
| 5,757,358 | 5/1998 | Osga | 345/146 |
| 5,760,764 | 6/1998 | Martinelli | 345/160 |
| 5,767,839 | 6/1998 | Rosenberg | 345/161 |
| 5,771,037 | 6/1998 | Jackson | 345/157 |
| 5,781,172 | 7/1998 | Engel et al. | 345/164 |
| 5,790,108 | 8/1998 | Salcudean et al. | 345/184 |
| 5,805,140 | 9/1998 | Rosenberg et al. | 345/161 |
| 5,805,165 | 9/1998 | Thorne, III et al. | 345/348 |
| 5,808,601 | 9/1998 | Leah et al. | 345/145 |
| 5,841,423 | 11/1998 | Carroll | 345/168 |
| 5,844,392 | 12/1998 | Peurach et al. | 318/568.17 |
| 5,889,670 | 3/1999 | Schuler et al. | 364/186 |

OTHER PUBLICATIONS

Wiker, Steven F. et al., "Development of Tactile Mice for Blind Access to Computers: Importance of Stimulation Locus, Object Size, and Vibrotactile Display Resolution," Proceedings of the Human Factors Society 35th Annual Meeting 1991, pp. 708–712.

Ellis, et al., "Design and Evaluation of a High–Performance Prototype Planar Haptic Interface", DSC–vol. 49, Advances in Robotics, Mechatronics,nd Haptic Interfaces ASME 1993.

Rosenberg, Louis B. et al., "Perceptual Decomposition of Virtual Haptic Surfaces," IEEE, Oct. 1993.

Rosenberg, Louis B., "Perceptual Design of a Virtual Rigid Surface Contact," Center for Design Reseach Stanford University, Air Force Material Command, Apr. 1993, pp. 1–41.

Rosenberg, Louis B., "The Use of Virtual Fixtures to Enhance Operator Performance in Time Delayed Teleoperation", Crew Systems Directorate, Biodynamics and Biocommunication Div., Wright Paterson AFB, OH 1993.

Adachi, Yoshitaka et al., "Sensory Evaluation of Virtual Haptic Push–Buttons," Technical Research Center, Suzuki Motor Corporation, Nov. 1994.

Su, S. Augustine et al., "The Virtual Panel Architecture: A 3D Gesture Framework," IEEE 1993, pp. 387–393.

Schmult, "Application Areas for a Force–Feedback Joystick", Dept. of Machine Perception Research, DSC–vol. 49, Advances in Robotics, Mechatronics, and Haptic Interfaces ASME 1993.

Russo, "The Design and Implementation of a Three Degree–of–Frredom Force Ouput Joystick", Dept. of Mechanical Engineering, 1990.

Rosenberg, L.B., "Commercially Viable Force Feedback Controller for Individuals with Neuromotor Disabilities", AL/CF–TR–1997–0016, United States Air Force Armstrong Laboratory, May 1996.

Winey III, "Computer Simulated Visual and Tactile Feedback as an Aid to Manipulator and Vehicle control", Massachuetts Inst. of Technology, 1981.

Kilpatrick, Paul Jerome, "The Use of a Kinesthetic Supplement in an Interactive Graphics System", The University of North Carolina at Chapel Hill, Ph.D., 1976, Computer Science.

Yokokohji, Yasuyoshi, "What You Can See is What You Can Feel–Development of a Visual/Haptic Interface to Virtual Environment", The Robotics Institute, Carnegie Mellon University, 1996 IEEE, Proceedings of VRAIS'96.

Rosenberg, "Using Force Feedback to Enhance Human Performance in Graphical User Interfaces", Apr. 1996, www.acm.org/sigch/ch;96.

Batter, James et al., "Grope–1: A computer Display to the Sense of Feel", pp. JA–4–188–TA–4–192.

Gotow, J.K. et al., "Perception of Merchemical Properties at the Man–Machine Interface", IEEE 1987, pp. 688–689.

Iwata, H., "Artificial Reality with Force–feedback: Development of Desktop Virtual Space with Compact Master Manipulator," Computer Graphics, vol. 24, No. 4, 1990, pp. 165–170.

Akamatsu, M. et al., "Multimodal Mouse: A Mouse–Type Device with Tactile and Force Display," Presence vol. 3, No. 1, Winter 1994, pp. 73–80.

Munch, S. et al., "Intelligent Control for Haptic Displays," Eurographics Association, vol. 15, No. 3, 1996, pp. C–217 to C–226.

Ramstein, C., "Combining Haptic and Braille Technologies: Design Issues and Pilot Study," Assets '96, $2^{nd}$ Annual Conf. on Assistive Technology, 1996, pp. 37–44.

Payette, J, et al., "Evaluation of a Force Feedback (Haptic) Computer Pointing Device in Zero Gravity," DSC–vol. 58, Proc. of ASME Dynamics Systems and Control Div., ASME 1996, pp. 547–553.

Ramstein, C. et al., "The Pantograph: A Large Workspace Haptic Device for a Multimodal Human–Computer Interaction," Computer–Human Interaction, CHI '94.

Kelley, A.J. et al., "On the Development of a Force–Feedback Mouse and its Integration into a Graphical User Interface," Symp. on Haptic Interfaces for Virtual Environment and Teleoperator Systems, 1994.

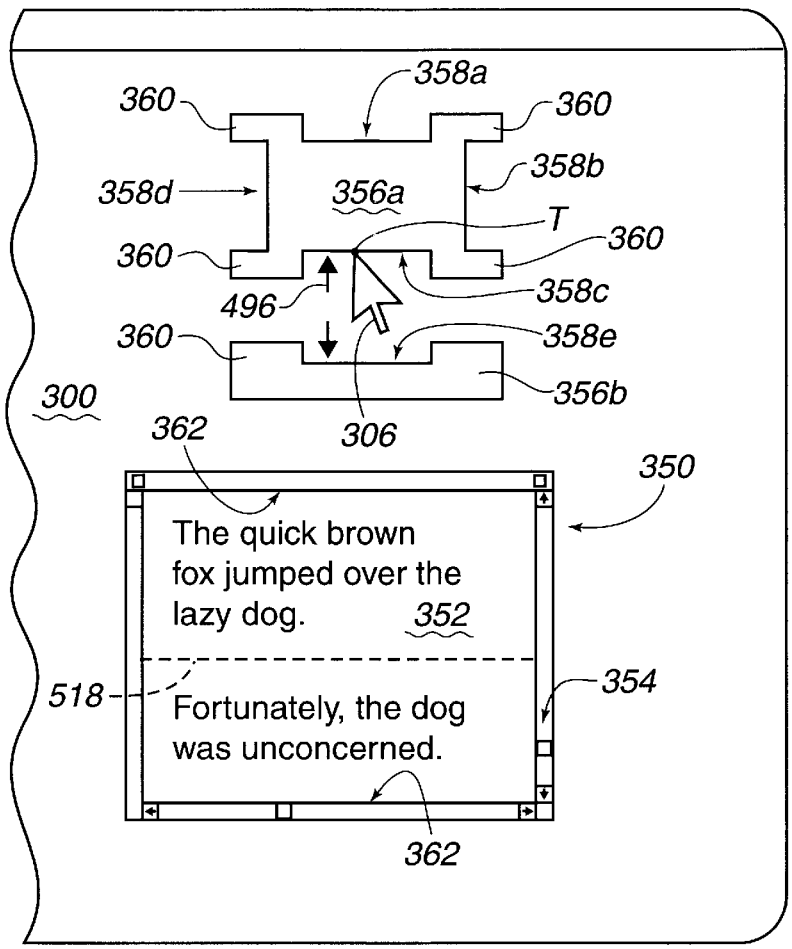
FIG. 10
FIG. 10a
FIG. 10b
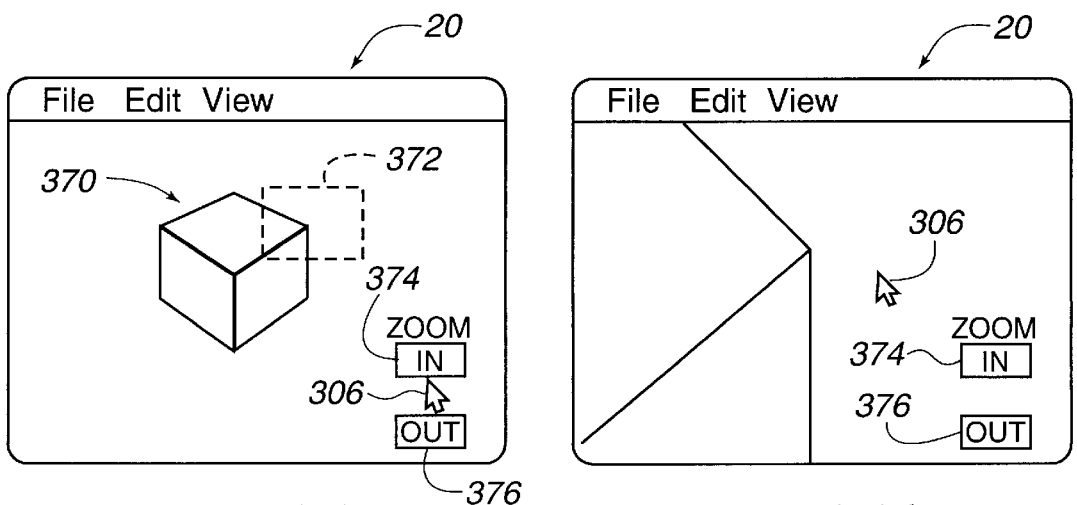
FIG. 11a
FIG. 11b

12
PROVIDING FORCE FEEDBACK USING AN INTERFACE DEVICE INCLUDING AN INDEXING FUNCTION

This is a divisional application of application Ser. No. 08/756,745 filed on Nov. 26, 1995 now U.S. Pat. No. 5,825,308, the disclosure of which is incorporated herein by reference.

BACKGROUND OF THE INVENTION

The present invention relates generally to interface devices for allowing humans to interface with computer systems, and more particularly to computer interface devices that allow the user to provide input to computer systems and provide force feedback to the user.

Computer systems are used extensively in many different industries to implement many applications, such as word processing, data management, simulations, games, and other tasks. A computer system typically displays a visual environment to a user on a display screen or other visual output device. Users can interact with the displayed environment to perform functions on the computer, play a game, experience a simulation or "virtual reality" environment, use a computer aided design (CAD) system, or otherwise influence events or images depicted on the screen.

One visual environment that is particularly common is a graphical user interface (GUI). GUI's present visual images which describe various graphical metaphors of a program or operating system implemented on the computer. Common GUI's include the Windows® operating system from Microsoft Corporation and the System 7.5 operating system from Apple Computer, Inc. These interfaces allows a user to graphically select and manipulate functions of the operating system and application programs by using an input interface device. The user typically moves a user-controlled graphical object, such as a cursor or pointer, across a computer screen and onto other displayed graphical objects or predefined screen regions, and then inputs a command to execute a given selection or operation. The objects or regions ("targets") can include, for example, icons, windows, pull-down menus, buttons, and scroll bars. Most GUI's are currently 2-dimensional as displayed on a computer screen; however, three dimensional (3-D) GUI's that present simulated 3-D environments on a 2-D screen can also be provided.

Other programs or environments that may provide user-controlled graphical objects such as a cursor include graphical "web pages" or other environments offered on the World Wide Web of the Internet, CAD programs, video games, virtual reality simulations, etc. In some graphical computer environments, the user may provide input to control a 3-D "view" of the graphical environment, i.e., the user-controlled graphical "object" can be considered the view displayed on the video screen. The user can manipulate the interface device to move the view, as if moving a camera through which the user is looking. This type of graphical manipulation is common in CAD or 3-D virtual reality applications.

The user interaction with and manipulation of the computer environment is achieved using any of a variety of types of human-computer interface devices that are connected to the computer system controlling the displayed environment. In most systems, the computer updates the environment in response to the user's manipulation of a user-manipulatable physical object ("user object") that is included in the interface device, such as a mouse, joystick, etc. The computer provides feedback to the user utilizing the display screen and, typically, audio speakers.

Presently, there are two types of interface devices which use different sensing modes and different mappings to allow a user to interact with and manipulate a computer environment: isotonic sensing devices and isometric sensing devices. Isotonic sensing utilizes motion of a physical user object in physical space in predefined degrees of freedom to provide input to the computer. For example, a mouse is an isotonic controller often used to control a cursor in a GUI. The mouse may be moved in two degrees of freedom in the plane of a mousepad or other surface, and the cursor on the screen is moved directly in response to the movement of the mouse. A joystick is another example of an isotonic controller, where the movement of the stick in rotary or linear degrees of freedom of physical space is sensed and input to the computer. Other isotonic interface devices include trackballs, styluses and tablets, steering wheels, etc.

In contrast, isometric sensing utilizes a user's force or pressure on the user object rather than the movement of the user object through physical space. The force magnitude and direction that the user exerts on the interface device is sensed and input to the computer to be used in the manipulation and interaction of the computer environment. For example, the "Space Ball" from Space-Tec and the "Magellan" from Logitec are common isometric controllers. The Space Ball is a sphere having pressure sensors provided between the ball and the mounting surface. When the user touches the sphere, the sensor detects the direction and magnitude of force exerted by the touch. In ideal isometric sensing, there is no perceived deflection of the user object in response to the user's pressure. However, if there is a small amount of deflection or movement in the user object perceived by the user, the sensing can be referred to as "elastic" control. In many cases, isometric controllers are actually elastic controllers, since there is a small amount of deflection of the user object by which the magnitude of force is measured. Some users prefer this small deflection, as it provides some intuitive feedback as to the degree of pressure applied by the user. In many cases, elastic controllers have been found to induce smaller errors in user manipulation of computer objects than pure isometric controllers.

Human factors research has shown that isotonic controllers excel at position control tasks, while isometric controllers are more intuitive for use with rate control tasks. "Position control" refers to a direct mapping of the position of the user object with a user-controlled graphical object. For example, a cursor in a GUI is controlled with a mouse under a position control paradigm, since the cursor is moved a distance corresponding to the distance the mouse is moved. "Rate control," in contrast, refers to an indirect or abstract mapping of user object to graphical object. For example, scrolling text in a window or zooming to a larger view in a window of a GUI are rate control tasks, since the scrolling and zooming is not directly related to the position of a mouse. Similarly, the controlled velocity of a simulated vehicle is suitable for a rate control paradigm.

A problem with the current use of isotonic controllers, such as mice and trackballs, within GUI's and other graphical environments is that both position control and rate control tasks are required in a single computer environment. For example, as described above, a GUI includes many position control tasks such as target acquisition, i.e., moving the cursor onto icons, buttons, menu items, text, etc. An isotonic controller such as a mouse is ideal for these types of interactions. However, other GUI interactions, such as scrolling text, zooming, panning/rotating a view, or sizing, are more appropriate for a rate control interface. To provide simple rate control interactions using an isotonic controller, several graphical metaphors have been invented. For example, in a position control interface, sliders are displayed which can be moved using a mouse to allow the scrolling of text, or a magnifying icon is selected to enable zooming. However, these graphical metaphors can often be awkward, especially in view of the ease of such rate control tasks when using an isometric or elastic controller. Indeed, some users who have a great need for rate control tasks such as scrolling and zooming may simultaneously use both an isotonic controller such as a mouse and an isometric controller such as a Space Ball to allow maximum ease of use in interacting with the computer environment. However, the use of two separate controllers for computer interactions is often awkward and inconveniencing for the user.

In addition, existing isometric controllers are limited in that they are only input devices and are not able to provide active force feedback to a user. The user is thus not able to experience force feedback when manipulating the isometric controller which can be provided when manipulating an isotonic controller such as a joystick. The user is therefore missing potentially valuable and interesting force information and assistance in executing tasks in a graphical environment when using a traditional isometric controller.

There are a few commercial examples of isotonic controllers that have additional control modes usable for rate control tasks. One example is the SoftMouse from Immersion Corporation that has been available for a number of years. This is a standard mouse controller that has an additional thumb wheel that can be rotated to control zoom functions. Another example is the forthcoming Intellimouse from Microsoft®, which is a standard mouse controller having a finger wheel that may be rotated to control scrolling functions. Both of these are examples of poorly integrated multi-modal controllers because the additional modes are just add-ons to standard controllers. For example, add-on sensors are used to track the thumb wheels independently of standard mouse sensors. Also, different finger actions are required for each mode, e.g., moving a mouse to control one mode and turning a wheel to control another mode. And, like the isometric controllers, these types of controllers are input only controllers and are not able to provide computer-controlled output forces to a user.

What is needed is an integrated multi-modal controller where the same sensor and the same hand activities are used to implement multiple control modes. In addition, a seamless method to switch between modes is desirable to provide ease of use. Finally, a multi-modal device having force feedback provided by computer-controlled actuators in all available modes is needed for interactions of a user in a computer environment.

SUMMARY OF THE INVENTION

The present invention is directed to a force feedback interface which allows a user to provide both isotonic and isometric input to a host computer system. Isotonic input and force feedback is provided for position control tasks such as positioning a cursor or other graphical object, while isometric input is provided for easily performing rate control tasks. An indexing function is provided to allow the user to readjust the offset between the user manipulatable physical object in its workspace and a user-controlled graphical object, such as a cursor, displayed by a host computer.

More specifically, the present invention includes an interface device for providing isotonic and isometric input to a host computer system from a user. An interface device includes a user manipulatable physical object contacted by a user and movable in physical space. In the preferred embodiment, the physical object is a puck or mouse that can be moved in a planar workspace. A sensor detects the movement of the physical object in physical space and, preferably, an actuator applies output forces on the physical object. A mode selector is provided to select an isotonic control mode and an isometric control mode of the interface device. The isotonic mode provides input to the host computer system based on a position of the physical object in physical space with respect to a ground. The isometric mode provides input to the host computer system based on an input force applied by the user to the same physical object with respect to the same ground, where the input force is determined based on the movement detected by the sensor. In isometric mode, the input force applied by the user preferably opposes the output force applied by the actuator, and is preferably detected based on a measured deviation of the physical object in physical space from a locally-defined origin.

A method of the present invention similarly provides isotonic and isometric input from a user using a single interface device coupled to a host computer system that displays a graphical environment such as a graphical user interface (GUI). A selection of a control mode of the interface device is received, where the control mode is either isotonic control mode or isometric control mode. Isotonic input is provided to the host computer if the interface device is in isotonic mode, where the isotonic input is used by the host computer to update a position of a user-controlled graphical object in the graphical environment to correspond to a position of a user-manipulated physical object (such as a cursor) in provided degrees of freedom. The interface device is preferably in isotonic mode when the isometric mode is not active. Preferably, force sensations are applied to the physical object in isotonic mode based on interactions of the user-controlled graphical object in the graphical environment, where the force sensations assist and/or inform the user of interaction with graphical objects. A program function may be performed as indicated by the location of the cursor and a command gesture from the user.

Isometric input is provided to the host computer if the interface device is in isometric mode, where the isometric input is used by the host computer to control an isometric function of the graphical environment based on an input force applied by the user to the physical object. In a preferred embodiment, an indication is received to engage the isometric mode of the interface device. A local origin is defined with reference to a current position of the physical object in provided degrees of freedom. A deviation of the physical object from the local origin is determined, where this deviation is indicative of the user's input force, and a resistive force is applied to the physical object opposing the deviation. The resistive force is preferably a restoring force having a magnitude proportional to a magnitude of the deviation from the local origin and a direction towards the local origin. The determined deviation is used to control an isometric function of an application program or operating system implemented by the host computer. The isometric function can include such tasks as scrolling a displayed document, panning a displayed view, or zooming a displayed view. Optionally, in isometric mode, the host computer may display movement of the user-controlled graphical object corresponding to the deviation of the physical object.

An indexing feature of the present invention allows the user to change the offset between the position of the physical object and the location of the cursor on the display screen by disabling the mapping in said isotonic mode between the user-controlled graphical object and the physical object. A safety switch may be included to deactivate output forces to the physical object when, e.g., the user removes the weight of his or her fingers from the physical object. In one embodiment, the safety switch and indexing feature are integrated into the same switch. In a described embodiment, a local microprocessor, separate from the host processor, is coupled to the interface device and may provide local control over sensing and outputting forces to relieve the computational burden on the host computer. Voice coil actuators or motors may be used as the actuators, and a linkage having a plurality of members can be included.

In some embodiments, an overlay force is added to the restoring force applied to the physical object in isometric mode. The overlay force can be a jolt force or vibration sensation to indicate to said user an event in the graphical environment, such as a page break of a scrolling document or a limit to a controlled range.

The method and apparatus of the present invention advantageously provides both isotonic and isometric sensing functionality in a single interface device. This allows the user to conveniently switch control modes to efficiently perform isotonic position control tasks and isometric rate control tasks in a graphical computer environment. Forces in the isotonic mode assist or inform the user in isotonic tasks, and the provision of overlay forces in isometric mode allows additional information to be presented to the user which was not possible in traditional isometric input devices. The safety switch and indexing features of the present invention allow a mouse-like force feedback interface to be implemented and manipulated with ease.

These and other advantages of the present invention will become apparent to those skilled in the art upon a reading of the following specification of the invention and a study of the several figures of the drawing.

BRIEF DESCRIPTION OF THE DRAWINGS

FIG. 6c is a diagrammatic illustration of the indexing function of the present invention using the puck of FIG. 6a;

FIG. 10 is a diagrammatic illustration of a display screen showing an isometric object for providing isometric input of the present invention;

FIGS. 10a–10b are diagrammatic illustrations of a compression of an isometric object of FIG. 10;

FIGS. 11a–11b are diagrammatic illustrations of the display screen showing a zoom function controllable by isometric input of the preset invention;

DETAILED DESCRIPTION OF PREFERRED EMBODIMENTS

Figure 1:
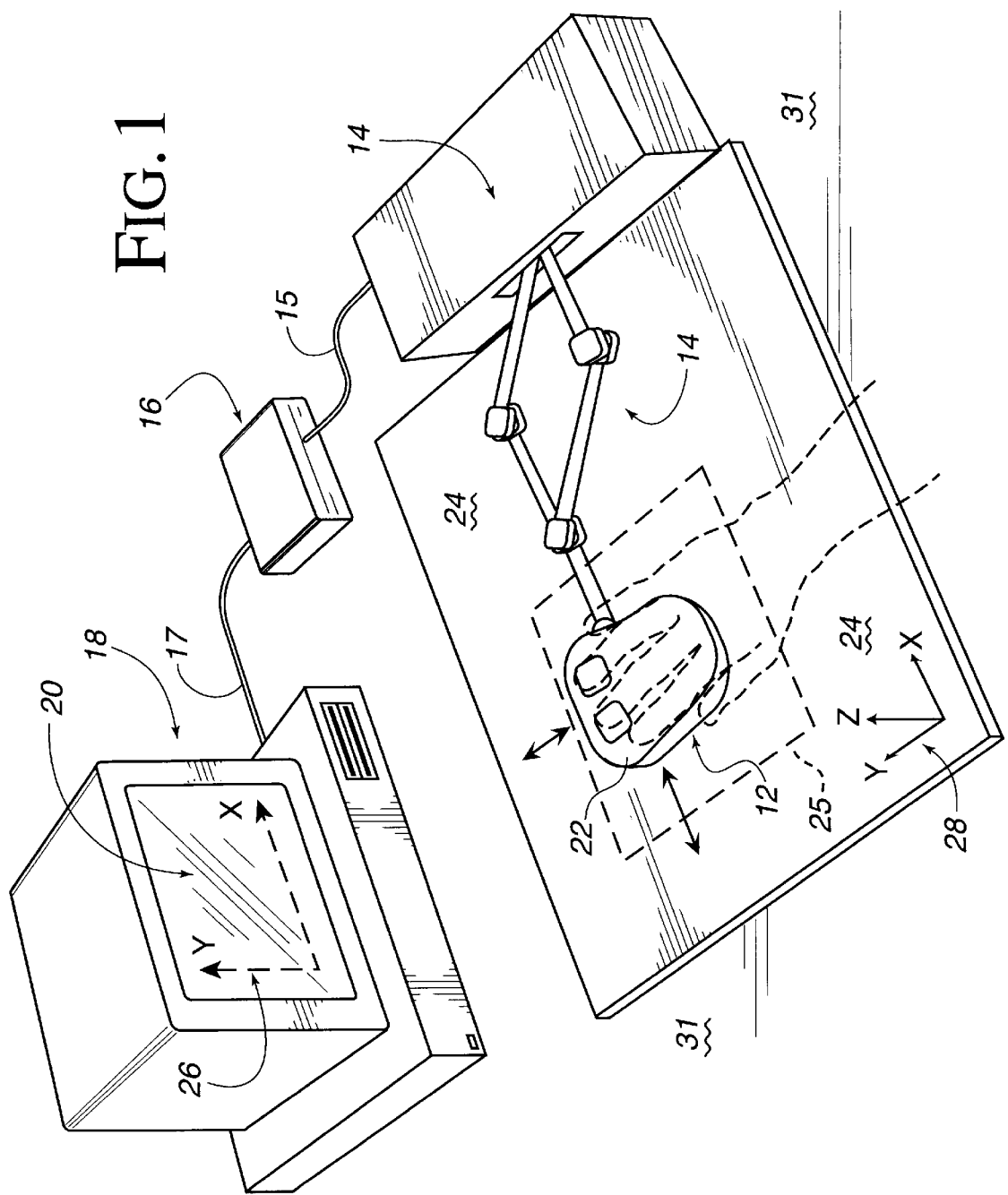
FIG. 1 is a perspective view of one embodiment of the interface system of the present invention for providing isotonic and isometric input to a host computer.

FIG. 1 is a perspective view of a force feedback interface system 10 of the present invention capable of providing isotonic and isometric input to a host computer to interact with computer objects and environments. Interface system 10 includes a user manipulable object 12, a mechanical interface 14, an electronic interface 16, and a host computer 18.

User manipulable object 12 ("user object", "physical object", or "manipulandum") used in conjunction with the present invention is preferably grasped or gripped and manipulated by a user. By "grasp," it is meant that users may releasably engage a portion of the object in some fashion, such as by hand, with their fingertips, or even orally in the case of handicapped persons. For example, images are displayed and/or modified on a display screen 20 of the computer system 18 in response to such manipulations. The illustrated interface system 10 includes a mouse object or "puck" 22 as a user manipulable object (also known as a "widget" herein). Puck 22 is shaped so that a user's fingers or hand may comfortably grasp the object and move it in the provided degrees of freedom in physical space. For example, a user can move puck 22 to correspondingly move a computer generated graphical object, such as a cursor or other image, in a graphical environment provided by computer 18. The available degrees of freedom in which user manipulable object 12 can be moved are determined from the mechanical interface 14, described below. In addition, puck 22 preferably includes one or more buttons to allow the user to provide additional commands to the computer system. The puck 22 is described in greater detail with respect to FIG. 6a.

It will be appreciated that a great number of other types of user manipulable objects 12 can be used with the method and apparatus of the present invention. In fact, the present invention can be used with any mechanical object where it is desirable to provide a human/computer interface with multiple degrees of freedom. Such objects may include styluses, joysticks, spherical-, cubical-, or other-shaped hand grips, screwdrivers, steering wheels/controls, pool cues, medical instruments such as catheters, etc. Some of these other objects, such as a stylus, are described in detail subsequently with respect to FIGS. 7a–d.

Mechanical interface apparatus 14 interfaces mechanical input and output between the user manipulable object 12 and host computer 18 implementing the simulation or game environment. Mechanical interface 14 provides multiple degrees of freedom to object 12; in the preferred embodiment, two linear, planar degrees of freedom are provided to the object, although greater or fewer degrees of freedom can be provided in alternate embodiments, as well as rotary degrees of freedom. For many applications, puck 14 need only be moved in a very small area, shown as dashed line 25 in FIG. 1 as an example. This is because a graphical object such as a cursor can be moved across the entire length or width of screen 20 by moving puck 14 only a short distance in physical space. This aspect is discussed in greater detail below.

In a preferred embodiment, the user manipulates object 12 in a planar workspace, much like a traditional mouse, and the position of object 12 is translated into a form suitable for interpretation by position sensors of the mechanical interface 14. The sensors track the movement of the object 12 in planar space and provide suitable electronic signals to electronic interface 16. Electronic interface 16, in turn, provides position information to host computer 18. In addition, host computer 18 and/or electronic interface 16 provides force feedback information to actuators coupled to mechanical interface 14, and the actuators generate forces on members of the mechanical apparatus to provide forces on object 12 in provided or desired degrees of freedom. The user experiences the forces generated on the object 12 as realistic simulations of force sensations such as jolts, springs, textures, "barrier" forces, and the like. For example, when a rigid surface is generated on computer screen 20 and a computer object controlled by the user collides with the surface, the computer 18 will send force feedback signals to the electrical interface 16 and mechanical apparatus 14 to generate collision forces on object 12. Several embodiments of mechanical interface 14 are shown in greater detail with respect to FIGS. 2, 3a–b, and 4a–b.

Electronic interface 16 is a component of the interface system 10 and may couple the mechanical apparatus 14 to the host computer 18. Electronic interface 16 can be included within a housing of mechanical apparatus 14 or, alternatively, electronic interface 16 can be included in host computer 18. Or, all or portions of the electronic interface 16 can be provided as a separate unit with its own housing as shown in FIG. 1. More particularly, electronic interface 16 includes a local microprocessor separate from any microprocessors in the host computer 18 to control force feedback independently of the host computer, as described below, as well as sensor and actuator interfaces that convert electrical signals to appropriate forms usable by mechanical apparatus 14 and host computer 18. A suitable embodiment of interface 16 is described in detail with reference to FIG. 5.

The electronic interface 16 can be coupled to mechanical interface apparatus 14 by a bus 15 (or may be included within the housing of apparatus 14) and is coupled to the computer 18 by a bus 17 (or may be directly connected to a computer bus using a suitable interface). In other embodiments, signals can be sent to and from interface 16 and computer 18 by wireless transmission/reception. In preferred embodiments of the present invention, the interface 16 serves as an input/output (I/O) device for the computer 18. The interface 16 can also receive inputs from other input devices or controls that are associated with mechanical interface 14 or object 12 and can relay those inputs to computer 18. For example, commands sent by the user activating a button on user object 12 can be relayed to computer 18 by interface 16 to implement a command or cause the computer 18 to output a command to the mechanical apparatus 14. Such input devices are described in greater detail with respect to FIG. 5.

Host computer 18 is preferably a personal computer or workstation, such as an IBM-PC compatible computer or Macintosh personal computer, or a SUN or Silicon Graphics workstation. For example, the computer 18 can operate under the Windows™ or MS-DOS operating system in conformance with an IBM PC AT standard. Alternatively, host computer system 18 can be one of a variety of home video game systems commonly connected to a television set, such as systems available from Nintendo, Sega, or Sony. In other embodiments, home computer system 18 can be a "set top box" which can be used, for example, to provide interactive television functions to users, or a "network" or "internet" computer which allows users to interact with a local or global network using standard connections and protocols such as used for the Internet and World Wide Web. Host computer preferably includes a host microprocessor, random access memory (RAM), read only memory (ROM), input/output (I/O) circuitry, and other components of computers well-known to those skilled in the art.

Host computer 18 preferably implements a host application program with which a user is interacting via mechanical interface apparatus 14 and other peripherals, if appropriate. For example, the host application program can be medical simulation, video game, Web page, scientific analysis program, or other application program that utilizes input of user object 12 and outputs force feedback to the object 12. Herein, for simplicity, operating systems such as Windows™, MS-DOS, MacOS, Unix, etc. are also referred to as "application programs." In one preferred embodiment, the application program utilizes a graphical user interface (GUI) to present options to a user and receive input from the user. Herein, computer 18 may be referred as displaying "graphical objects" or "computer objects." These objects are not physical objects, but are logical software unit collections of data and/or procedures that may be displayed as images by computer 18 on display screen 20, as is well known to those skilled in the art. A displayed cursor or a simulated cockpit of an aircraft might be considered an "object". The host application program checks for input signals received from electronic interface 16 and sensors of mechanical interface 14, and outputs force values and commands to be converted into forces on user object 12. Suitable software drivers which interface such simulation software with computer input/output (I/O) devices are available from Immersion Human Interface Corporation of San Jose, Calif.

Display device 20 can be included in host computer 18 and can be a standard display screen (LCD, CRT, etc.), 3-D goggles, or any other visual output device. Typically, the host application provides images to be displayed on display device 20 and/or other feedback, such as auditory signals. For example, display screen 20 can display images from a GUI. Images describing a moving, first person point of view can be displayed, as in a virtual reality game. Or, images describing a third-person perspective of objects, backgrounds, etc. can be displayed. Alternatively, images from a simulation, such as a medical simulation, can be displayed, e.g., images of tissue and a representation of object 12 moving through the tissue, etc.

There are two primary "control paradigms" of operation for interface system 10: position control and rate control. Position control refers to a mapping of user object 12 in which displacement of the user object in physical space directly dictates displacement of a graphical object. The mapping can have an arbitrary scale factor or even be non-linear, but the fundamental relation between user object displacements and graphical object displacements should be present. Under a position control mapping, the computer object does not move unless the user object is in motion. Position control is not a popular mapping for traditional computer games, but is popular for other applications such as graphical user interfaces (GUI's) or medical procedure simulations. Position control force feedback roughly corresponds to forces which would be perceived directly by the user, i.e., they are "user-centric" forces.

Rate control refers to a user object mapping in which the displacement of the user object 12 along one or more provided degrees of freedom is abstractly mapped to motion of a computer-simulated object under control. There is not a direct physical mapping between physical object motion and computer object motion. Thus, most rate control paradigms are fundamentally different from position control in that the user object can be held steady at a given position but the controlled computer object is in motion at a commanded or given velocity, while the position control paradigm only allows the controlled computer object to be in motion if the user object is in motion. For example, a common form of rate control is a velocity derived abstraction in which displacement of the user object dictates a velocity of the computer object, such as a vehicle or other graphical object displayed on display screen 20. The greater the user object is moved from the original position, the greater the velocity of the controlled graphical object. Such control paradigms are very popular in computer games where velocity (or acceleration, e.g., thrust) of a spacecraft or race car is dictated by the displacement of, for example, a joystick. In force feedback schemes, rate control forces would be exerted on a vehicle or other simulated entity and thus can be termed "vehicle-centric" forces.

As shown in FIG. 1, the host computer may have its own "host frame" 26 which is displayed on the display screen 20. In contrast, the user object 12 has its own "local frame" 28 in which the user object 12 is moved. In a position control paradigm, the position of a user-controlled graphical object, such as a cursor, in host frame 26 corresponds to a position of the user object 12 in the local frame 28. The offset between the object in the host frame and the object in the local frame can preferably be changed by the user, as described below in FIG. 6c.

Figure 2:
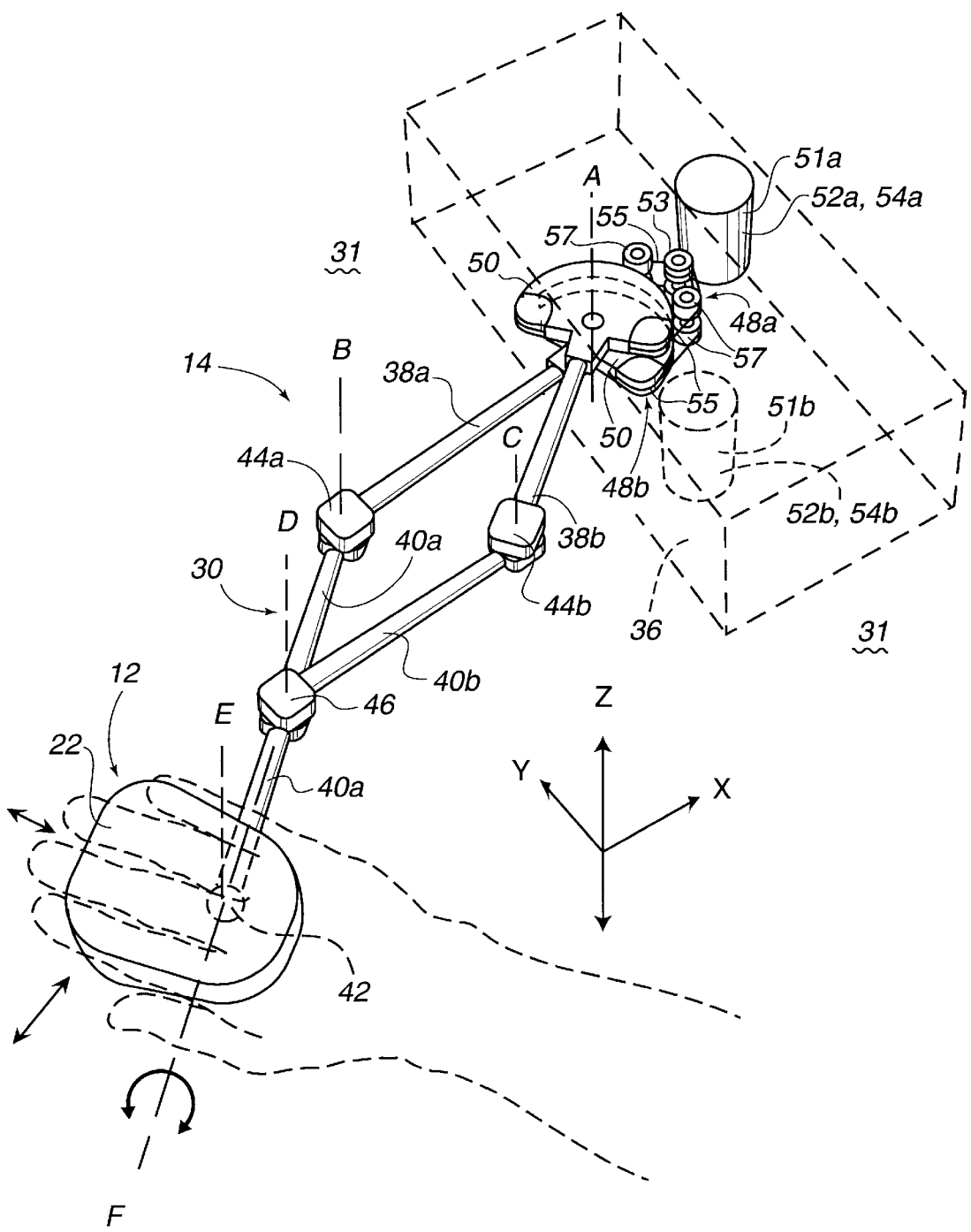
FIG. 2 is a perspective view of an embodiment of a mechanical linkage used for the interface system of FIG. 1.

Puck 22 can be moved on a grounded pad 24 or similar surface in some embodiments of the present invention. In some embodiments, puck 12 does not touch pad 24 or ground surface 31 since it is coupled to a mechanical structure (FIGS. 3 and 4) or suspended above the pad and ground surface by mechanical apparatus 14 (FIG. 2). Thus, the pad can be used as a reference for the user to show the workspace of the puck, i.e., the area in which the puck is allowed to move by apparatus 14. The pad can also be used as a surface on which to rest the user's hand or a portion of the user's hand. In alternate embodiments, puck 22 can touch the surface of pad 24 or grounded surface 31 to provide additional support for the puck and relieve stress on mechanical apparatus 14. In such an embodiment, a wheel, roller, or other device is preferably used on puck to minimize friction between the puck and the contacted surface.

In the isotonic mode of the present invention (described below), puck 22 can be used, for example, to control a computer-generated graphical object such as a cursor displayed in a graphical computer environment, such as a GUI. The user can move the puck in 2D planar workspace, like a mouse, to move the cursor to graphical objects in the GUI or perform other tasks. In other graphical environments, such as a virtual reality video game, a user can be controlling a computer player or vehicle in the virtual environment by manipulating the puck 22. The computer system tracks the position of the puck with sensors as the user moves it. The computer system may also provide force feedback to the puck, for example, when the user moves the graphical object against a generated surface such as an edge of a window, a virtual wall, etc. It thus appears and feels to the user that the puck and the graphical object are contacting real surfaces. When using puck 22 in an isometric mode of the present invention, the user feels restoring or spring forces on the puck which the user can utilize to provide isometric or elastic input.

FIG. 2 is a perspective view of a first embodiment of mechanical apparatus 14 for providing mechanical input and output in accordance with the present invention. Apparatus 14 includes a mechanical linkage 30 and a user manipulatable object 12, which, in the embodiment of FIG. 2, is preferably a puck 22 or mouse-like object coupled to apparatus 14.

Mechanical linkage 30 provides support for object 12 and couples the object to a grounded surface 31, such as a tabletop or other support. A ground member 36 is coupled to or resting on a ground surface 31. Linkage 30 is, in the described embodiment, a 5-member (or "5-bar") linkage including ground member 36, a base member 38a coupled to ground member 36, a central member 40a coupled to base member 38a, a base member 38b coupled to ground member 36, and a central member 40b coupled to base member 38b. Fewer or greater numbers of members in the linkage can be provided in alternate embodiments.

The members of linkage 30 are rotatably coupled to one another through the use of rotatable bearings or pivots, wherein base member 38a is rotatably coupled to ground member 36 by a bearing (not shown) and can rotate about an axis A (a capstan drive mechanism is coupled between the base member and the ground member, as discussed below). Central member 40a is rotatably coupled to base member 38a by bearing 44a and can rotate about a floating axis B, base member 38b is rotatably coupled to ground member 36 by a bearing (not shown) and can rotate about axis A, central member 40b is rotatably coupled to base member 38b by bearing 44b and can rotate about floating axis C, and central member 40b is rotatably coupled to central member 40b by bearing 46 such that central member 40b and central member 40a may rotate relative to each other about floating axis D. In the described embodiment, central member 40b is coupled at its end to a mid-portion of central member 40a and object 12 is coupled to the end of central member 40a. In an alternate embodiment, the end of central member 40b can be coupled to the end of member 40a, as in a parallel linkage disclosed in co-pending patent application Ser. No. 08/664,086 by Rosenberg et al., hereby incorporated by reference in its entirety.

If object 12 is a puck 22, a rotary bearing 42 preferably couples the puck 22 to central member 40a so that the puck may rotate about axis E and allow the user some flexible movement in the planar workspace. In alternate embodiments, motion about axis E may be sensed by sensors. In yet other embodiments, forces can be provided about axis E using actuators.

The axes B, C, and D are "floating" in the sense that they are not fixed in one position relative to ground surface 31 as is axis A. Preferably, the axes B, C, and D are all substantially parallel to each other. In alternate embodiments, base members 38a and 38b can be coupled to ground member 36 at different locations, so that two grounded axes are provided about which each member rotates.

Linkage 30 is formed as a five-member closed-loop chain. Each member in the chain is coupled to two other members of the chain. The five-member linkage is arranged such that the members can rotate about their respective axes to provide user object 12 with two degrees of freedom, i.e., puck 22 can be moved within a planar workspace defined by the x-y plane, which is defined by the x- and y-axes as shown in FIG. 2. Linkage 30 is thus a "planar" five-member linkage, since it allows the user object 12 to be moved within a plane.

Capstan drive mechanisms 48 can be provided to transmit forces and motion between electromechanical transducers 51 and the user object 12. Capstan drive mechanisms 48a and 48b provide mechanical advantage for forces generated by the actuators without introducing substantial friction and backlash to the system. A capstan drive mechanism 48a is preferably coupled between ground member 36 and base member 38a and operates to apply a force about axis A with respect to ground to base member 38a. A second capstan drive mechanism 48b is preferably coupled between ground member 36 and base member 38b and operates to apply a force about axis A with respect to ground to base member 38b. Capstan mechanisms 48a and 48b each include a drum 50 rotatably coupled to ground member 36 to rotate about axis A and rigidly coupled to base members 38a and 38b, respectively. The capstan drums are positioned side-by-side so that they may both rotate about axis A. Each capstan mechanism 48a and 48b also includes a drive pulley 53 coupled to a transducer 51, the drive pulley being coupled to drum 50 by flexible cable 55. These mechanisms are described in greater detail in co-pending patent application Ser. No. 08/736,161, filed Oct. 25, 1996, and which is hereby incorporated by reference herein in its entirety. Alternatively, other types of mechanisms, or no mechanisms, can be used in place of capstan mechanisms 48.

In alternate embodiments, user object 12 can also be moved in an additional spatial degree of freedom using a rotatable carriage coupled between ground member 36 and base members 38a and 38b. Such an embodiment is described in greater detail with reference to co-pending patent application Ser. No. 08/736,161.

Also coupled to linkage 30 are transducers 51, which may include a sensor and/or an actuator. Transducers 51 can include sensors 52. The sensors 52 collectively sense the rotational position/movement of the object 12 in the provided degrees of freedom. Sensor 52a senses movement of base member 38a about axis A, and sensor 52b senses movement of base member 38b about axis A. These positions about axis A allow the determination of the position of object 12 using known constants such as the lengths of the members of linkage 30 and using well-known coordinate transformations.

Transducers 51 also preferably include grounded actuators 54 to transmit forces to object 12 in space, i.e., in two (or more) degrees of freedom of the user object. The housing of the transducer of actuator 54a is rigidly coupled to ground member 36 and the actuator transmits rotational forces to base member 38a about axis A, preferably through a capstan drive mechanism 48a. Likewise, actuator 54b is rigidly coupled to ground member 46 and transmits rotational forces to base member 36b about axis A through a capstan drive mechanism 48b. The combination of these rotational forces about axis A allows forces to be transmitted to object 12 in all directions in the planar workspace provided by linkage 30 through the rotational interaction of the members of linkage 30. The housings of the actuators are preferably coupled to the same ground member 36 or 31. Many types of actuators can be used, as described with reference to FIG. 5.

User manipulatable object (or "user object") 12 is coupled to mechanical interface 14 and may be moved in the degrees of freedom provided by linkage 30 and additional degrees of freedom if implemented. One example of a user object 12 is puck 22 as shown in FIGS. 1 and 2.

Additional and/or different mechanisms can also be employed to provide desired degrees of freedom to user object 12. For example, in some embodiments, a bearing can be provided between puck 22 (or other user object 12) and central member 40a to allow the puck to rotate about an axis E extending through the central member 40a. This degree of freedom can be sensed and/or actuated, if desired. In other embodiments, a floating gimbal mechanism can be included between user object 12 and linkage 30 to provide additional degrees of freedom to object 12. Optionally, additional transducers can be also added to mechanical interface 14 in provided or additional degrees of freedom of object 12.

Figure 3A:
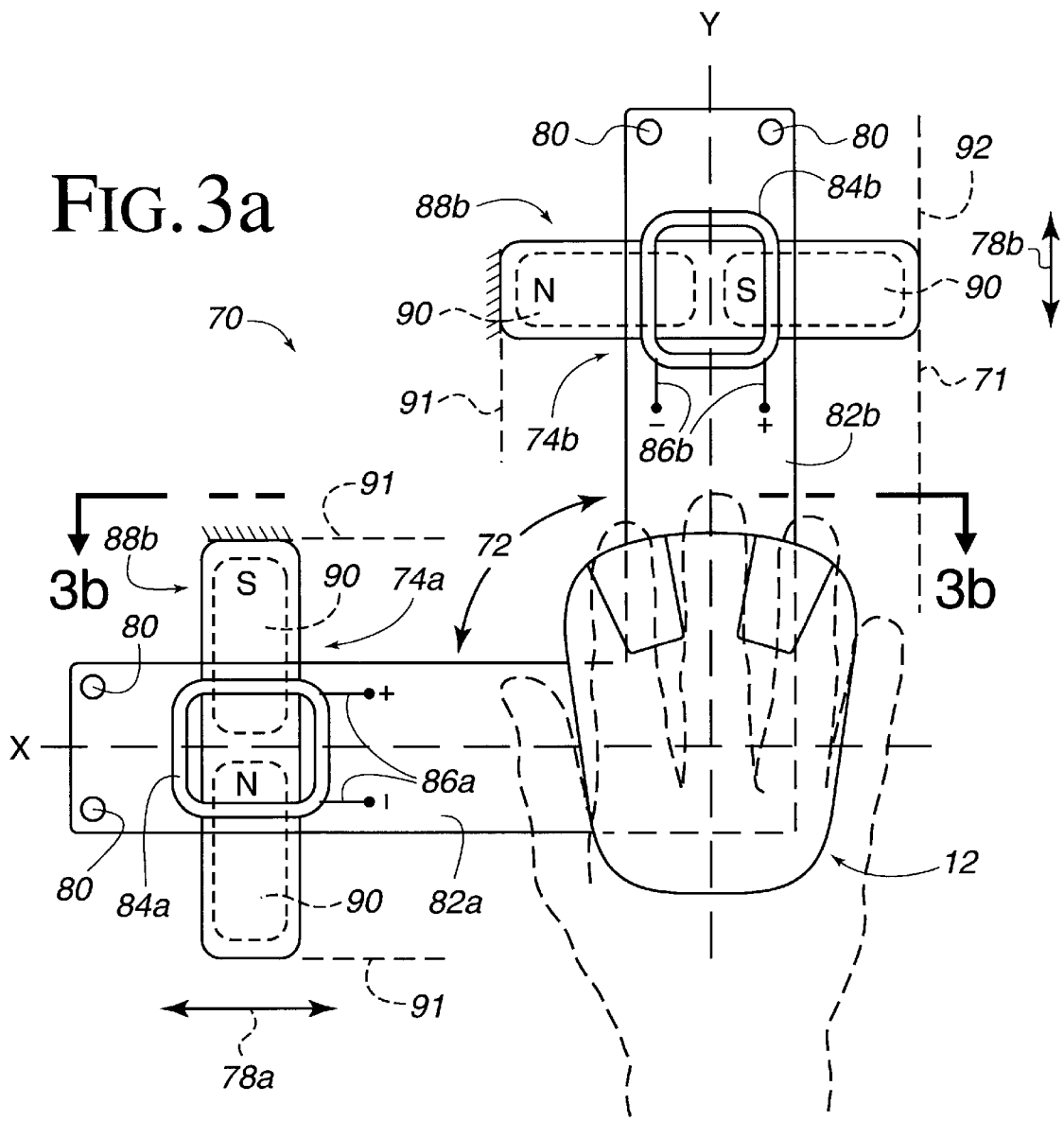
FIGS. 3a–3b are top plan and side elevational views, respectively, of an embodiment having voice coil actuators for use with the interface system of FIG. 1.
Figure 3B:
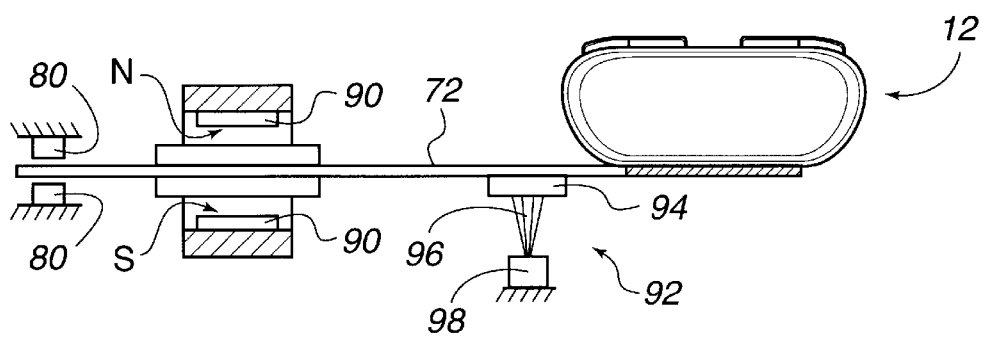

FIG. 3a is a top plan view and FIG. 3b is a side elevational view of a second embodiment 70 of an interface apparatus including mechanical apparatus 14 and user object 12, in which electromagnetic voice coil actuators are used to provide forces to the user object. Such voice coil actuators are described in greater detail in U.S. Pat. No. 5,805,140, hereby incorporated by reference herein in its entirety. Interface apparatus 70 provides two linear degrees of freedom to user object 12 so that the user can translate object 12 in a planar workspace along the X axis, along the Y axis, or along both axes (diagonal movement). Apparatus 70 includes user object 12 and a board 72 that includes voice coil actuators 74a and 74b and guides 80.

Object 12 is rigidly coupled to board 72. In the described embodiment, board 72 is a circuit board, for example, and which may be etched with conductive materials, as explained below. The board may be implemented with other types of materials and shapes in other embodiments. Board 72 is positioned in a plane substantially parallel to the X-Y plane and floats, i.e., board 72 is not grounded. Board 72 may thus be translated along axis X and/or axis Y, shown by arrows 78a and 78b, and object 12 is translated in the same directions, thus providing the object 12 with linear degrees of freedom. Board 72 is preferably guided by guides 80, which serve to keep board 72 substantially within a plane parallel to the X-Y plane and allow the circuit board to translate in that plane, as shown by arrows 78. Guides 80 are shown as round, cylindrical members, but may have a variety of shapes in alternate embodiments. Board 72 is provided in a substantially right-angle orientation having one extended portion 82a at 90 degrees from the other extended portion 82b. In alternate embodiments, board 72 can be provided in other shapes.

Voice coil actuators 74a and 74b are positioned on board 72 such that one actuator 74a is provided on portion 82a and the other actuator 74*b* is provided on portion 82*b*. Wire coil 84*a* of actuator 74*a* is coupled to portion 82*a* of board 72. Preferably, wire coil 84*a* includes at least two loops and is etched onto board 72 as a printed circuit board trace using well-known techniques. Fewer or greater numbers of loops of coil 84*a* can also be provided. Terminals 86*a* are coupled to actuator drivers (described below) of the electronic interface 16, so that computer 18 (or a local microprocessor of FIG. 5) can control the direction and/or magnitude of the current in wire coil 84*a*.

Voice coil actuator 74*a* also includes a magnet assembly 88*a*, which preferably includes four magnets 90 and is grounded. Alternatively, two magnets with two polarities each can be included. Each magnet has a polarity (north N or south S) on opposing sides of the magnet. Opposite polarities of magnets 90 face each other, as shown in FIG. 3*b*, such that coil 84*a* is positioned between opposing polarities on either side of the coil. In alternate embodiments, magnets 90 can be provided on one side of coil 84*a*, and the other magnet 90 can be a similarly-shaped piece of metal that provides a flux return path. Preferably, a small amount of space is provided between the magnet surfaces and the coil 84*a*. A magnetic flux guide can optionally be included to allow magnetic flux to travel from one end of the magnets 90 to the other end, as is well known to those skilled in the art.

The magnetic fields from magnets 90 interact with a magnetic field produced from wire coil 84*a* when current is flowed in coil 84*a* to produce forces. Coil 84*a* and board 72 are positioned between magnets 90 and are thus affected by the magnetic fields of opposing magnets. As an electric current I is flowed through the coil 84*a* via electrical connections 86*a*, a magnetic field is generated from the current and configuration of coil 84*a*. The magnetic field from the coil then interacts with the magnetic fields generated by magnets 90 to produce a force along axis Y. The magnitude or strength of the force is dependent on the magnitude of the current that is applied to the coil, the number of loops in the coil, and the magnetic field strength of the magnets. The direction of the force depends on the direction of the current in the coil. By applying a desired current magnitude and direction, force can be applied to board 72, thereby applying force to user object 12 in the linear degree of freedom along axis Y. The voice coil actuator thus may be provided as a substitute for other actuators such as DC motors and brakes. A voice coil actuator can be provided for each degree of freedom of the mechanical apparatus to which force is desired to be applied.

Thus, the magnetic fields from magnets 90 interact with the magnetic field produced from wire coil 84*a* when current is flowed in coil 84*a* to produce a linear force to board 72 in a direction parallel to axis Y, as shown by arrow 78*b*. The board 72 and wire coil 84*a* are moved parallel to axis Y until coil 84*a* is moved out from under the magnet 90 on the side where the coil was moved. For example, board 72 can be moved to the limits shown by dotted lines 91. Alternatively, physical stops can be positioned at the edges of the board 72 to provide a movement limit.

Voice coil actuator 74*a* can also be used as a sensor to sense the velocity of board 72 along axis Y as the user moves user object 12 along axis Y and/or to derive the position of user object 12 in the linear degree of freedom and other values from that velocity. Motion of coil 84*a* along axis Y within the magnetic field of magnets 90 induces a voltage across the coil 84*a* and this voltage can be sensed. This voltage is proportional to the velocity of the coil and board 72 along axis Y. From this derived velocity, acceleration or position of the board 72 can be derived using timing information, for example, from a clock (described below). Alternatively, one or more additional coils similar to coil 84*a* and having an appropriate number of loops can be placed on board 72 which are dedicated to sensing voltage to derive position, velocity, or acceleration as described above.

In other embodiments, since voice coil actuators produce analog sensor values, subject to noise, and the filtering of such noise typically requires expensive components, separate digital sensors may be used to sense the position, motion, etc. of object 12 in low cost interface devices. For example, a lateral effect photo diode sensor 92 can be used. Sensor 92 can include a rectangular detector 94 positioned in a plane parallel to the X-Y plane onto which a beam of energy 96 is emitted from a grounded emitter 98. The position of the board 72, and thus the position of object 12, can be determined by the location of the beam 96 on the detector. Alternatively, other types of sensors can be used, such as an optical encoder having a rotating shaft coupled to a roller that is frictionally engaged with board 72.

Alternatively, additional coils can also be provided for actuator 74*a* to provide different magnitudes of forces. For example, coil 84*a* can include multiple separate "sub-coils" of wire. A set of terminals is included for each different sub-coil. Each sub-coil can provide a different number of loops on board 72 and therefore will generate a different magnetic field and thus a different magnitude of force when a constant current I is flowed through the sub-coil. This scheme is also applicable to a digital system using on and off switches. This embodiment is described in greater detail in U.S. Pat. No. 5,805,140.

Voice coil actuator 74*b* operates similarly to actuator 74*a*. A current is flowed through coil 84*b* to induce magnetic forces that translate board 72 in a direction parallel to axis X, as shown by arrow 78*b*. This causes forces to be applied to user object 12 in the linear degree of freedom along axis X. Separate sensors 92 can also be provided for the motion of object 12 along axis X and axis Y, or a single sensor 92 can be used to detect motion in both degrees of freedom.

The voice coil actuators 74*a* and 74*b* have several advantages. One is that a limited movement range is defined for a particular degree of freedom of object 12 by the length of the magnetic assemblies 88. Also, control of the voice coil actuator is simpler than other actuators since output torque is a linear function of input coil current. In addition, since voice coil actuators do not require mechanical or electrical commutation as do other types of motors, the voice coil actuator has a longer life expectancy, less maintenance, and quiet operation. The actuation is frictionless, resulting in greater haptic fidelity and smoother feel to the user. The parts for voice coil actuators are inexpensive to produce and are readily available, resulting in a low cost way to provide realistic force feedback.

The specific embodiment of FIGS. 3*a* and 3*b* also has several advantages. One is that the coils 84*a* and 84*b* can be etched directly onto board 72, thus avoiding assembly time in wrapping separate wires. In addition, voice coil driver chips, as well as other electronic components of interface 16, can be coupled directly to board 72 and interconnected with traces on board 72 to control the actuators, providing a simple and low cost method of manufacture.

In alternate embodiments, the translatory motion of board 72 along axes X and Y can be converted to two rotary degrees of freedom for user object 12 using a ball joint, pendulum, or other mechanism. Flexures can also be used to prevent movement in undesired degrees of freedom to constrain board 72 to move only in X and Y directions and not "twist" in the X-Y plane. Such embodiments are described in U.S. Pat. No. 5,805,140.

Figure 4A:
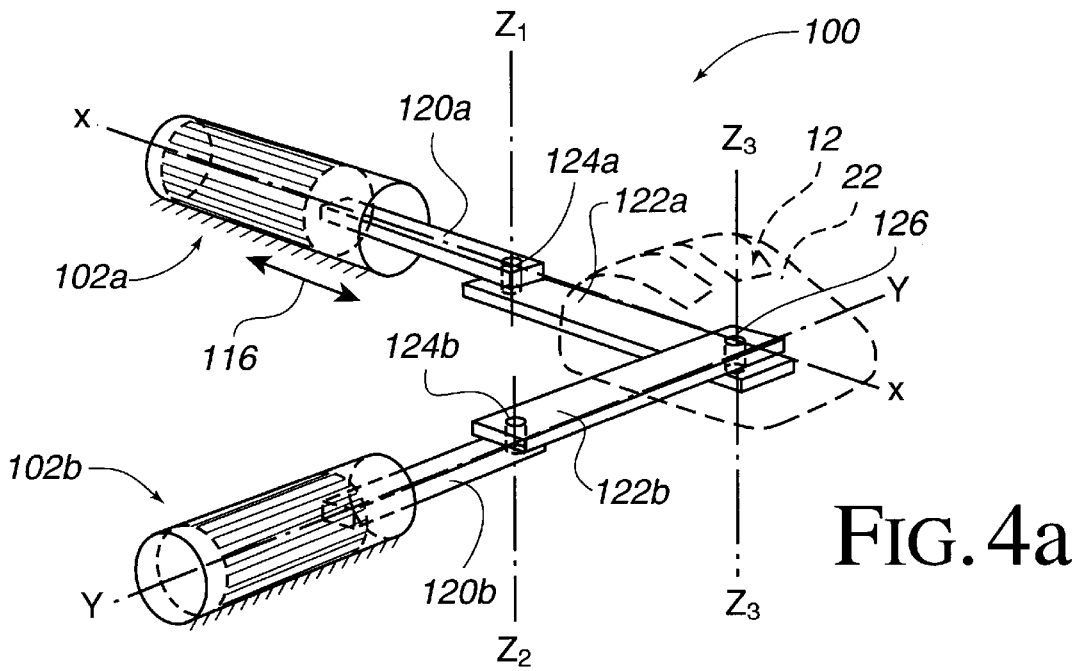
FIGS. 4a is a second embodiment having voice coil actuators for use with the interface system of FIG. 1.

FIG. 4a is a perspective view of an interface apparatus 100 in which two linear degrees of freedom are provided to user object 12 and linear voice coil actuators 102a and 102b are used to apply forces to the user object. Computer 18 (not shown) is preferably coupled to the voice coil actuators to apply current as desired.

Figure 4B:
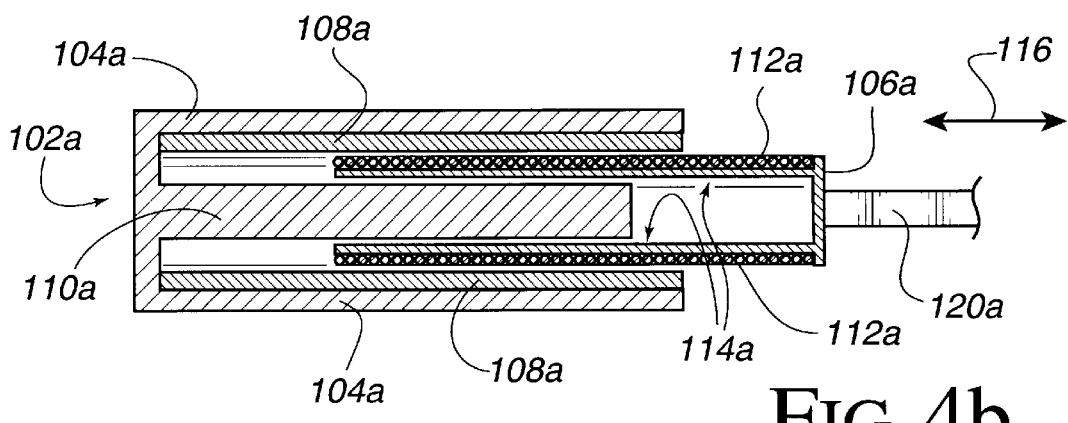
FIG. 4b is a sectional view of a linear voice coil actuator suitable for the embodiments of FIGS. 4a and 4c.

A side sectional view of an example of a linear voice coil actuator 102a or 102b is shown in FIG. 4b. Linear voice coil actuator 102a is a grounded actuator and includes a cylindrical magnetic flux housing 104a and a coil head 106a. Housing 104a can be made of iron or other ferrous metal and includes a radially polarized, tubular magnet 108a (which, alternatively, can be made up of multiple, smaller magnets) positioned along the inside length of the housing and which are radially magnetized. In addition, a core portion 110a of housing 104a preferably extends down the center of housing 104a through the center of coil head 106a. Coil head 106a includes a coil 112a which is wrapped around the coil head, similar to the coil 84a of FIG. 3a. An optional coil support 114a can be provided around which to wrap coil 112a. The coil head 106a moves within the housing 104a along a linear degree of freedom, indicated by arrows 116, when a current is flowed through coil 278a, similarly as described above. The direction of the coil head 106a depends on the direction of the applied current. In addition, the linear voice coil actuator can be used to sense the position of coil head 106a along the linear degree of freedom by sensing velocity as described above. Alternatively, separate linear motion sensors can be coupled to the object 12 or other members. Linear voice coil actuators are described in greater detail in U.S. Pat. No. 5,805,140.

Referring back to FIG. 4a, coil head 106a is preferably coupled to a first end of a shaft 120a, and a second end of shaft 120a is coupled to a first end of a joint member 122a. A rotary joint 124a couples shaft 120a to joint member 122a and allows joint member 122a to rotate about floating axis $Z_1$. A second end of joint member 122a is rotatably coupled to a second end of joint member 122b by a rotary joint 126, which provides an axis of rotation $Z_3$. User object 12 is preferably coupled to joint member 122b (or, alternatively, 122a). Linear voice coil actuator 102b has equivalent components to actuator 102a as shown in FIG. 4b. A rotary joint 124b couples shaft 120b to joint member 122b and allows joint member 122b to rotate about floating axis $Z_2$.

Object 12 can be translated by a user along linear axis X or linear axis Y, or along a combination of these axes. When object 12 is moved along axis X, then coil head 106a, shaft 120a, and joint member 122a are correspondingly moved along axis X and retain the same relative position as shown in FIG. 3a. However, joint member 122b rotates about floating axis $Z_2$ and floating axis $Z_3$ in accordance with the movement of joint member 122a. Likewise, when object 12 is moved along axis Y, then coil head 106b, shaft 120b, and joint member 122b are correspondingly moved and retain the relative positions as shown in FIG. 3a, while joint member 122a rotates about floating axes $Z_1$ and $Z_3$ in accordance with the movement of joint member 122b. When object 12 is moved simultaneously along both axes X and Y (e.g., object 12 is moved diagonally), then both joint members 122a and 122b rotate about their respective axes.

Figure 4C:
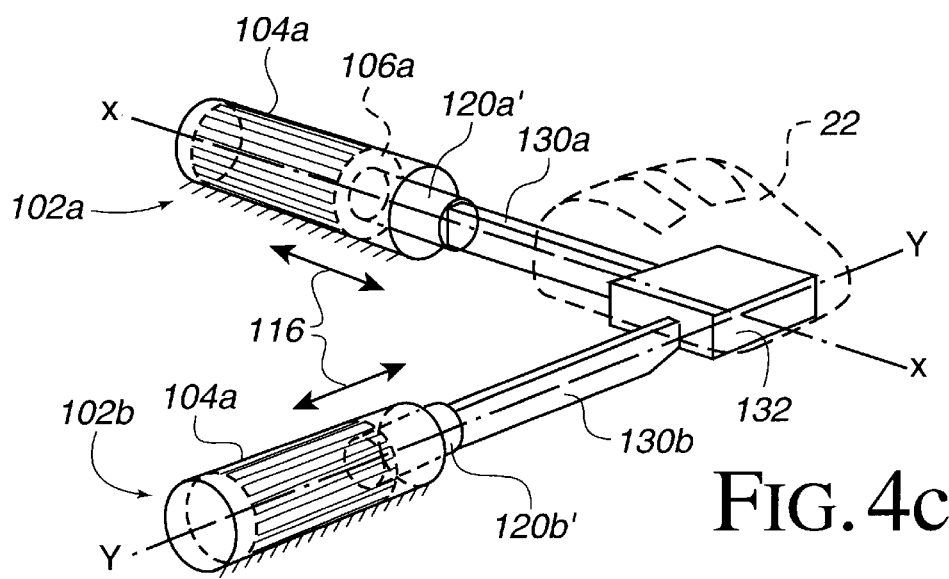
FIG. 4c is a third embodiment having voice coil actuators for use with the interface system of FIG. 1.

FIG. 4c is a schematic diagram of an alternate embodiment 100' of the interface apparatus 100 shown in FIG. 4a.

In FIG. 4c, two linear voice coil actuators 102a and 102b as shown in FIG. 3a are included to apply forces and sense positions in two linear degrees of freedom to object 12. Actuators 102a and 102b are substantially similar to those in FIG. 4a. As in FIG. 4a, coil heads 106a and 106b translate along linear degrees of freedom, indicated by arrows 116, within housings 104a and 104b, respectively. Current can be applied by computer 18 (or microprocessor) to apply force to the coil heads or sense velocity.

Shaft 120a' is coupled to a flexible member 130a. Flexible members 130a and 130b are preferably made of a resilient material such as flexible plastic, rubber, metal, or the like and can flex in a degree of freedom. Flexible members 130a and 130b are preferably narrow in the dimension that the rod is to bend, and wide in the dimensions in which the rod is to remain rigid. Shaft 120a' is a rigid member that couples member 130a to coil head 106a. Flexible member 130a is rigidly coupled to an object member 132 at its other end. Member 132 can be a part of object 12 or a platform or other base for supporting object 12. Shaft 120b ' is coupled to member 132 and object 12 through flexible member 130b in a similar manner.

Object 44 can be moved by a user along linear axis X or linear axis Y. Flexible members 130a and 130b flex (bend) appropriately as the object is moved. For example, if object 12 and member 132 are moved along axis X, flexible member 130a does not bend since the direction of movement is directed down (substantially parallel to) the longitudinal axis of flexible member 130a. However, since housing 104b is grounded relative to object 12, flexible member 130b bends toward or away from actuator 102a (depending on the object's direction along axis X) to allow the translation of object 12. Likewise, when object 12 is translated along axis Y in the other linear degree of freedom, flexible member 130b does not flex and flexible member 130a bends toward or away from actuator 102b to allow the translation of object 12. When object 12 is moved simultaneously along both axes X and Y (e.g., object 12 is moved diagonally), then both flexible members 130a and 130b flex in conjunction with the movement.

Figure 5:
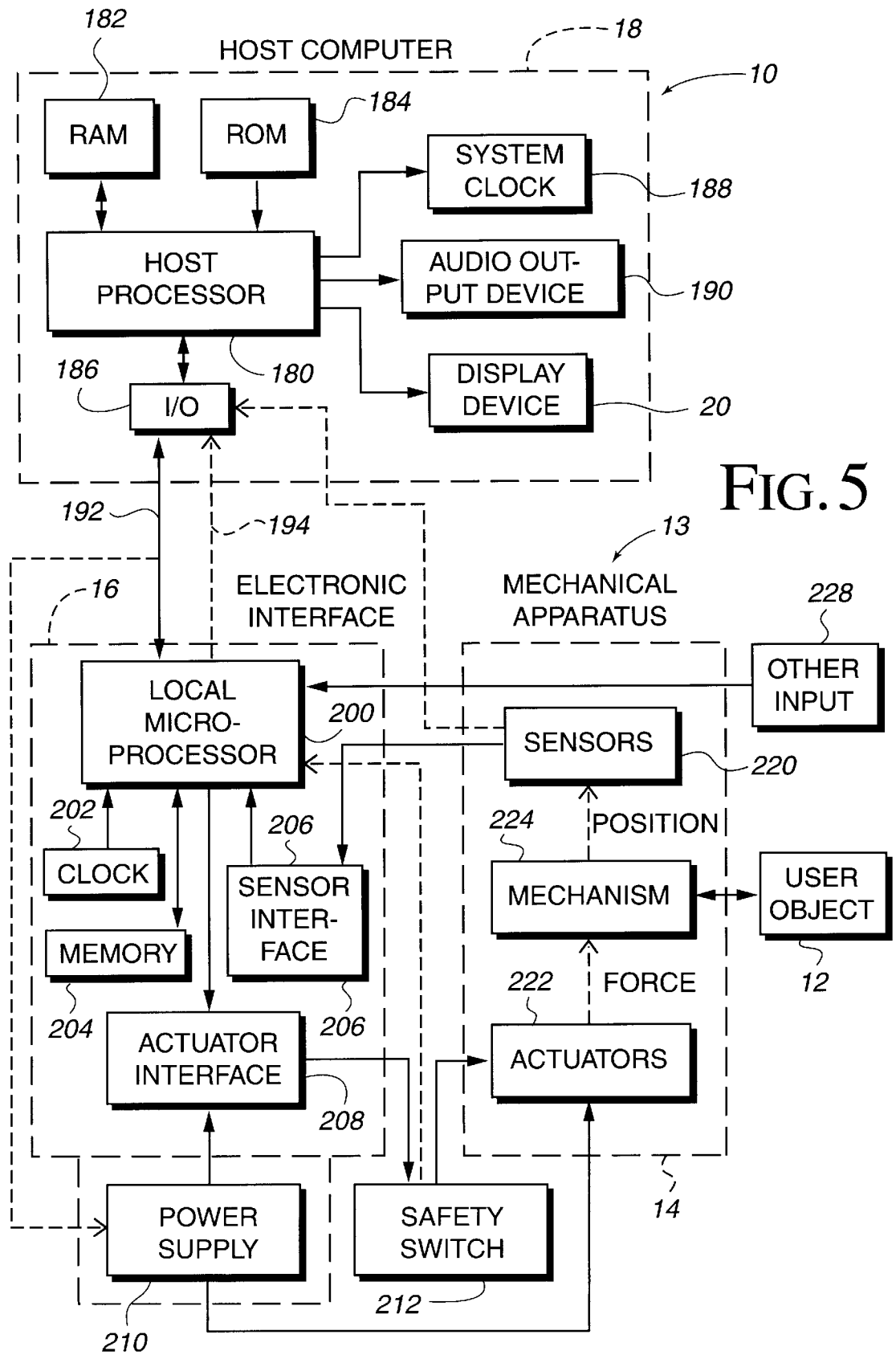
FIG. 5 is a block diagram of the system of FIG. 1 for controlling a force feedback interface device of the present invention.

FIG. 5 is a block diagram illustrating electronic interface 16 and host computer 18 suitable for use with the present invention. Interface system 10 includes a host computer 18, electronic interface 16, mechanical apparatus 14, and user object 12. Electronic interface 16, mechanical apparatus 14, and user object 12 can also collectively be considered a "force feedback interface device" 13 that is coupled to the host. A similar system is described in detail in U.S. Pat. No. 5,734,373, which is hereby incorporated by reference herein in its entirety.

As explained with reference to FIG. 1, computer 18 is preferably a personal computer, workstation, video game console, or other computing or display device. Host computer system 18 commonly includes a host microprocessor 180, random access memory (RAM) 182, read-only memory (ROM) 184, input/output (I/O) electronics 186, a clock 188, a display device 20, and an audio output device 190. Host microprocessor 180 can include a variety of available microprocessors from Intel, AMD, Motorola, or other manufacturers. Microprocessor 180 can be single microprocessor chip, or can include multiple primary and/or co-processors. Microprocessor preferably retrieves and stores instructions and other necessary data from RAM 182 and ROM 184 as is well known to those skilled in the art. In the described embodiment, host computer system 18 can receive sensor data or a sensor signal via a bus 192 from sensors of apparatus 14 and other information. Microprocessor 180 can receive data from bus 192 using I/O electronics 186, and can use I/O electronics to control other peripheral devices. Host computer system 18 can also output commands to interface device 13 via bus 192 to cause force feedback for the interface system 10.

Clock 188 is a standard clock crystal or equivalent component used by host computer 18 to provide timing to electrical signals used by host microprocessor 180 and other components of the computer system 18. Clock 188 is accessed by host computer 18 in the control process of the present invention to provide timing information that may be necessary in determining force or position, e.g., calculating a velocity or acceleration from position values.

Display device 20 is described with reference to FIG. 1. Audio output device 190, such as speakers, can be coupled to host microprocessor 180 via amplifiers, filters, and other circuitry well known to those skilled in the art. Host processor 180 outputs signals to speakers 190 to provide sound output to the user when an "audio event" occurs during the implementation of the host application program. Other types of peripherals can also be coupled to host processor 180, such as storage devices (hard disk drive, CD ROM drive, floppy disk drive, etc.), printers, and other input and output devices.

Electronic interface 16 is coupled to host computer system 18 by a bi-directional bus 192. The bidirectional bus sends signals in either direction between host computer system 18 and the interface device 13. Bus 192 can be a serial interface bus providing data according to a serial communication protocol, a parallel bus using a parallel protocol, or other types of buses. An interface port of host computer system 18, such as an RS232 serial interface port, connects bus 192 to host computer system 18. In another embodiment, an additional bus 194 can be included to communicate between host computer system 18 and interface device 13. Bus 194 can be coupled to a second port of the host computer system, such as a "game port", such that two buses 192 and 194 are used simultaneously to provide a increased data bandwidth.

One preferred serial interface used in the present invention is the Universal Serial Bus (USB). The USB standard provides a relatively high speed serial interface that can provide force feedback signals in the present invention with a high degree of realism. USB can also source power to drive actuators and other devices of the present invention. Since each device that accesses the USB is assigned a unique USB address by the host computer, this allows multiple devices to share the same bus. In addition, the USB standard includes timing data that is encoded along with differential data.

Electronic interface 16 includes a local microprocessor 200, local clock 202, local memory 204, sensor interface 206, and actuator interface 208. Interface 16 may also include additional electronic components for communicating via standard protocols on buses 192 and 194. In various embodiments, electronic interface 16 can be included in mechanical apparatus 14, in host computer 18, or in its own separate housing. Different components of interface 16 can be included in apparatus 14 or host computer 18 if desired.

Local microprocessor 200 preferably coupled to bus 192 and may be closely linked to mechanical apparatus 14 to allow quick communication with other components of the interface device. Processor 200 is considered "local" to interface device 13, where "local" herein refers to processor 200 being a separate microprocessor from any processors 180 in host computer 18. "Local" also preferably refers to processor 200 being dedicated to force feedback and sensor I/O of the interface system 10, and being closely coupled to sensors and actuators of the mechanical apparatus 14, such as within the housing of or in a housing coupled closely to apparatus 14. Microprocessor 200 can be provided with software instructions to wait for commands or requests from computer host 18, parse/decode the command or request, and handle/control input and output signals according to the command or request. In addition, processor 200 preferably operates independently of host computer 18 by reading sensor signals and calculating appropriate forces from those sensor signals, time signals, and force processes selected in accordance with a host command, and output appropriate control signals to the actuators. Suitable microprocessors for use as local microprocessor 200 include the MC68HC711E9 by Motorola and the PIC16C74 by Microchip, for example. Microprocessor 200 can include one microprocessor chip, or multiple processors and/or co-processor chips. In other embodiments, microprocessor 200 can include digital signal processor (DSP) functionality.

For example, in one host-controlled embodiment that utilizes microprocessor 200, host computer 18 can provide low-level force commands over bus 192, which microprocessor 200 directly transmits to the actuators. In a different local control embodiment, host computer system 18 provides high level supervisory commands to microprocessor 200 over bus 192, and microprocessor 200 manages low level force control loops to sensors and actuators in accordance with the high level commands and independently of the host computer 18. In the local control embodiment, the microprocessor 200 can process inputted sensor signals to determine appropriate output actuator signals by following the instructions of a "force process" that may be stored in local memory and includes calculation instructions, formulas, force magnitudes, or other data. The force process can command distinct force sensations, such as vibrations, textures, jolts, or even simulated interactions between displayed objects. Sensor signals used by microprocessor 200 are also reported to host computer system 18, which updates a host application program and outputs force control signals as appropriate. For example, if the user moves a puck 22, the computer system 18 receives position and/or other signals indicating this movement and can move a displayed cursor in response. These embodiments are described in greater detail in U.S. Pat. Nos. 5,939,811 and 5,734,373. In an alternate embodiment, no local microprocessor 200 is included in interface system 10, and host computer 18 directly controls and processes all signals to and from the interface 16 and mechanical apparatus 14.

A local clock 202 can be coupled to the microprocessor 200 to provide timing data, similar to system clock 188 of host computer 18; the timing data might be required, for example, to compute forces output by actuators 30 (e.g., forces dependent on calculated velocities or other time dependent factors). In alternate embodiments using the USB communication interface, timing data for microprocessor 200 can be retrieved from the USB interface.

Local memory 204, such as RAM and/or ROM, is preferably coupled to microprocessor 200 in interface 16 to store instructions for microprocessor 200 and store temporary and other data. Microprocessor 200 may also store calibration parameters in a local memory 204 such as an EEPROM. Memory 204 may be used to store the state of the force feedback device, including current control mode and the location of current isometric origin (described in FIG. 12).

Sensor interface 206 may optionally be included in electronic interface 16 convert sensor signals to signals that can be interpreted by the microprocessor 200 and/or host computer system 18. For example, sensor interface 206 can receive signals from a digital sensor such as an encoder and converts the signals into a digital binary number representing the position of a shaft or component of mechanical apparatus 14. An analog to digital converter (ADC) in sensor interface 206 can convert a received analog signal to a digital signal for microprocessor 200 and/or host computer 18. Such circuits, or equivalent circuits, are well known to those skilled in the art. Alternately, microprocessor 200 can perform these interface functions without the need for a separate sensor interface 206. Or, sensor signals from the sensors can be provided directly to host computer system 18, bypassing microprocessor 200 and sensor interface 206. Other types of interface circuitry 206 can also be used. For example, an electronic interface is described in U.S. Pat. No. 5,576,727, which is hereby incorporated by reference herein.

Actuator interface 208 can be optionally connected between the actuators of apparatus 14 and microprocessor 200. Interface 208 converts signals from microprocessor 200 into signals appropriate to drive the actuators. Interface 208 can include power amplifiers, switches, digital to analog controllers (DACs), and other components. Such interfaces are well known to those skilled in the art. In alternate embodiments, interface 208 circuitry can be provided within microprocessor 200 or in the actuators.

Power supply 210 can optionally be coupled to actuator interface 208 and/or actuators 222 to provide electrical power. Active actuators typically require a separate power source to be driven. Power supply 210 can be included within the housing of interface 16 or apparatus 14, or can be provided as a separate component, for example, connected by an electrical power cord. Alternatively, if the USB or a similar communication protocol is used, actuators and other components can draw power from the USB and thus have no (or minimal) need for power supply 210. This embodiment is most applicable to an apparatus 14 having passive or other actuators requiring little power to operate. Active actuators tend to require more power than can be drawn from USB, but this restriction can be overcome in a number of ways. One way is to configure interface 16 and apparatus 14 to appear as more than one peripheral to host computer 18; for example, each provided degree of freedom of user object 12 can be configured as a different peripheral and receive its own allocation of power. Alternatively, power from the USB can be stored and regulated by interface 16 or apparatus 14 and thus used when needed to drive actuators 222. For example, power can be stored over time and then immediately dissipated to provide a jolt force to the user object 12. A capacitor circuit, for example, can store the energy and dissipate the energy when enough power has been stored. This power storage embodiment can also be used in non-USB embodiments to allow a smaller power supply 210 to be used.

Mechanical apparatus 14 is coupled to electronic interface 16 preferably includes a sensors 220, actuators 222, and mechanism 224. Sensors 220 sense the position, motion, and/or other characteristics of a user object 12 along one or more degrees of freedom and provide signals to microprocessor 200 including information representative of those characteristics. Typically, a sensor 220 is provided for each degree of freedom along which object 12 can be moved, or, a single compound sensor can be used for multiple degrees of freedom. Example of sensors suitable for embodiments described herein are digital rotary optical encoders, which sense the change in position of an object about a rotational axis and provide digital signals indicative of the change in position. Linear optical encoders may similarly sense the change in position of object 34 along a linear degree of freedom. A suitable optical encoder is the "Softpot" from U.S. Digital of Vancouver, Wash. Alternatively, analog sensors such as potentiometers can be used. It is also possible to use non-contact sensors at different positions relative to mechanical apparatus 14, such as Polhemus (magnetic) sensors for detecting magnetic fields from objects, or an optical sensor such as a lateral effect photo diode having an emitter/detector pair. In addition, velocity sensors (e.g., tachometers) for measuring velocity of object 12 and/or acceleration sensors (e.g., accelerometers) for measuring acceleration of object 12 can be used. Furthermore, either relative or absolute sensors can be employed.

Actuators 222 transmit forces to user object 12 in one or more directions along one or more degrees of freedom in response to signals output by microprocessor 200 and/or host computer 18, i.e., they are "computer controlled." Typically, an actuator 222 is provided for each degree of freedom along which forces are desired to be transmitted. Actuators 222 can include two types: active actuators and passive actuators. Active actuators include linear current control motors, stepper motors, pneumatic/hydraulic active actuators, a torquer (motor with limited angular range), a voice coil actuator as described with reference to FIGS. 3 and 4, and other types of actuators that transmit a force to an object. Passive actuators can also be used for actuators 222, such as magnetic particle brakes, friction brakes, or pneumatic/hydraulic passive actuators, and generate a damping resistance or friction in a degree of motion. In yet other embodiments, passive (or "viscous") damper elements can be provided on the bearings of apparatus 14 to remove energy from the system and intentionally increase the dynamic stability of the mechanical system. In addition, in voice coil embodiments, multiple wire coils can be provided, where some of the coils can be used to provide back EMF and damping forces. In some embodiments, all or some of sensors 220 and actuators 222 can be included together as a sensor/actuator pair transducer.

Mechanism 224 can be one of several types of mechanisms, including those described above in FIGS. 2–4. For example, mechanisms disclosed in co-pending patent applications Ser. Nos. 08/664,086, and 08/709,012, and U.S. Pat. Nos., 5,576,727, 5,623,582, 5,731,804, 5,767,839, 5,721,566, 5,805,140, 5,691,898 all hereby incorporated by reference herein in their entirety, can be included. User object 12 can be a puck, joystick, or other device or article coupled to mechanism 220, as described above.

Other input devices 228 can optionally be included in interface system 10 and send input signals to microprocessor 200 and/or host computer 18. Such input devices can include buttons, such as buttons 140 on puck 22, used to supplement the input from the user to a GUI, game, simulation, etc. Also, dials, switches, voice recognition hardware (with software implemented by host 18), or other input mechanisms can be used.

Safety or "deadman" switch 212 is preferably included in interface device to provide a mechanism to allow a user to override and deactivate actuators 222, or require a user to activate actuators 222, for safety reasons. Certain types of actuators, especially active actuators such as motors, can pose a safety issue for the user if the actuators unexpectedly move user object 12 against the user with a strong force. In addition, if a failure in the system 10 occurs, the user may desire to quickly deactivate the actuators to avoid any injury. To provide this option, safety switch 212 is coupled to actuators 222. In the preferred embodiment, the user must continually activate or close safety switch 212 during manipulation of user object 12 to activate the actuators 222. If, at any time, the safety switch is deactivated (opened), power from power supply 210 is cut to actuators 222 (or the actuators are otherwise deactivated) as long as the safety switch is deactivated. For example, one embodiment of safety switch is a mechanical or optical switch located on user object 12 or on a convenient surface of a housing enclosing apparatus 14. For example, when the user covers an optical safety switch with a hand or finger, the sensor of the switch is blocked from sensing ambient light, and the switch is closed. The actuators 222 thus will function as long as the user covers the switch. Other types of safety switches 212 can also be used, such as an electrostatic contact switch can be used to sense contact of the user. A preferred safety switch is described with reference to FIG. 6b. The safety switch can be provided between the actuator interface 208 and actuators 222 as shown in FIG. 5; or, the switch can be placed elsewhere. In some embodiments, the state of the safety switch is provided to the microprocessor 200 to provide further control over output forces. In addition, the state of the safety switch can be sent to the host 18, which can choose to stop sending force feedback commands if the safety switch is open. In yet other embodiments, a second switch can be provided to allow the user to turn off output forces of interface device 13 when desired, yet still operate the interface as an input device. The host 18 need not send force feedback commands when such a secondary switch has turned off forces.

In some embodiments of interface system 10, multiple mechanical apparatuses 14 and/or electronic interfaces 16 can be coupled to a single host computer system 18 through bus 192 (or multiple buses 192) so that multiple users can simultaneously interface with the host application program (in a multi-player game or simulation, for example). In addition, multiple players can interact in the host application program with multiple interface systems 10 using networked host computers 18, as is well known to those skilled in the art.

Figure 6A:
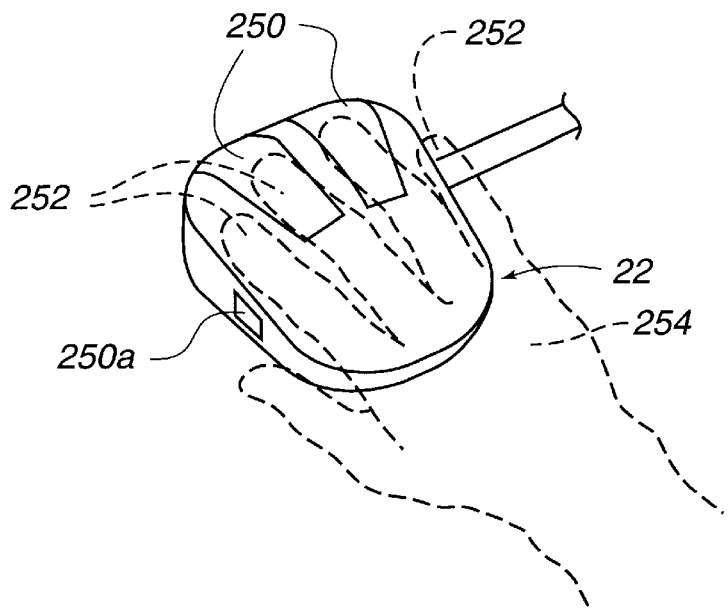
FIG. 6a is a perspective view of a puck interface object for use with the interface system of FIG. 1.

FIG. 6a is a perspective view of a puck 22 suitable for use with the present invention as user object 12. Puck 22 can be shaped to comfortably fit a user's fingers and/or hand when the user manipulates the puck. For example, puck 22 can be shaped much like a standard mouse used for inputting information to a computer system. The puck can take a variety of shapes in different embodiments, from a small knob to a grip having indentations for the user's fingers.

Similar to a mouse, puck 22 may include other input devices 228 such as buttons 250 which are within easy reach of a user's fingers. Additional buttons 250 may also be included on the top surface or on the side surfaces of puck 22 for added functionality, such as button 250a. For example, button 250a may conveniently be used to select isotonic mode or isometric mode of the present invention, as discussed below. Buttons 250 allow a user to input a command independently of the position of the puck 22 in the provided degrees of freedom. For example, in a GUI, buttons are commonly used to select options once a cursor has been guided to a desired area or object on the screen using the position of the puck or mouse. In one embodiment, the user can place his or her two middle fingers on to buttons 250 and place the remaining fingers on the sides of puck 22 to manipulate puck 22 against forces generated by mechanical apparatus 14. In addition, the fingers 252 of a user may move the puck 22 and press buttons 250 while the palm 254 of the hand remains fixed or resting against a grounded surface such as pad 24 (see FIG. 1). Since the fingers are more sensitive to output forces than the entire hand, forces of less magnitude may be output from the interface device 13 to the fingers and achieve an equivalent force sensation to higher magnitude forces applied to the entire hand (as with a joystick). Thus, less powerful actuators and less power consumption by the actuators is required when the user manipulates the puck 22 with fingers alone.

Figure 6B:
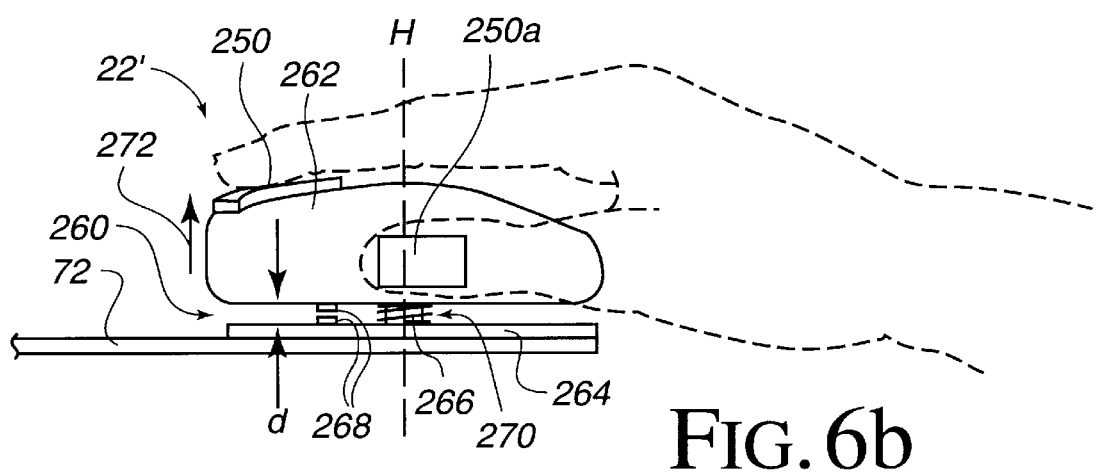
FIG. 6b is a side elevational view of the puck of FIG. 6a showing a safety switch.

As shown in FIG. 6b, puck 22 may also include a safety switch 212 (also known as a "deadman switch"). The safety switch preferably deactivates any generated forces on the puck when the puck is not in use and/or when the user desires to deactivate output forces. As described above, the safety switch can be implemented in a variety of ways. In FIG. 5b, a preferred way to implement a safety switch 212 is to use a hand-weight safety switch 260. As implemented, the user must activate or close the switch before actuators 222 are able to output forces. This is a safety feature that prevents the user object 12 from unexpectedly moving and impacting the user when the user is not controlling the user object.

Puck 22' including safety switch 260 includes a translatable grip portion 262, a base 264, a spring 266, and switch contacts 268. Portion 262 may be shaped like puck 22 described above, but can also be replaced with other types of user objects 12. Portion 262 can be moved along axis H within a range distance d of the base 264 preferably on an extension member 270 or other similar guide. Distance d is preferably relatively small, such as 1 millimeter, and is exaggerated in FIG. 6b for clarity. Pre-loaded spring 266 preferably forces grip portion 262 away from base 264 in a direction indicated by arrow 272 to an "open" position when no weight is placed on portion 262. Preferably, a stop (not shown) coupled to the top of member 270 or to the bottom of portion 262 prevents the grip portion from being detached from the base 264. A limit to movement of portion 262 in the direction of base 264 is provided by the physical engagement of the grip portion and base.

Switch contacts 268 are provided between the base 264 and grip portion 262 of puck 22.' Contacts 268 are connected by a bus to the host computer 18 or microprocessor 200, which can monitor when the contacts are touching. When the grip portion 262 is in the open position, contacts 268 are separated and no electrical current can flow between them, and thus no electrical current or power can flow to the actuators from the power supply. Alternatively, contacts 268 can be connected to microprocessor 200 or another selecting component which can detect the open state of the contacts and can deactivate actuators 222 with a safety disable signal when the open state is detected. The actuators 222 are thus prevented from outputting forces when the user does not have control of the grip portion 262 and the interface device 13.

When a user grasps portion 262, the weight of the user's hand forces the grip portion 262 down to engage the base 264. Switch contacts 268 connect from this engagement and allow current to flow between them. Contacts 268 complete the circuit from the actuators to the power supply, and power is thus allowed to flow from the power supply to the actuators. Alternatively, microprocessor 200 detects the closed contact condition and discontinues sending a safety disable signal to actuators 222. This allows the actuators 222 to be controlled and activated by host computer 18 and microprocessor 200 normally. When the user releases the grip portion from his or her grasp, the spring 266 forces the grip portion 262 away from base 264, which separates contacts 268 and deactivates the actuators.

The hand-weight safety switch has several advantages over other types of safety switches. The user can simply rest his or her fingers or hand on puck 22' in a normal, comfortable fashion and still activate the safety switch due to the weight of the user's hand. Thus, the user need not cover or press an awkwardly-located switch in a particular location of the puck.

In alternate embodiments, other types of safety switches may be used. For example, a mechanical button safety switch similar to buttons 250 can be provided which makes an electrical contact when the weight of the user's hand presses on the puck. Contact switches, light detectors, and other types of switches which the user contacts or covers during operation of the user object can be provided, but may be more awkward to use during operation of the user object since the user must constantly contact or cover a specific area of the user object or device housing. Hand-weight safety switch 262 can be used to supplement a different type of safety switch.

Figure 6C:
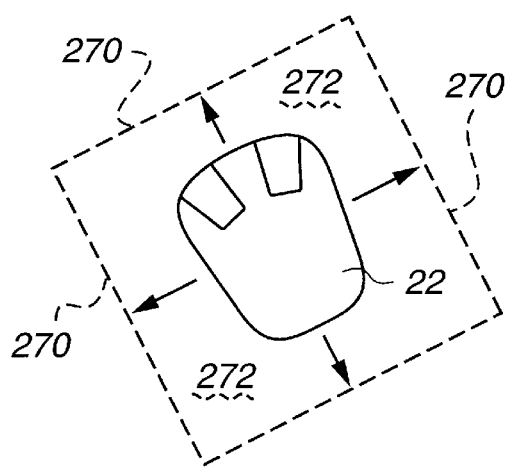

FIG. 6c is a diagram for illustrating an indexing feature of the present invention. The puck 22 preferably has an "indexing mode" which allows the user to redefine the offset between the positions of the user object 12 and a user-controlled graphical object, such as a cursor, displayed by host computer 18. Indexing is inherently provided with a traditional position control interface such as a mouse. For example, in a GUI, the position of the mouse controls the position of a cursor in the GUI. Sometimes, a limit to the mouse's movement is reached, such as a limit to available physical space, a limit to a mousepad, etc. In such a situation, the user typically lifts the mouse from the contacted surface and places the mouse in a different position to allow more room to move the mouse. While the mouse is off the contacted surface, no input is provided to control the cursor.

Puck 22 of the present invention has a similar limit to movement in the provided planar workspace. The limit may be dictated by mechanical apparatus 14; e.g., the limits shown by lines 91 of FIG. 3 or other limits provided by linkage 30 of FIG. 2 or voice coil actuators of FIGS. 3 and 4. Such limits are indicated as dashed lines 270 in FIG. 6c such that the puck 22 has a workspace 272 within the dashed rectangle (or circle, in some embodiments). In the preferred embodiment, the workspace 272 is small (e.g., 1"×1"), since it has been found that very little workspace is needed to move a cursor across the full width or length of a display screen. Nevertheless, a limit 270 to the movement of puck 22 may be reached in a situation where the user wishes to move the puck past the limit. For example, puck 22 may reach the right limit 270 before the controlled cursor is fully moved to a desired location at the right of the screen. In other situations, the user might desire to reposition puck 22 without providing any input to the graphical environment of host computer 18, such as to reposition puck 22 to a more comfortable position, etc.

To allow movement past the limits 270, indexing is implemented. This allows the user to reposition the puck 22 without moving the controlled graphical object or providing any other input to the host computer, thus allowing the user to redefine the offset between the object's position and the cursor's position. Since the puck does not roll over a surface like a traditional mouse, the puck cannot simply be picked up and repositioned. In the present invention, indexing is achieved through an input device 228. Such input devices can include one or more buttons, switches, pressure sensors, optical sensors, contact sensors, voice recognition hardware, or other input devices. For example, a specialized indexing button can be provided which can be pressed by the user; such a button can be a traditional button 250 or 250a or a hand weight switch 260. As long as the indexing button is held down, the user object 12 is in indexing mode and can be moved without moving the controlled graphical object (in isotonic mode) and without activating or affecting any implemented isometric function (in isometric mode). When the button is released and non-indexing mode is resumed, the position of the cursor is again controlled by the position of the user object (both isotonic and isometric modes are preferably only functional in non-indexing mode). Alternatively, the user might toggle indexing mode and non-indexing mode with one press of a button 250 or other input device. Thus, the user can move puck 22 (or other user object 12) to a desired position in the planar workspace without providing input.

In one preferred embodiment, the functionality of the safety switch 212 and the indexing mode are integrated into one input device, since it is typically desirable to deactivate any output forces to the user object 12 when indexing is being performed for safety reasons. Preferably, the hand weight safety switch 260 shown in FIG. 6b can be used as both a safety switch and an indexing switch. For example, when the user places his or her fingers on puck 22, the switch 260 is closed, allowing power to the actuators and forces to be output on the puck. This also allows non-indexing mode to be active so that positions of cursor and puck are directly mapped. If the user moves the puck to a limit 270, the user then reduces the weight on the puck, e.g., by lifting fingers off the puck. This opens switch 260, thereby disabling power to the actuators and engaging indexing mode. The user can move puck 22 to another position using side motion (so as to not close switch 260), while the cursor remains fixed at its old position on the screen. When the puck is at its new desired location, the user rests his or her fingers on the puck 22 normally, thereby closing the switch 260. This allows indexing to be performed safely, without the need to provide a separate safety switch to deactivate the actuators 222.

Indexing mode can be performed directly by the host computer 18. Alternatively, in those embodiments including local microprocessor 200, the indexing is performed by the local processor. For example, local processor 200 can determine when indexing mode is active, and simply not report the position of the user object 12 to the host computer 18 while such mode is active. When non-indexing mode is active, processor 200 would resume reporting the position of the user object to the host. The host would be completely ignorant of when indexing is performed, thereby reducing its computational burden.

Figure 7A:
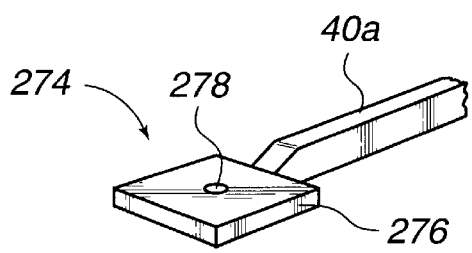
FIGS. 7a–7d are perspective views of alternate embodiments of the interface object for use with the interface system of FIG. 1.
Figure 7B:
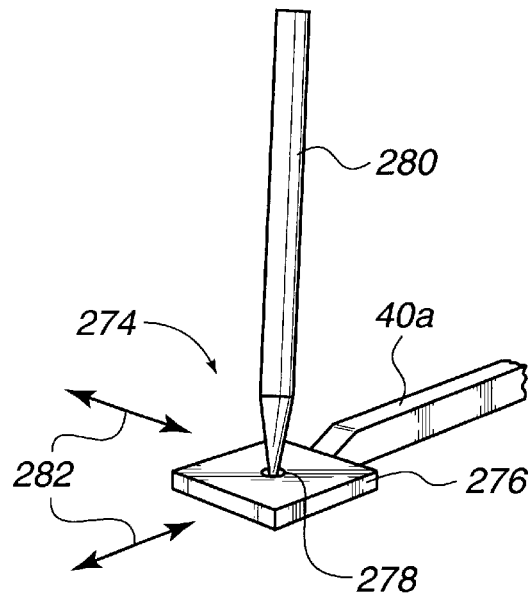

FIG. 7a is a perspective view of an alternate embodiment of user object 12. Object 12 is shown as a stylus-receiving user object 274, which can be coupled to any embodiment of mechanical apparatus 14, such as those embodiments presented above. Stylus-receiving user object 274 includes a stylus-receiving member 276, which is preferably a flat, small object that includes a stylus aperture 278. Member 276 may, for example, be coupled to member 40a of the embodiment of mechanical apparatus 14 shown in FIG. 2; or, the member 276 may be coupled to board 72 of the embodiment of FIG. 3a or be coupled to (or replace) member 132 of the embodiment of FIGS. 4a–c. As shown in FIG. 7b, a stylus 280 or a similar pointed article can be inserted into aperture 278 by a user. The user can then move the stylus 280 along a provided degree of freedom indicated by arrows 282, which causes member 276 to accordingly move in the same direction. Alternatively, stylus 280 can be permanently coupled to member 276.

The embodiment of FIGS. 7a–b can be used in a writing interface where the user uses the interface to write words input to a computer system, or in a pointing interface to direct and move computer-implemented objects such as a cursor. The member 276 alone can be considered the "user object" 12 in this embodiment. Alternatively, both stylus 280 and member 276 can collectively be considered user object 12, particularly in embodiments where stylus 280 is permanently fixed to member 276. In other embodiments, the member 276 can be detachable from mechanical apparatus 14 so as to allow different, interchangeable user objects 12 to be used as suited for particular applications.

Figure 7C:
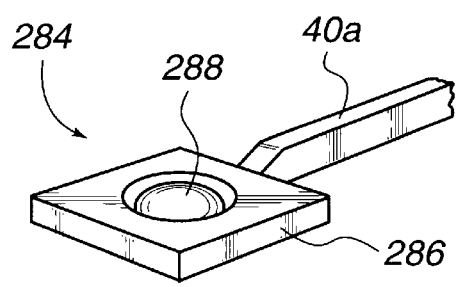
Figure 7D:
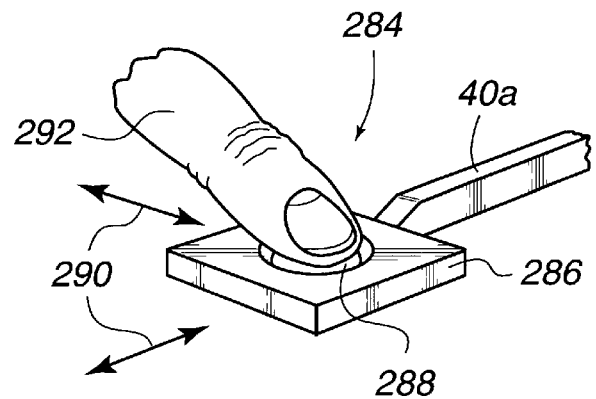

FIG. 7c is a perspective view of an alternate embodiment of user object 12 in which a finger-receiving user object 284 is provided. In this embodiment, a finger-receiving member 286, which includes a divot 288. Member 286 may be coupled to apparatus 14 similarly to the member 276 of FIG. 7a. As shown in FIG. 7d, a user may insert his or her finger into divot 288 and thereby move member 286 in the provided degrees of freedom as indicated by arrows 290. Divot 288 allows the user's finger to grip or cling to the member 286 when the user's finger is moved. In other embodiments, features other than or in addition to divot 288 can be provided on finger-receiving member 286 to allow the user's finger to cling to the object. For example, one or more bumps, apertures, or other projections can be provided. Also, other digits or appendages of the user can be received, such as a user's entire hand, foot, etc. The user object of FIGS. 7c–d can be used to allow the user to move, point to, or otherwise manipulate computer generated objects in an easy, natural fashion.

Figure 8:
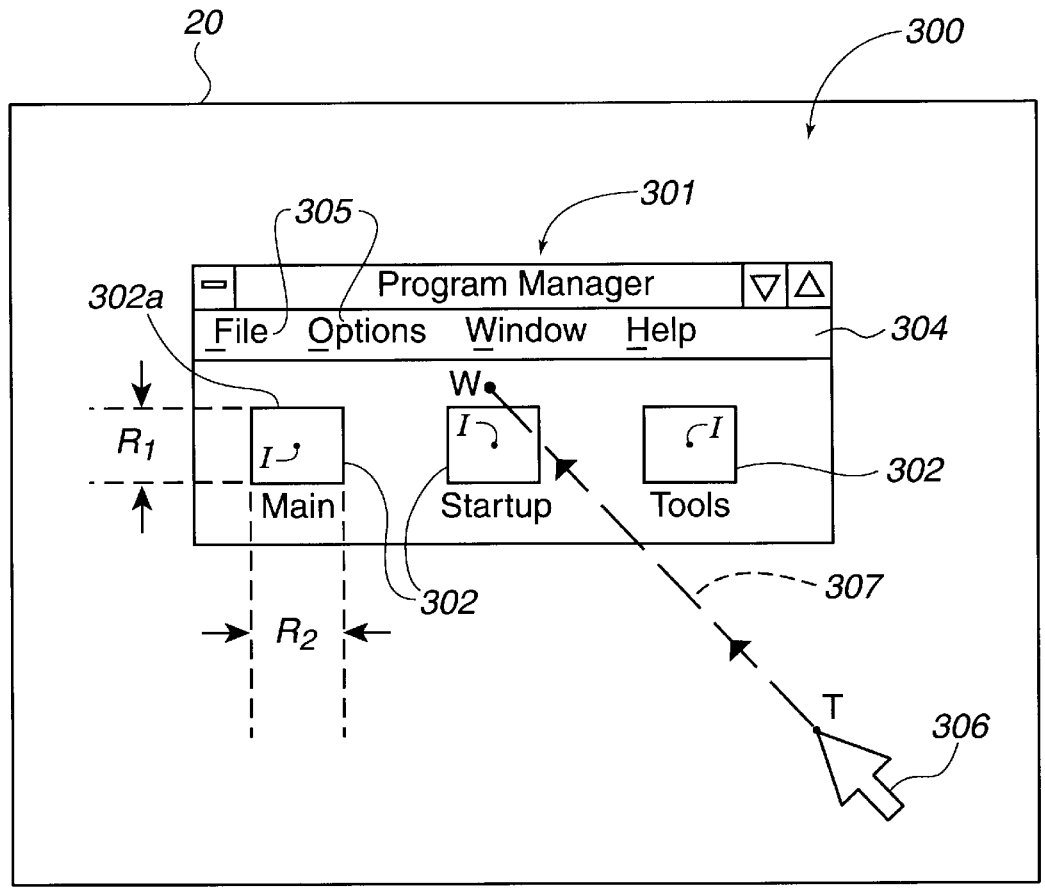
FIG. 8 is a diagrammatic illustration of a display screen showing a graphical user interface (GUI) and the interaction of forces with a user-controlled cursor in the isotonic mode of the present invention.

FIG. 8 is a diagrammatic illustration of display screen 20 displaying a graphical user interface (GUI) 300 used for interfacing with an application program and/or operating system implemented by computer system 18. A preferred embodiment of the present invention implements force feedback technologies in isotonic mode to embellish a graphical user interface with physical sensations. By communicating with interface 16 and apparatus 14 (or a similar force feedback apparatus), the computer 18 can present not only standard visual and auditory information to the user, but also physical forces. These physical forces can be carefully designed to enhance manual performance in at least two ways. First, physical forces can be used to provide haptic sensory cues on user object 12 which increase a user's perceptual understanding of the GUI spatial "landscape" portrayed on display screen 20. Second, computer-generated forces can be used to provide physical constraints or assistive biases which actually help the user acquire and maintain the cursor at a given target displayed on screen 20 within GUI 300. A detailed explanation of forces provided within a GUI or other graphical environment is disclosed in co-pending patent application Ser. No. 08/571,606, incorporated by reference herein in its entirety.

Herein, the manual tasks of the user to move a cursor displayed on screen 20 by physically manipulating physical user object 12 in order to command the cursor to a desired location or displayed object, are described as "targeting" activities. "Targets," as referenced herein, are defined regions in the GUI 300 to which a cursor may be moved by the user that are associated with one or more forces and which are typically associated with graphical objects of GUI 300. Such targets can be associated with, for example, graphical objects such as icons, pull-down menu items, and buttons. A target usually is defined as the exact dimensions of its associated graphical object, and is superimposed and "attached" to its associated graphical object such that the target has a constant spatial position with respect to the graphical object. In the GUI context, "graphical objects" are those images appearing on the display screen which the user may select with a cursor to implement a function of an application program or operating system, such as displaying images, executing an application program, or performing another computer function. For simplicity, the term "target" may refer to the entire graphical object with which the target is associated. Thus, an icon or window itself is often referred to herein as a "target." However, more generally, a target need not follow the exact dimensions of the graphical object associated with the target. For example, a target can be defined as either the exact displayed area of an associated graphical object, or the target can be defined as only a portion of the graphical object. The target can also be a different size and/or shape than its associated graphical object, and may even be positioned a distance away from its associated graphical object. The entire screen or background of GUI 300 can also be considered a "target" which may provide forces on user object 12. In addition, a single graphical object can have multiple targets associated with it.

Upon moving the cursor to the desired target, the user typically maintains the cursor at the acquired target while providing a "command gesture" associated with a physical action such as pressing a button, squeezing a trigger, or otherwise providing a command to execute a particular (isotonic) program function associated with the target. The command gesture can be provided from other input device 228 as shown in FIG. 5. For example, the "click" (press) of a physical button positioned on a mouse while the cursor is on an icon allows an application program that is associated with the icon to execute. Likewise, the click of a button while the cursor is on a portion of a window allows the user to move or "drag" the window across the screen by moving the user object. The command gesture can be used to modify forces or for other functions in the present invention as well. Or, the command gesture can be provided by manipulating the physical object of the interface device within designated degrees of freedom and/or with graphical objects displayed on the screen. In other embodiments, graphical objects on the screen can provide a command gesture when manipulated by a user. For example, a spring force on user object 12 can be associated with pressing a graphical button with a cursor to provide the feel of a mechanical button.

The discussion below will build upon a concept of GUI targets being included in a particular hierarchy of levels in relation to each other. A first target that is included or grouped within a second target is considered a "child" of the second target and lower in the hierarchy than the second target. For example, the display screen 20 may display two windows. Windows are typically considered to be at the same hierarchy level, since windows typically are not grouped inside other windows. A window that is grouped within a higher level window is considered to be at a lower level in the hierarchy than the grouping window. Icons included in a window are children at a lower hierarchy level than the window that groups them, since they are grouped within and associated with that window.

The GUI permits the user to access various functions implemented by an operating system or application program running on computer system 18. These functions typically include, but are not limited to, peripheral input/output functions (such as writing or reading data to disk or another peripheral), selecting and running application programs and other programs that are independent of the operating system, selecting or managing programs and data in memory, viewing/display functions (such as scrolling a document in a window, displaying and/or moving a cursor or icon across the screen, displaying or moving a window, displaying menu titles and selections, etc.), and other functions implemented by computer system 18. For simplicity of discussion, the functions of application programs such as word processors, spreadsheets, CAD programs, video games, web pages, and other applications as well as functions of operating systems such as Windows™, MacOS™, and Unix, will be subsumed into the term "program functions." Typically, application programs make use of such functions to interface with the user; for example, a word processor will implement a window function of an operating system (or GUI, if the GUI is separate from the operating system) to display a text file in a window on the display screen.

In addition, other types of interfaces are similar to GUI's and can be used with the isotonic and isometric modes of the present invention. For example, a user can set up a "web page" on the World Wide Web which is implemented by a remote computer or server. The remote computer is connected to host computer 18 over a network such as the Internet and the Web page can be accessed by different users through the network. The page can include graphical objects similar to the graphical objects of a GUI, such as icons, pull-down menus, etc., as well as other graphical objects, such as "links" that access a different web page or page portion when selected. These graphical objects can have forces associated with them to assist in selecting objects or functions and informing the user of the graphical layout on the screen. Such an embodiment is described in greater detail in co-pending patent application Ser. No. 08/691,852, which is hereby incorporated by reference herein in its entirety.

GUI 300 is preferably implemented on host computer 18 and processor 200 using program instructions. The use of program instructions to perform functions and operations on a host computer and microprocessor is well known to those skilled in the art, and can be stored on a "computer readable medium." Herein, such a medium includes by way of example memory such as RAM and ROM coupled to host computer 18, memory 204, magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile item such as a hard disk.

In FIG. 8, the display screen 20 displays a GUI 300, which can, for example, be implemented by a Microsoft Windows® operating system, a Macintosh operating system, X-Windows in Unix, or any other available operating system incorporating a GUI. In the example shown, a program manager window 301 contains various icons 302 that are grouped by window 301, here labeled as "Main", "Startup", and "Tools", although other or different icons may be grouped within window 301. A menu bar 304 may be included in window 301 in some GUI embodiments which permits pull-down menus to appear by selecting menu heading targets 305 with a user-controlled graphical object 306, such as a cursor, that is controlled by the user via a user object 12. In the subsequent description, the term s "user-controlled graphical object" and "cursor" will be used interchangeably.

The present invention provides force feedback to the user through user object 12 based on a location, a velocity, an acceleration, a history of one or more of these values, and/or other characteristics of the cursor 306 within the GUI 300 environment (or, based on the position, velocity, etc. of user object 12). Other "events" within th e GUI may also provide forces. Several preferred embodiments of different forces or "force sensations" can be applied to the user object 12, as described in co-pending application Ser. No. 08/571,606. These "force sensations" can be forces of a single magnitude in one direction, or they may be an interaction or sequence of forces, for example, to create the sensation of a texture, a damping force, a barrier, etc. The terms "force" and "force sensation" are used interchangeably herein.

In one preferred embodiment of FIG. 8, the force feedback depends upon a distance between cursor 306 and a target, such as window 301, using a fore model. The distance can be measured from one or more points within the window 301 or its perimeter. As depicted in FIG. 8, the window 301 is considered to be the highest level target displayed in GUI 300 (in actuality, the entire screen area of GUI 300 is preferably considered the highest level target, as described below). Icons 302 and menu bar 304 are targets that have a lower level in the hierarchy. Alternatively, icons 302 and menu bar 304 can be the same hierarchical level as window 301, if, for example, icons 302 were positioned outside of window 301 and were considered on the "desktop", i.e., not grouped in any particular window.

Figure 9:
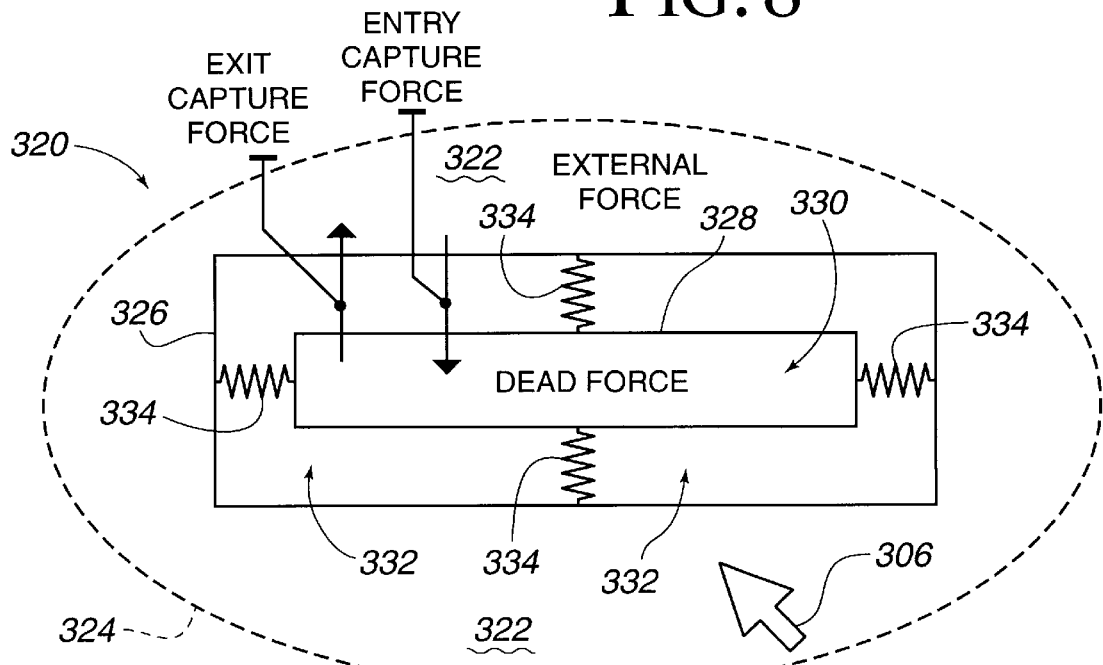
FIG. 9 is a diagrammatic illustration of a target and associated forces used in the GUI of FIG. 8.
Figure 12:
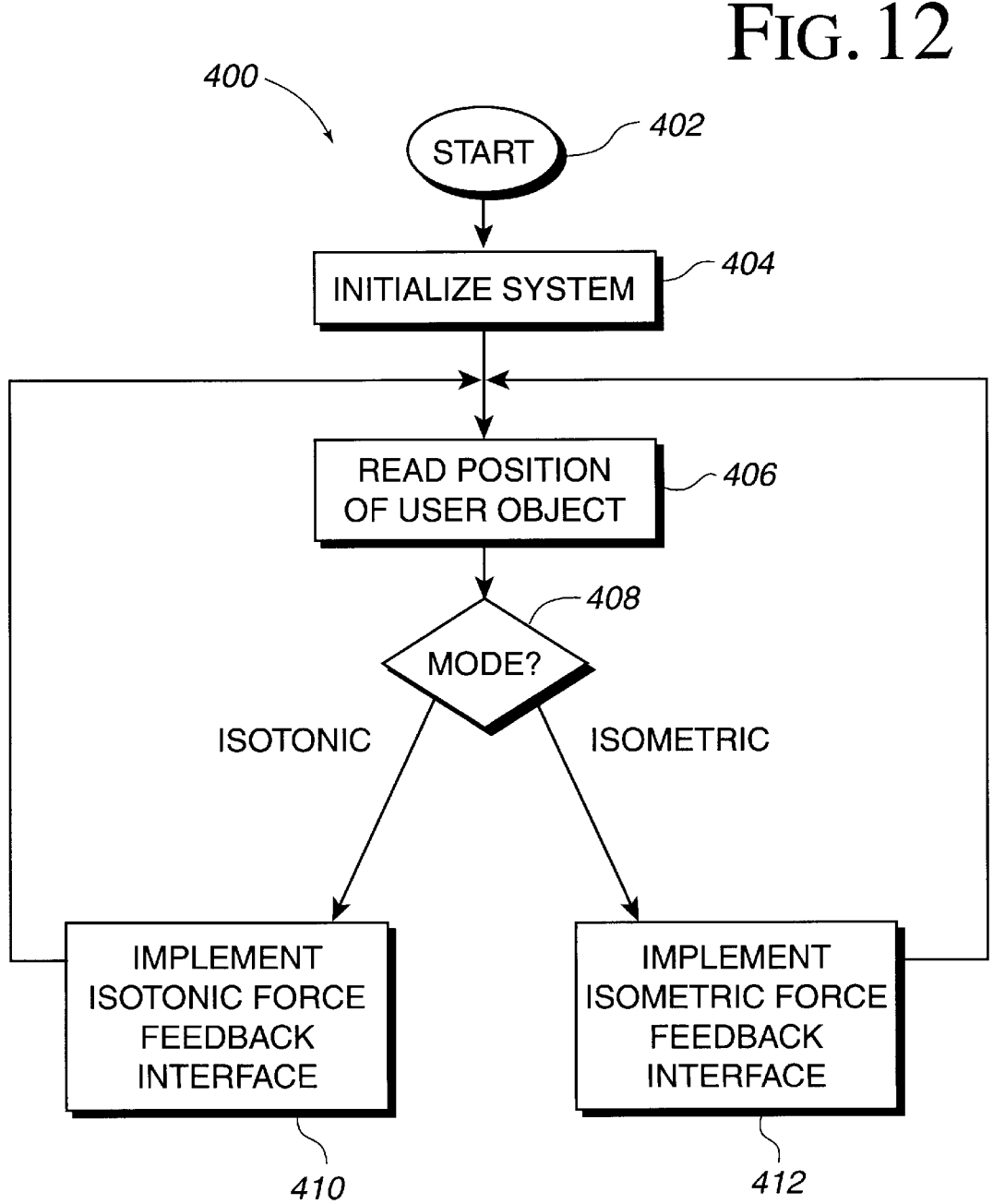
FIG. 12 is a flow diagram illustrating a method of the present invention for providing isotonic and isometric force feedback with an interface device.

In the discussion of FIGS. 8 and 9, it is assumed that a position control paradigm is implemented by the GUI 300 and interface system 10 and that the isotonic mode is active (see FIG. 12). For example, the position of cursor 306 is directly related to the position of user object 12 in provided degrees of freedom of the user object (the distance that user object 12 moves may not be the same distance that cursor 306 moves on screen 20, but it is typically related by predetermined function). When describing the position of cursor 306 herein, the position of user object 12 within provided degrees of freedom is assumed to correlate with the cursor's position. When forces are described herein as "affecting", "influencing" or being "applied to" cursor 306, it should be assumed that these forces are actually being applied to user object 12 by actuators 222; if the user object is moved in physical space, this in turn moves the position of cursor 306 on the display screen. When the isometric mode of the present invention is used, a rate control paradigm can be used in GUI 300 utilizing isometric control, as described in FIGS. 10 and 12.

In a preferred embodiment, high-level host commands can be used to provide the various forces used for a GUI 300 environment. The local control mode using microprocessor 200 can be helpful in increasing the response time for forces applied to the user object, which is essential in creating realistic and accurate force feedback. For example, it may be convenient for host computer 18 to send a "spatial representation" to microprocessor 200, which is data describing the layout of all the graphical objects displayed in the GUI which are associated with forces and the types of these graphical objects. The microprocessor can store such a spatial representation in memory 204. In addition, the microprocessor 200 can be provided with the necessary instructions or data to check sensor readings, determine cursor and target positions, and determine output forces independently of host computer 18. The host could implement program functions (such as displaying images) when appropriate, and low-speed handshaking signals can be communicated between processor 200 and host 18 to correlate the microprocessor and host processes. Also, memory 204 can store predetermined force sensations for microprocessor 200 that are to be associated with particular types of graphical objects.

In the described embodiment, targets such as window 301, icons 302 and menu headings 305 have force fields associated with them to influence and enhance the user's ability to move cursor 306 to or around the targets. For example, icons 302 may have an attractive force associated with them. This attractive force originates from a desired point I within each icon 302, which may be located at the center position of the icon. Alternatively, point I can be located at a different area of icon 302, such as near the perimeter of the icon. Likewise, window 301 preferably has an attractive force associated with it which originates from a point W within window 301, which may be at the center of the window. Points I and W are considered to be "field origin points." Alternatively, force fields can originate from a point or region not shown on the screen. These attractive forces are known as "external forces" since they affect the cursor 306 when the cursor is positioned externally to the targets. External and internal forces of targets are described in greater detail with respect to FIG. 9. In alternate embodiments, the field origin need not be a point, but can be a region or other defined area, such that the cursor may be able to be moved freely in a certain dimension when within a region defined by the borders of the target.

The attractive forces associated with window 301 and icons 302 are applied to user object 12 to influence the movement of user object 12 and cursor 306. Thus, an attractive force associated with window 301 will cause host computer 18 to command the actuators 222 of apparatus 14 to apply appropriate forces on user object 12 to move or bias the user object. Forces are applied to user object 12 in a direction such that cursor 306 is correspondingly biased in a direction toward field origin point W of window 301. It should be noted that the forces to user object 12 do not actually have to move the user object in the appropriate direction; for example, when using passive actuators, the user object cannot be physically moved by the actuators. In this case, resistive forces can be applied so that user object 12 is more easily moved by the user in the appropriate direction, and is blocked or feels resistance when moving in other directions away from or tangent to point W. The attractive force applied to user object 12, which would move or bias cursor 306 toward point W, is represented by dotted line 307 in FIG. 8. Preferably, the force is applied with reference to a single reference point of cursor 306, which is the tip point T in the preferred embodiment. In alternate embodiments, the reference point can be located at the center or other location on cursor 306 or other user-controlled graphical object, or external to the cursor. The attractive forces can be computed, for example, with a 1/R or $1/R^2$ relationship between field origin point W or I and cursor tip T to simulate gravity.

Repulsive force fields may also be associated with a field origin point. For example, it may be desired to prevent cursor 306 from moving to or accessing particular regions or targets on the screen within GUI 300. These regions might be displaying data that is desired to not be selected by cursor 306. If window 301 is one such target, for example, a repulsive field in the opposite direction to that represented by line 307 can be associated with window 301 and can originate at field origin point W. The force would move user object 12 and cursor 306 away from the target, making it more difficult for the user to move cursor 306 onto the target.

In the preferred embodiment, the position of cursor 306 determines which field forces will affect the cursor 306 and user object 12. As described in FIG. 9, targets preferably are associated with internal and external forces in relation to cursor 306. Preferably, attractive forces are external forces and thus affect user object 12 and cursor 306 only when the cursor 306 is positioned externally to the target. In the preferred embodiment, only the external forces of the highest level targets that are external to cursor 306 will affect the cursor 306 and object 12. Thus, in FIG. 8, only the attractive force of window 301 will affect cursor 306 and user object 12, since the icons 302 and menu headings 305 are at a lower level in the hierarchy. If cursor 306 were positioned within window 301, only the attractive fields of icons 302 and menu headings 305 would affect cursor 306 and user object 12 and the attractive force 307 would preferably be removed. In alternate embodiments, the forces from various targets can be combined or excluded in different ways.

In another example (not shown), multiple windows 301 can be displayed on display screen 20. All three windows are at the same hierarchical level, so that when the cursor 306 positioned outside the perimeter of all three windows, cursor 306 and user object 12 are influenced by a combination of the three external attractive forces, one attractive force from each window. The magnitudes of these forces can be dependent on a formula, such as the inverse of the distance between each target and point T of the cursor. These attractive forces can be summed together as vectors to provide a resulting total attractive force in a resultant direction having a resultant magnitude (not shown). Other methods can also be used to combine force vectors from multiple targets. In alternate embodiments, if a window having more targets were desired to exert a greater force on cursor 306 (when the cursor is external to all windows) than windows having less targets, then such an effect can be implemented. In other embodiments, the magnitude or direction of forces associated with targets can differ depending on characteristics of the targets or can be commanded by the software programmer or user to be a desired magnitude.

FIG. 9 is a diagrammatic illustration of a displayed target illustrating the concepts of internal and external forces associated with a target. As referred to herein, "external forces" are those forces associated with a target which affect cursor 306 when the cursor 306 is positioned externally to that target, i.e. when the cursor positioned outside the perimeter of the target. In contrast, "internal forces" are those forces associated with a target which affect cursor 306 when the cursor is positioned internally to the target, i.e., within the perimeter of the target. Each target preferably has external forces and internal forces assigned to it. Of course, the internal forces and/or external forces associated with a target may be designated as zero, effectively removing those forces.

Target 320 includes an external target region 322 to which an external force associated with target 320 is assigned. External region 322 is defined from a target point P in the target to a range limit 324 outside the target, wherein the external force will be in effect. The target point P for defining ranges can be the same point as the field origin point described above. If cursor 306 is positioned within the external region 322 of a target, then the external force associated with that target is in effect. If cursor 306 is outside the external region, then the external force is not in effect. The external region can be defined from an outer perimeter 326 of target 320, or from an inner perimeter 328 of the target 320, if such perimeters are implemented (see below). Attractive, repulsive, texture, or other forces and force models may be assigned as external forces to targets. When cursor 306 is at point external to multiple targets, the total force on cursor 306 is equal to the sum of external target forces associated with each target. Alternatively, the external forces may be combined based on the differences or other relationship between external force magnitudes and/or directions. In other embodiments, a "groove" external force can be provided for graphical objects. These grooves can be positioned in horizontal and vertical directions and intersect at a center of the target. The grooves are preferably not displayed within GUI 300 (i.e., the grooves are felt, not seen). When cursor 306 is moved into a groove, resistive forces are applied to resist further movement out of the groove but to freely allow movement along the length of the groove.

The internal force associated with a target affects cursor 306 only when the cursor is within the perimeter of the target. An internal target region may include a dead region 330 and a capture region 332. Dead region 330 is defined as the innermost, central region of target 320 and extends to an inner perimeter 328. In the dead region, forces associated with the dead region ("dead region forces") applied to cursor 306 are preferably zero so as to allow substantially free movement of the cursor within this region (also, any external forces of any targets included within target 320 would be in effect). Alternatively, a particular force or force model can be associated with dead region 330.

The capture region 332 is preferably provided at or near a perimeter of target 320. The forces associated with capture region 332 are applied to cursor 306 when the cursor is positioned within or is moved through the capture region. If the sampling rate of a sensor is too slow to detect cursor 306 within the capture region, a history of sensor readings can be checked to determine the path of the cursor and whether the capture force should be applied to user object 12. In the preferred embodiment, two different forces can affect cursor 306, depending on whether the cursor exits target 320, or enters target 320. When the cursor is moved from dead region 330 to external region 322, an "exit capture force" is applied to user object 12. For example, the exit capture force can be a barrier or "snap over" force positioned at inner perimeter 328, which preferably includes a spring force as represented symbolically by springs 334 in FIG. 9. The spring force causes a spring resistance to the motion of cursor 306 in the exit direction, which starts as a small resistive force in the direction toward the dead region 330 and which increases as the cursor is moved closer to outer perimeter 326. This barrier force prevents the cursor from easily "escaping" the target 320. Other forces can be substituted in other embodiments, such as a damping barrier force. In addition, by providing a zero dead region force and a barrier exit capture force, a user can move the cursor within the internal area of a target and "feel" the shape of the target, which adds to the sensory perception of graphical objects. Outer perimeter 326 of target 320 preferably defines a snap distance (or width) of the barrier, so that once cursor 306 is moved beyond perimeter 326, the exit capture force is removed.

When the cursor 306 enters target 320, an "entry capture force" is applied to user object 12. Preferably, the entry capture force is the same spring force as the exit capture force, in the same direction toward the dead region 330. Thus, when cursor 306 first enters the capture region, the spring force will immediately begin to push the user object/cursor toward the dead region. The closer the cursor is positioned to the dead region, the less spring force is applied. In some embodiments, the magnitude of the entry spring force can be limited to a predetermined value or offset to prevent the cursor 306 from moving past ("overshooting") target 320 due to excessive attractive force. Alternatively, an entry force different from the exit force can be applied. In such an embodiment, the direction of movement of cursor 306 must be established so that it is known whether to provide the exit capture force or the entry capture force.

Other forces can also be applied to the user object 12 when operating force feedback interface device 13 in iso-tonic mode. For example, an "inertia" force can be applied when graphical objects are manipulated by the user for particular types of targets and when specific conditions are met. For example, the inertia force can be applied to the user object when the user moves pointer 306 into dead region 330, holds down a button on the user object, and moves or "drags" the graphical object (and associated target 320) with cursor 306 across screen 20. The dragged target 320 has a simulated "mass" that will affect the amount of inertia force applied to user object 12. In some embodiments, the inertia force can be affected by the velocity and/or acceleration of cursor 306 in addition to or instead of the simulated mass. Other factors that may affect the magnitude of inertia force, such as gravity, can also be simulated. Alternatively, an icon's mass can be related to how large in terms of storage space (e.g. in bytes) its associated program or file is. Thus, force feedback can directly relate information about a target to the user. In addition, damping and/or friction forces can be provided instead of or in addition to the inertia forces. For example, each graphical object can be assigned a simulated damping coefficient or a coefficient of friction. Such friction might be useful when free-hand drawing in a CAD program, where the coefficient of friction might be based on "pen size." A texture force might also be applied when a graphical object is dragged. In addition, if simulated masses are being used to calculate the external force of a target, such as an attractive gravity force, then that same mass can be used to compute an inertia force for the target.

Also, inertia forces of graphical objects can also be applied due to collisions or other interactions with other graphical objects and targets. For example, if pointer 306 is dragging an icon, and the icon collides with the edge of a window, then a collision force can be applied to user object 12. This collision force can be based on the speed/direction of the icon/cursor as it was moved, the simulated mass of the icon and/or cursor, and any simulated compliances of the icon/cursor and the edge. Also, certain edges, objects, or regions in GUI 300 can either be designated as "pass-through" objects or as "solid" objects that provide barrier forces that do not allow the cursor to pass into the objects.

Other examples of forces and associated graphical objects and functions include providing force jolts or "bumps" when the cursor 306 encounters a region, when an object is released after having been dragged across the screen, when a window is entered or exited by the cursor, or when a window is opened or closed. In a text document, these bumps can be provided when the cursor moves between words, lines, letters, paragraphs, page breaks, etc. Forces can be associated when a button in a GUI is "pressed", i.e., moved "into" the screen and back out, and/or when command gestures are provided. A "snap to" force simulates a detent in a surface, thus providing a small attraction to a point. This can be useful for menu items or snap-to grid lines in a CAD program or constraining motion to perpendicular or 45-degree angle directions.

Yet other forces include a spring force associated with a position of a target before it is moved. For example, when the user drags an icon, a selection of text, or pull-down menu, a virtual spring is simulated as being attached between the icon's current and former position. Such a spring or other type of force can also be provided on user object 12 when a graphical object is resized between former and current sizes. For example, if the window is dragged to a larger size, then a "stretching" spring force can be applied to the user object, and if the window is dragged to a smaller size, then a "compressing" spring force can be applied. Such features can be provided in a CAD program when graphical objects are stretched or otherwise manipulated.

The forgoing concepts and preferred embodiments can also be applied to other graphical objects appearing in a GUI. For example, pull-down menus (such as a "File" pull-down menu) and menu items in the menu can provide internal and external forces to assist a user in selecting menu items. Similarly, a scroll bar or "slider" can be associated with forces, such that the guide and "thumb" of the slider can be associated with external forces and internal forces to assist the user in manipulating the slider. "Pop-up" windows and panels in GUI 300 can similarly be provided with forces, where buttons in the pop up window may have external and internal forces associated with them. Forces associated with buttons can be "turned off" or otherwise changed after the button has been selected by the user using cursor 306.

It should be noted that similar isotonic force feedback can be provided in non-GUI graphical environments. For example, in a 3-D video game, texture forces of a dungeon wall might be felt when a user moves a cursor over the wall. Or, a tank selected by the user with a cursor might have a high inertia force associated with it when it is moved in comparison to a small infantry soldier.

FIG. 10 is a diagrammatic illustration of display screen 20 displaying graphical user interface (GUI) 300 and isometric functionality of the present invention. The present invention provides an isometric mode for interface device 13 in which the user can provide isometric input.

Isotonic mode allows a user to provide input using the motion of user object 12 in physical space in predefined degrees of freedom. For example, a mouse is a traditional isotonic controller often used to control the position of a cursor on display screen 20. The forces described with reference to FIGS. 8 and 9 are appropriate for use with an isotonic method of controlling a graphical object. In contrast, an isometric sensing mode utilizes a user's force or pressure on the user object rather than the movement of the user object through space. The force magnitude and direction that the user exerts on the user object is input to the computer to be used in the manipulation and interaction of the graphical environment.

Particular functions or tasks in a graphical environment are far more suited to isometric input than isotonic input, such as rate control tasks. For example, a window 350 includes a text document 352. Text not currently shown in window 350 can be viewed by scrolling the document 352 up or down. This is traditionally accomplished using a slider 354. However, using an isometric device, the scrolling can be controlled simply by inputting pressure or force in the desired direction on the user object. Optionally, the input force can be provided at a desired magnitude to control the speed of the scrolling text.

The present invention provides such isometric functionality in the same interface device that provides isotonic functionality. In one embodiment, isometric mode is entered by selecting an input device such as a button. Once this mode is entered, an opposing force on the user object is applied by the actuators 222, and the user's input force on the user object is provided as isometric (or elastic) input to the host computer to control, for example, the scrolling of document 352. This embodiment is described in greater detail with respect to FIG. 12.

In another embodiment, the interactions between a controlled graphical object such as a cursor and other graphical objects allow isometric input. In FIG. 10, graphical "isometric objects" 356a and 356b are displayed on display screen 20 by host computer 18 in GUI 300. In the described embodiment, objects 356a and 356b are associated with window 350 and thus may be displayed close to the window 350. Object 356a is shown as an approximately rectangular shaped object having isometric surfaces 358a–d and barriers 360. The user may move the tip T of cursor 306 against any of the surfaces 358a–d to provide isometric input. Isometric surfaces 358 have a resistive or opposing force associated with them, so that the user feels on user object 12 as if the cursor 306 is being resisted by the surface 358. The opposing force is generated by computer-controlled actuators 222 and enables the isometric mode of the present invention because the user must overcome opposing forces to penetrate the isometric surface. The penetration into the surface 358 controls the input. Although the position of the user object is sensed, this position implies the magnitude and direction of input force from the user and thus enables the isometric functionality. Preferably, the direction of movement against a surface 358 indicates the direction of isometric input.

In this example, isometric input using object 356a is directly applied to associated window 350. Thus, when a user moves cursor 306 against surface 358c, the document 352 is scrolled in an up direction. When the user moves cursor 306 against surface 358a, the document is scrolled down. In some embodiments, the cursor is displayed on display screen 20 moving into the surface 358 as the user moves the user object in a corresponding direction. For example, FIG. 10a shows cursor 306 first engaging surface 358 of isometric object 356c. In FIG. 10b, the user has moved the cursor into the object 356c, and the surface 358 moves with cursor 306 such that the object 356c compresses. The old position of the surface is shown by dashed line 359. In other embodiments, a dichotomy between display screen and user object is provided such that the cursor is shown fixed against, surface 358, even as object 12 is moved. Such embodiments are described in greater detail in FIG. 15.

When cursor 306 is disengaged from any surface 358, isotonic mode is resumed by the interface system 10 and the position of the user object directly controls the position of the cursor 306 on screen 20. Barriers 360 may be optionally included in object 356a to retain cursor 306 against a surface 358 and block the cursor from "slipping" off a surface 358. For example, barriers 360 may have an opposing force associated with them to halt or slow the user object in a direction against them. This prevents a user from unintentionally exiting isometric mode when the user inadvertently moves the cursor too far along a surface 358.

Object 356b similarly provides an isometric surface 358e to provide isometric input. Objects 356a and 356b can be provided close together as shown in FIG. 10 to simplify directional isometric inputs, e.g., the user can easily move cursor 306 between surfaces 358c and 358e to control the direction of scrolling of document 352. For other isometric objects, the isometric surfaces 358 can be provided at other (non-90 degree) angles or provided in other desired configurations.

In other embodiments, the isometric input can be applied to window 352 or a different associated graphical object in a different way, e.g., to control a text cursor in the window, to zoom the view in the window (see FIGS. 11a–b), to pan the view in the window, etc. The whole view of screen 20 can alternately be panned or scrolled using such isometric input in some embodiments.

In a similar embodiment, isometric input can be provided by interacting cursor 306 with typically non-isometric graphical objects displayed on screen 20. For example, the cursor 306 can be moved against the edges 362 of window 350 to scroll the document 352 in appropriate directions. For example, when the cursor is moved against the edge of the window from the inside of the window, an opposing force will prevent the cursor from leaving the window. The user pushes the user object 12 against the opposing force; the harder the user pushes, the faster the document 352 is scrolled. Again, the cursor is preferably not moved on display screen 20 in isotonic mode so that the cursor still appears at edge of window; alternatively, the cursor can be moved, as described in FIG. 15. Isometric surfaces might similarly be implemented as the edges of the background of screen 20, a window, menu bar, drop-down menu, icon, edge of the screen, slider, button, close box, etc. or any graphical object displayed on the screen. Alternatively, the isometric functionality of a given surface might only be active dependent on the velocity or other characteristic of the cursor 306. For example, a user might sometimes want the edge of a window to be an isometric surface, while at other times to be a non-isometric surface. If cursor 306 is moved slowly (e.g., under a predetermined threshold velocity), the cursor will engage the window edge as an isometric surface having an opposing force. If cursor 306 is moved fairly quickly, at the normal rate of a user in standard isotonic mode, isometric mode will not be entered and a surface of a window might be treated as haptically transparent or associated with an isotonic force so that the cursor can "escape" or pass through the window.

FIG. 11*a–b* are a diagrammatic illustration of display screen 20 showing an isometrically-controlled zoom function of a CAD program. FIG. 11*a* shows a cube 370 as a graphical object as displayed by the CAD program. The cube 370 can be manipulated as desired to change the shape of the cube or alter other characteristics. Typically, isotonic input is the most natural and efficient type of input to move, stretch, copy, or otherwise manipulate cube 370.

A user may wish to zoom in the view of cube 370 to see additional detail. In the preferred embodiment, this may be conveniently accomplished by providing isometric input. The view of FIG. 11*b* shows a zoomed-in view of a portion of cube 370, where dashed box 372 of FIG. 11*a* indicates the extent of the zoomed view. In this example, to zoom from the view of FIG. 11*a* to the view of FIG. 11*b,* the user can press and hold an input device such as a button on puck 22. This causes a computer-generated resistive force to be applied to the puck in all directions as a result of actuator control. The user then moves the puck against this force in an upward direction to cause a magnification zoom. When the user releases the button, normal isotonic manipulation of cursor 306 is allowed.

In a different embodiment, the user may use cursor 306 to control the zoom function. In FIG. 11*a,* a zoom in isometric object 374 and a zoom out isometric object 376 are displayed. The cursor 306 can be moved against any surface of the appropriate object 374 or 376 to command the associated zoom function of the CAD program.

The present invention also allows additional computer-generated forces to be overlaid on the resistive isometric force on puck 22. For example, when the user reaches the maximum zoom magnification, a small jolt can be applied to the user object 12 to inform the user of this condition. Overlay forces are described in greater detail with respect to FIG. 16.

FIG. 12 is a flow diagram illustrating a method 400 for implementing an isotonic-isometric force feedback interface device of the present invention. The methods disclosed herein may be implemented using software (e.g., program instructions) implemented on host computer 18 and/or processor 200, hardware included in host 18 and/or processor 200, or a combination of software and hardware. The process begins at 402, and in step 404, the system is initialized. The initialization can take the form of a number of steps, including powering up applicable peripherals, calibrating the user object, initializing sensors and actuators, having the host computer 18 receive particular parameters of the mechanical apparatus 14 and interface 16 and vice-versa, etc. In addition, this step can include mapping or associating forces with graphical objects in a computer environment, such as graphical objects within a displayed GUI. For instance, external and internal target forces as described with reference to FIG. 9 are associated with particular targets according to predetermined preferences, default settings, etc. The mapping will generally include assigning one or more force models and range sizes/shapes to each external and internal region of types of graphical objects. The process of mapping forces to graphical objects in the GUI is described in greater detail in co-pending application Ser. No. 08/571,606. Assigned force ranges, magnitudes and models assigned to graphical objects can also be stored in memory 27 as a "parameter page" by processor 200 or host computer 18 to provide different force environments. Parameter pages are described in greater detail with respect to U.S. Pat. No. 5,734,373.

In step 406, the position of the user object 12 is read by host computer 18 and/or microprocessor 200. In the preferred embodiment, the host computer reads this position at step 406, since the host computer is implementing the graphical environment and must know the position of the user object to provide an accurate display in step 410. The host computer 18 can receive this position directly from sensors 220/interface 206, or from microprocessor 200 which has received the position from sensors 220.

In step 408, the mode of the interface system 10 is determined. In the present invention, the user can provide input to the system in either isotonic mode or isometric mode, which are referred to as "control modes" herein. The interface device can implement isotonic and isometric sensing, and can also provide force feedback as either isotonic force feedback (in isotonic mode) or isometric force feedback (in isometric mode). Iso to the mode allows a user to provide input using the motion of user object 12 in physical space in predefined degrees of freedom. For example, a mouse is a traditional isotonic controller often used to control a cursor. A joystick is another example of an isotonic controller, where the movement of the stick in rotary or linear degrees of freedom is sensed and input to the computer. Other isotonic interface devices include trackballs, styluses and tablets, steering wheels, etc. In contrast, an isometric sensing mode utilizes a user's force or pressure on the user object rather than the movement of the user object through space. The force magnitude and direction that the user exerts on the interface device is sensed and input to the computer to be used in the manipulation and interaction of the computer environment. For example, isometric controllers such as sensor spheres typically include pressure sensors overlaid on their surface to detect input forces from the user's touch. In the preferred embodiment for a GUI environment, the default mode is isotonic mode so that the user can move the user object 12 to provide input similarly to a mouse. The user can then select isometric mode when desired.

In ideal isometric interaction, there is no perceived deflection of the user object in response to the user's pressure. However, if there is a small amount of deflection or movement in the user object perceived by the user, the sensing can be referred to as "elastic" control. Some users prefer the small deflection in elastic control, as it provides some intuitive feedback as to the degree of pressure applied by the user. In many cases, elastic controllers have been found to induce smaller errors in user manipulation of computer objects than pure isometric controllers. Herein, the term "isometric" is intended to include elastic control. The preferred isometric embodiment of the present invention is actually an elastic controller, since there is minor movement of the user object.

The determination of the current mode in the present invention in step 408 can be implemented in a variety of ways. In a button mode control embodiment, the mode is selected by the user by the use of a separate input device, such as a button 250 provided on the user object. For example, the user can press a mode button once to change to isometric mode, and then press the button again to toggle the mode back to isotonic mode. Alternatively, the user may be required to hold down the button to stay in a particular mode (such as isometric mode). Also, other input devices or degrees of freedom might be associated with mode toggling or a one of the modes. For example, motion of user object 12 in third or more degrees of freedom might be used to toggle the mode, or to provide input exclusive in one mode, such as isometric mode.

In a preferred, graphical mode control embodiment, the mode may be "seamlessly" selected by the interaction of graphical objects or other events implemented by the host computer 18. For example, FIG. 10 above shows graphical "isometric objects" 356 which are displayed on display screen 20 by host computer 18 in GUI 300. The user may move cursor 306 against the surfaces 358a–e of the objects 356 to switch to isometric mode. Upon engaging an isometric surface with the cursor, force feedback will indicate to the user that the engagement has occurred and that isometric mode is active. Preferably, the direction of movement against a surface 358 indicates the direction of isometric input. This is described in greater detail with respect to step 426 of FIG. 15, below. As described above, barriers 360 may be optionally included in object 356a to retain cursor 306 against a surface 358 and block the cursor from "slipping" off a surface 358. Barriers are represented by a resistive or barrier force, thus preventing or hindering a user from moving the user object in undesired directions and unintentionally exiting isometric mode. Alternatively, instead of using barriers 360, the processor 200 or host computer 18 can be instructed to ignore sensor data from undesired degrees of freedom when the cursor is engaging an isometric surface, i.e., provide a visual and physical dichotomy in selected degrees of freedom, as described with reference to FIG. 15. For example, when the cursor 306 engages isometric surface 358d, the interface device 13 would be responsive only to left and right motion, and would ignore up and down motion to ease the user's control over the isometric function. When cursor 306 disengages an isometric surface 358, isotonic mode is active. It should be noted that in this embodiment, the isometric mode is seamlessly selected by the user without having to perform any extra command such as selecting a button, and thus obviates the use of any extra hardware in apparatus 14. As described above, the control mode can also be selected using normal graphical objects displayed on screen 20, such as windows, menu bars, drop-down menus, icons, edges of the screen, etc.

As described in FIG. 10, edges or other features of standard GUI objects can be used as isometric surfaces. In one embodiment, the control mode is selected by the velocity or other characteristic of the cursor 306 at the time the surface or feature is contacted by the cursor. For example, if the cursor 306 is moving above a predetermined threshold velocity when engaging a surface, then isotonic mode can be active. If the cursor is moving below the threshold velocity, then isometric mode can be active when the surface or feature is engaged. Acceleration of the cursor might similarly be used to control the mode.

In alternate embodiments, graphical objects can be manipulated in other ways to provide selection between isotonic and isometric modes. For example, an outline of a square or rectangle can be displayed, and the cursor 306 can be allowed to enter the square when a command is entered, such as from a button, or with an entry snap-over, barrier or capture force similar to those described above. Once the cursor is inside the square, isometric mode is activated, so that input using user object 12 in any degree of freedom is isometric input.

If the mode is currently or has been selected to be isotonic mode, then the process continues to step 410, where isotonic input and force feedback is implemented. This step is described in greater detail with respect to FIG. 13. The process then returns to step 406 to read the current position of the user object. If the mode is currently or has been selected to be isometric mode, then the process continues to step 412, where isometric input and forces feedback is implemented, and which is described is greater detail with respect to FIG. 15. In applicable embodiments, the local microprocessor 200 can inform the host computer 18 about the active control mode using flags a control signal, etc. The process then returns to step 406 to read the current position of the object. The process loops in similar fashion unless interrupted by host computer 18 or other conditions.

Figure 13:
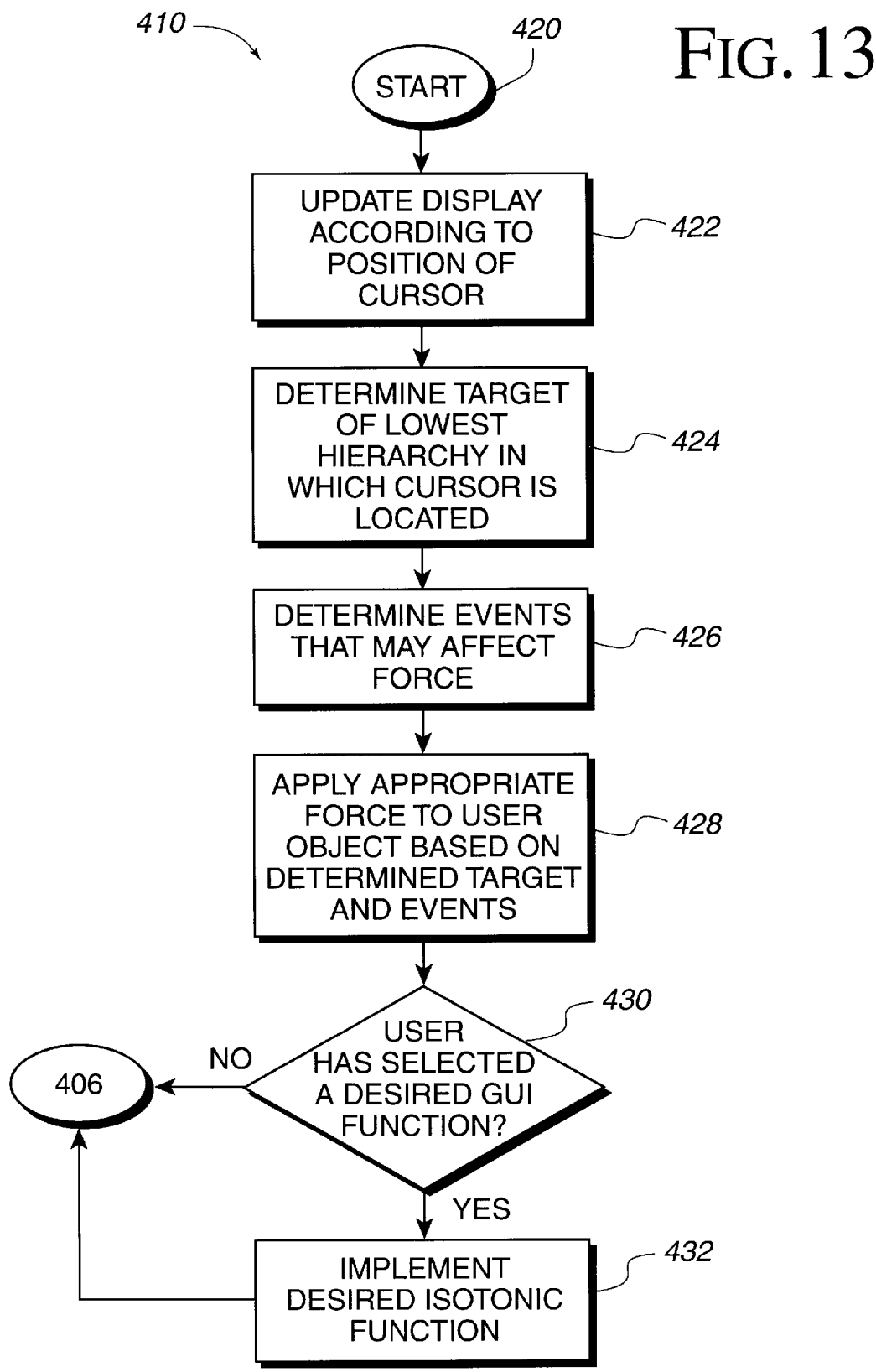
FIG. 13 is a flow diagram illustrating a step of FIG. 12 for implementing isotonic mode of the interface system of the present invention.

FIG. 13 is a flow diagram illustrating step 410 of FIG. 12, in which the isotonic mode of the force feedback interface is implemented. The process begins at 420, and in step 422, the display is updated according to the position of the user object. In the preferred GUI embodiment, a position control paradigm is used in the isotonic mode, i.e., the position of cursor 306 on display screen 20 is directly correlated to the position of user object 12 in the planar workspace of the object. Thus, the position of the user object dictates the displayed position of the cursor 306 on the display screen. The user object readings can be converted to coordinates on screen 20 and the cursor is moved to the appropriate location corresponding to the position of the user object. Since the sensor readings of the user object position may include non-integer values, the sensor readings can be converted to integer values which are associated with coordinates on the screen so that the cursor position can be updated. However, when forces are calculated (as in step 428 below), the original non-integer sensor readings can be used, since these values may include needed accuracy.

In alternative embodiments, the display might be updated in other ways in response to the position or other characteristics of motion of the user object 12. For example, some application programs implemented by host computer 18 might use two dimensional, planar input to control other aspects of an interface or program, such as panning a screen, rotating a controlled object, moving a user-controlled player, vehicle, or viewpoint through simulated 3-D virtual space, etc. Also, the velocity or acceleration of the user object can be calculated and used as input. In other embodiments, the mechanism 14 might allow three or more degrees of freedom to the user object, thus allowing other ways to control objects and program functions.

In step 424, the process determines a target of lowest hierarchy in which the cursor is located. As mentioned above in the discussion of FIGS. 8 and 9, the hierarchies assigned to targets may influence the forces that are in effect on cursor 306 in isometric mode. By well-known binary tree or set theoretic hierarchy methods, the cursor 306 is checked whether it is positioned within the perimeter of a target and whether that target includes other children targets which the cursor is also within. The host 18 or processor 200 can also determine whether the cursor 306 is in a region where two targets of the same hierarchical level overlap. This can occur if, for example, two icons or windows of the same (lowest) hierarchical level happen to be displayed on the same portion of the screen. If the cursor 306 is in an overlap region, then the "top" target whose object is displayed on screen 20 (over the "bottom" target) can be selected. In other embodiments, target hierarchy may not be used to determine forces, e.g., if no attractive or other external forces have been assigned to graphical objects; in such a case, step 424 can be omitted.

In step 426, the process determines any events or conditions that may further affect the force on the user object 12. Such events may include barrier forces that are applied when the cursor 306 moves over a boundary to a graphical object, divot or bump forces, texture forces, inertia, damping, and/or friction forces when dragging a graphical object, collision forces when the cursor moves into a boundary, spring forces when sizing or moving a graphical object, jolts, or other forces related to the position of cursor 306 or other controlled graphical object. Such events may also occur independently to the position of the user object/cursor due to the nature of the application program, e.g., a randomly-determined asteroid hits the player-controlled space ship in a video game. Many of these events/conditions are described in greater detail in application Ser. No. 08/571,606.

In an alternate embodiment, no forces are applied to the user object in isotonic mode. For example, the user may use puck 22 in isotonic mode as a normal mouse, where no forces are applied. In such an embodiment, forces can be applied to user object 12 solely to provide the isometric functionality of the interface device.

In step 428, an appropriate force is determined based on the determined target of step 424 and any other applicable events determined in step 426. The contributing forces are combined and the combined total force is applied to the user object 12 using actuators 222. After step 428, step 430 is performed, where the process checks whether the user has selected or commanded an isotonic program function in the application or operating system. If so, in step 432, the desired isotonic function is implemented. By "isotonic function", it is meant any program function that is selectable by the interface device 13 when isotonic mode is active. Such functions are often commanded using a command gesture from a button, etc. in conjunction with a targeting activity such as moving a cursor to a particular location on the screen. For example, resizing, moving, displaying or removing a graphical object, initializing/executing an application program upon selection of an icon, displaying a drop down menu, performing a function resulting from a selection of a menu item in a drop down menu, displaying information upon selection of graphical button, etc. Some program functions might be both isotonic and isometric functions if the function can be selected in either mode; for example, text might be scrolled by use of an isotonic slider, or by isometric input. If no isotonic function is selected, or after the selected isotonic is implemented, the process returns to step 406 of FIG. 12 to read the current position of the user object.

Figure 14:
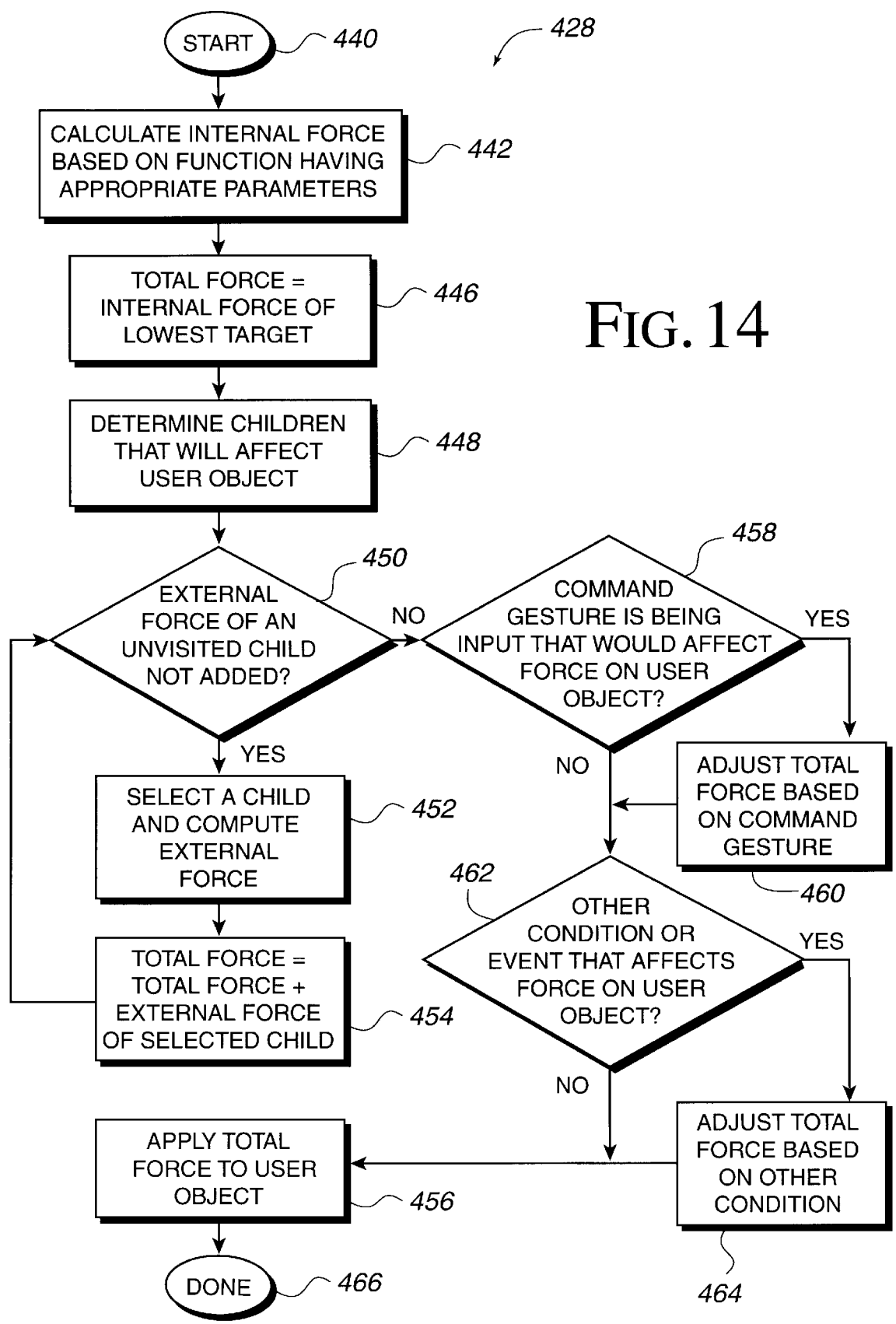
FIG. 14 is a flow diagram illustrating a step of FIG. 13 for applying a force to the user object in isotonic mode.

FIG. 14 is a flow diagram illustrating step 428 of FIG. 13, in which an appropriate force is applied to the user object 12 based on the cursor's position and the target in which the cursor is located and any determined events. The process begins at 440. Having determined the target of lowest hierarchical level in which the cursor is positioned in step 424, step 442 calculates an internal force for that target containing the cursor 306 (the "lowest target"). The internal force is calculated using a force model or function, such as a force process, given appropriate parameters such as magnitude, duration, coefficients, sensor data, and timing data. Force models, force processes, and parameters are discussed in greater detail in copending application Ser. No. 08/566,282.

In step 446, a total force value is initialized to the internal force of the lowest target that was calculated in step 442. Thus, only the internal force of the lowest hierarchical target in which the cursor is positioned, and not internal forces of any higher level targets, is included in the total force that is to be applied to the user object. As an example, consider a cursor 306 inside a window containing only icons. If the cursor 306 is not in an icon's target, the window itself is the lowest hierarchy target in which the cursor 306 resides, and only the internal target force for the window is calculated. If the cursor is moved into an icon, only the internal force from that icon is included in the total force; the internal force of the window is ignored.

Step 448 determines the children targets of the lowest target whose forces will affect the user object. These "external" children are 'included in the lowest target which the cursor is positioned in, but which are external to the cursor, i.e., the cursor is not positioned in any of the external children. Thus, the external forces of the external children will affect cursor 306 and user object 12. Any targets included in the external children are preferably not added as a force. If the cursor is in the "desktop" or background target of GUI 300, then the external children are the next highest level targets on the screen.

In step 450, the process determines whether any external forces of external children have not been combined into the total force. If so, step 452 selects a previously unvisited external child and computes the external force for the child. The external force from this child is only computed if cursor 306 is within the external range of the child; if the cursor is outside the external range, the external force is set at zero. This saves processing time if the cursor is not in the external range. Alternatively, if a particular force is assigned to regions outside the external range, that force is computed. The external force is computed according to the particular force model assigned to the external force.

Step 454 computes the total force by adding the external force from the child of step 452 to the total force to be applied to the user object 12. It should be noted that the directions and magnitudes of the previous total force and the external force are taken into account when determining the direction and magnitude of the resulting total force. For example, if the previous total force had a magnitude of 5 in a left direction, and the external force had a magnitude of 8 in the right direction, then the sum of step 454 would result in a total force of magnitude 3 in the right direction. The process then returns to step 450 to check for another unvisited external child and add an external force to the total force. Steps 452–454 are repeated until external force contributions from all the external children have been combined into the total force.

After all the external children forces have been added to total force, then, from the negative result of step 450, the process checks if a command gesture has been input by the user which would affect the force applied to the user object. This would have been determined in step 426 of FIG. 13. For example, such a situation might occur if the inertia forces described above were implemented. These forces would be applied when the user held down a button or provided similar input and dragged an icon or window. If such input has been received, then the total force is adjusted based on the command gesture and the particular conditions or location of the cursor or other factors (such as the velocity of the cursor, mass of the dragged icon, simulated gravity, etc.) The "adjustment" to the total force may be an addition or subtraction to the magnitude of the total force and/or a change in direction, depending on magnitudes of added forces.

In next step 462, or after a negative result of step 458, the process checks if another condition or event affects the force on the user object is in effect, which was determined in step 426 of FIG. 13. Such a condition or event, for example, might be when cursor 306 collides with a "solid" graphical object of GUI 300 and initiates a collision force. If a condition exists, then the total force is adjusted appropriately in step 464. After step 464, or after a negative result of step 462, the total force is applied to the user object 12 in step 456 using actuators 222 as explained previously. The process is then complete at 466. In alternative embodiments, steps 458–464 can be performed at other stages in process 424, such as before step 442.

Figure 15:
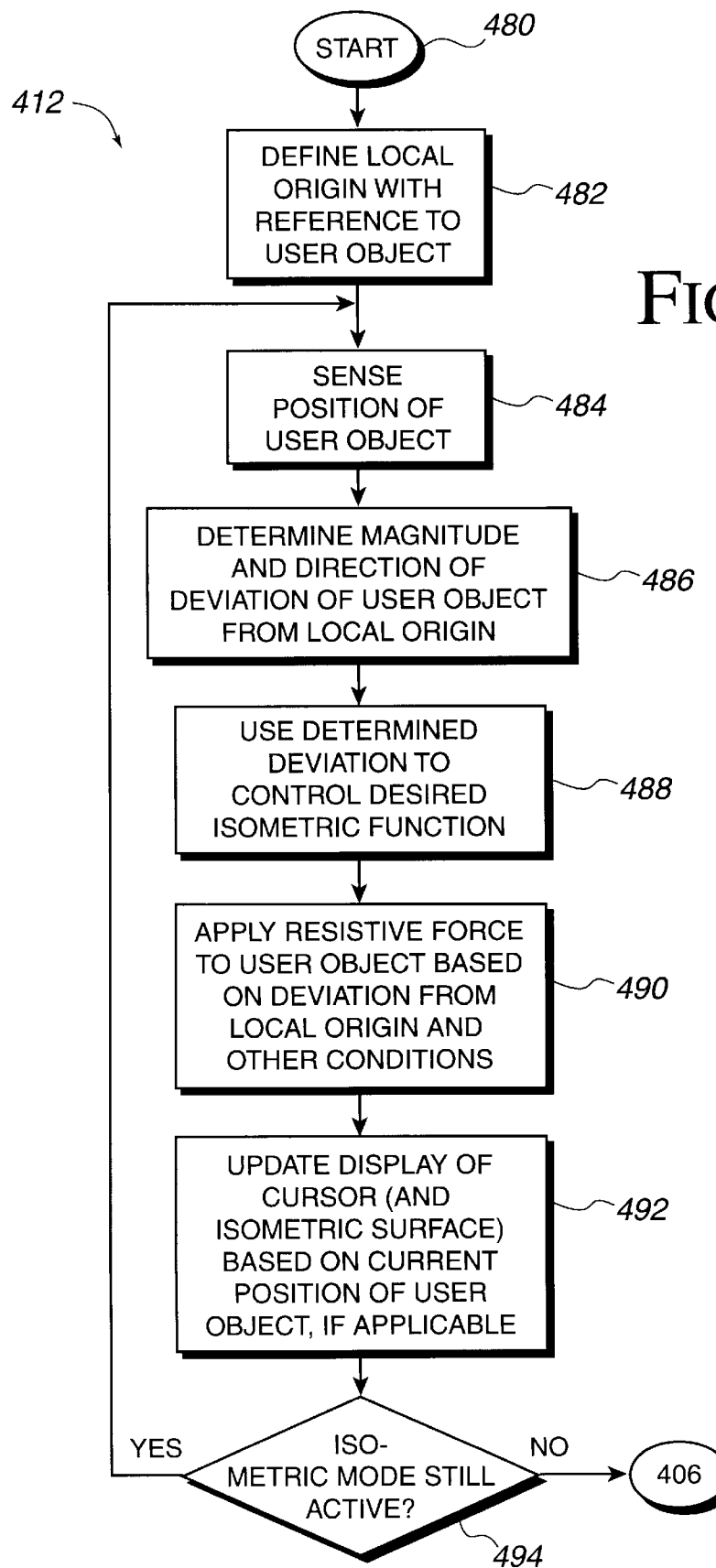
FIG. 15 is a flow diagram illustrating a step of FIG. 12 for implementing isometric mode of the interface system of the present invention.

FIG. 15 is a flow diagram illustrating step 412 of FIG. 12, in which the isometric mode of the force feedback interface is implemented. The process begins at 480, and in a step 482, a local origin is defined.

In the button mode control embodiment, a button or other input device controls when isometric mode is active. In the graphical object mode control embodiment, the interaction of graphical objects controls when isometric mode is active. In both embodiments, the local origin is defined as the current position of the user object when isometric mode is entered. Thus, in the device-controlled embodiment, the local origin is the position of the user object when the button is pressed. In the graphical object embodiment, the local origin is the position of the user object (and cursor, if applicable) when the cursor "contacts" the surface or other feature which activates isometric mode. For example, a local origin in FIG. 10 would be the same point as the tip T and indicates the position of the local origin when the cursor is moved against the surface 358. Preferably, the local origin is newly established each time isometric mode is entered from isotonic mode.

In a preferred embodiment, the local microprocessor 200 records and keeps track of the local origin, while the host computer 18 remains ignorant of the local origin. This allows the computational burden to be partially offloaded from the host computer to the processor 200. Alternatively, the host computer can record and keep track of the local origin in addition to or instead of the local processor 200.

In next step 484, the position of the user object is sensed, similarly to step 406 of FIG. 12. However, depending on the embodiment, either the host computer 18 or the local microprocessor 200 performs the reading of the sensors. In one preferred embodiment, the microprocessor 200 reads the sensors and may convert the sensor data to values which are more appropriate for the host computer 18 to manipulate with reference to the GUI, as described below.

In step 486, the process determines the magnitude and/or the direction of a deviation (displacement) of the current position of the user object 12 from the local origin defined in step 482. In some embodiments, both the magnitude and the direction of the deviation may be needed if the isometric input controls functions dependent on direction. For example, if the direction of scrolling of text in a window is being controlled in isometric mode, then the possible directions might be up (e.g., moving the puck 22 away from the user) and down (e.g., moving the puck 22 closer to the user). The direction would thus be read to determine whether the text should be scrolling up or down. In other embodiments, direction might not be necessary. For example, if a magnification zoom is implemented only in one direction (i.e., to magnify), then the direction of the deviation is not needed; only the magnitude of the zoom is required. In most graphical object embodiments, the direction is needed to determine if the cursor 306 is moving against a isometric-sensitive surface or other object, such as surface 358 in FIG. 10.

The deviation data (i.e., magnitude and direction) is preferably determined by the local microprocessor 200 and reported to the host computer 18, i.e., the local microprocessor keeps track of the local origin of step 482 to determine the deviation. In most embodiments, the host 18 typically has to acknowledge such deviation data as isometric data rather than isotonic data, e.g., the input data should be interpreted by the host as related to an "input force" rather than a position of the cursor. If the host 18 is kept ignorant of the status of the control mode, the deviation data can be identified as either isometric data or isotonic data by the use of flags or other control signals provided to the host from the local microprocessor, either within the packet of input data or as separate data. Alternatively, the host can keep track of control mode, allowing the local microprocessor 200 to report position data of the user object 12 directly to the host computer; the host would determine mode, local origin, and deviation data. In yet other embodiments, the host computer is handling the modes and/or forces directly without the use of a local microprocessor, so that the host automatically knows the current mode and how to apply deviation data.

In step 488, the deviation determined in step 486 is used to control one or more desired isometric functions. An "isometric function", as referred to herein, is a program function of an application program, operating system or GUI that has been associated with isometric input and can be commanded in isometric mode. For example, scrolling text in a window, panning a view on screen 20, zooming the view in or out on screen 20, "flipping" pages on screen 20, and other rate-control tasks are all functions readily controllable by isometric input. Other program functions can also be controlled in isometric mode, such as moving a cursor down a menu, providing particular input in a video game or CAD program for pitch, roll and yaw directions (e.g., to move a vehicle, gun, player, or object in those directions), initiate the execution of a program or function, or even translate controlled objects across a screen or within a 3-D virtual environment. Preferably, the isometric function is implemented by the host computer 18 within a running program or operating system.

The isometric functions are preferably controlled using the magnitude and/or the direction of the determined deviation. The magnitude (or distance) of the deviation indicates a degree or rate of desired control. For example, magnitude may often be associated with the speed or rate of display or execution of the function, such as the speed of text scrolling by in a window, the speed of a panning view, or the speed of a zoom-in function. Magnitude may also control whether certain functions are implemented or not; for example, a particular function might be implemented only when a predetermined minimum threshold magnitude has been input by the user.

Herein, magnitude is preferably used as an indication of input force from the user. The magnitude of deviation indicates a magnitude of input force which the user is exerting in opposition to an output restoring force generated by actuators 222 (as described in step 490). The greater the deviation, the greater the force or pressure that the user is applying to combat the output force. Thus, the magnitude of deviation is a good indication of amount of input force exerted by the user on the user object, analogous to measuring force from the user with pressure sensors in prior art isometric sensing devices. However, the deviation in the present invention is preferably measured by position sensors 220, which measure the position of the user object 12 in physical space, rather than the pressure or force that is sensed by prior art isometric sensing devices. One advantage of using such position sensors is that the same sensors can be used both for isotonic sensing and isometric sensing. In alternate embodiments, input force from the user can be directly measured by a force sensor such as a strain gauge in the present invention.

Since there is a perceived deviation of the user object in physical space, the isometric mode of the present invention might more accurately be termed an "elastic mode", since pure isometric controllers have no deviation in physical space. However, the term isometric is widely used for both pure isometric and elastic embodiments, and is used as such herein.

The direction of the deviation is also useful in implementing isometric functions. The direction is directly applicable to functions such as panning a view in screen 20, e.g., if the displacement is in the left direction, then the view is panned to the left. Similarly, text may be scrolled up and down (and left and right), and zooms may be in or out, as determined by a direction of the deviation. When controlling roll, yaw, or pitch of an object or viewpoint, the direction of the deviation can control the direction of rotational movement about a particular axis.

In the control many isometric functions, both magnitude and direction of the deviation can be used. For example, the magnitude controls the speed of scrolling text or the speed of zoom, while the direction controls the direction that the text scrolls or the direction of the zoom. Alternatively, only the magnitude can be used to control the function. For example, button #1 might control zoom-in isometric mode, so that the magnitude of the deviation controls the speed of the zoom, but the user object can be moved in any direction to zoom in the view. Button #2 might similarly control zoom-out isometric mode without regard to direction of the deviation. In yet other embodiments, only the direction is used to control the isometric function. For example, text might scroll by or a view might zoom in at a constant predetermined speed, regardless of the magnitude of the deviation. Direction is typically needed in the graphical object embodiments, since the isometric mode is often activated depending on the direction of the cursor (such as against surface 358).

One example of an isometric text scrolling function is shown in FIG. 10. Surface 358c is preferably used to control upward scrolling, and surface 358a or 358e is used to control downward scrolling. Other surfaces 358 of objects 356a and 356b can control scrolling in the indicated direction.

In step 490, the process applies a resistive force to the user object based on the deviations and/or direction from the local origin. The actuators 222 are preferably used to exert the force on the user object 12. Herein, "resistive force" refers to a force opposing motion of the user object by the user, and can be an active force or a passive force. In the preferred embodiment, as explained with respect to step 488, an active restoring force is used in the described embodiment to impart a feeling of resistance or obstruction to movement of the user object in isometric mode. This allows the user to feel as if the user object is "held" in place and allows the user to perceive that input force exerted on the user object in a particular direction is controlling the desired isometric function of the GUI or application program, analogously to traditional isometric controllers. Step 490 is described in greater detail with respect to FIG. 16.

In optional step 492, the display of cursor 306 (or other user-controlled graphical object) on display screen 20 or other display device is updated according to the position of the user object sensed in step 484, if applicable to the embodiment. Whether to apply step 492 and update the display in isometric mode or not depends on the programmer's or user's desired effect of the interaction between experienced forces and perceived visual images.

In one embodiment of method 412, as indicated by step 492, the display is updated in regular fashion in accordance with the deviation of the user object in a position control paradigm. That is, when the user moves the user object in isometric mode, any controlled graphical object such as cursor 306 is moved a distance on screen 20 corresponding to the user object, as if the user were in isotonic mode. Thus, the user perceives both physically and visually that the user object is moved in isometric mode. In the graphical mode control embodiments, this updated display can be implemented in a variety of ways. For example, cursor 306 is moved against surface 358a as shown in FIG. 10. As the cursor is displayed moving in the direction of surface 358a, the surface 358a can be moved with the cursor, as if the cursor is "pushing" the surface. Only the surface 358 might be moved, so that the cursor is "compressing" the object 356a to a smaller width. Alternatively, the entire object 356a might be moved with the cursor. In other embodiments, the surface 358a can remain in a fixed place on the screen, while the cursor moves "through" the surface 358 and object 356.

A visual display of the deviation may be useful to indicate to the user the magnitude of "force" (actually displacement) that is being input by the user in isometric mode. For example, a user will be able to see the deviation as a cursor is moved against surface 358a, thus indicating the magnitude of the input. In some cases, graphical information can be provided to assist the user in determining the magnitude of input force. For example, a graphical scale of lines, like a ruler, can be displayed on one side of a surface 358. When the cursor 306 is moved past surface 358 (which remains fixed), the cursor tip T can be viewed with reference to the scale of lines to precisely determine the input magnitude. Such a scale of lines might also be provided as bars of color, like a spectrum. Alternatively, just a portion of cursor 306 might be visually moved; for example, the tip of the cursor can remain fixed against a non-moving surface 358, while the remaining portions of the cursor move past the tip and stretch into the region past the surface 358, where the amount of stretch and/or thinness of the cursor during the stretch can indicate magnitude.

Figure 15A:
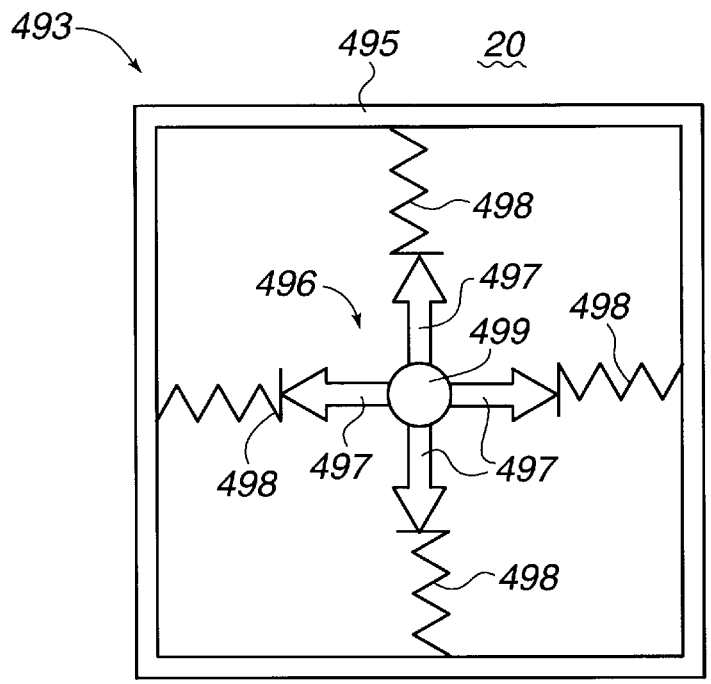
FIGS. 15a–c are diagrammatic illustrations of a visual display of input and output forces in an isometric mode.

The visual display of the deviation is most applicable to the graphical mode control embodiments as described above, but may also be applied to button mode control embodiments. FIG. 15a is a diagrammatic illustration of one example of a visual image of an isometric indicator 493 that can be displayed in isometric mode of the button mode control embodiment. For example, when isometric mode is entered by pressing a button or other device, the image 493 can be displayed centered at the location of the cursor 306 on display screen 20. Indicator 493 includes a fixed frame 495 which indicates the limit of magnitude or deviation allowed in isometric mode. Centered within frame 495 is a user object element 496 which indicates the current position of the user object in relation to frame 495. Center element 499 indicates the center location of the user object, while arrow elements 497 extend in four 90-degree directions from the center element (arrow elements 497 can be omitted in other embodiments). Springs 498 are provided between each arrow element 497 and frame 495 and visually indicate the amount of force being output by the actuators on the user object.

Figures 15B, 15C:
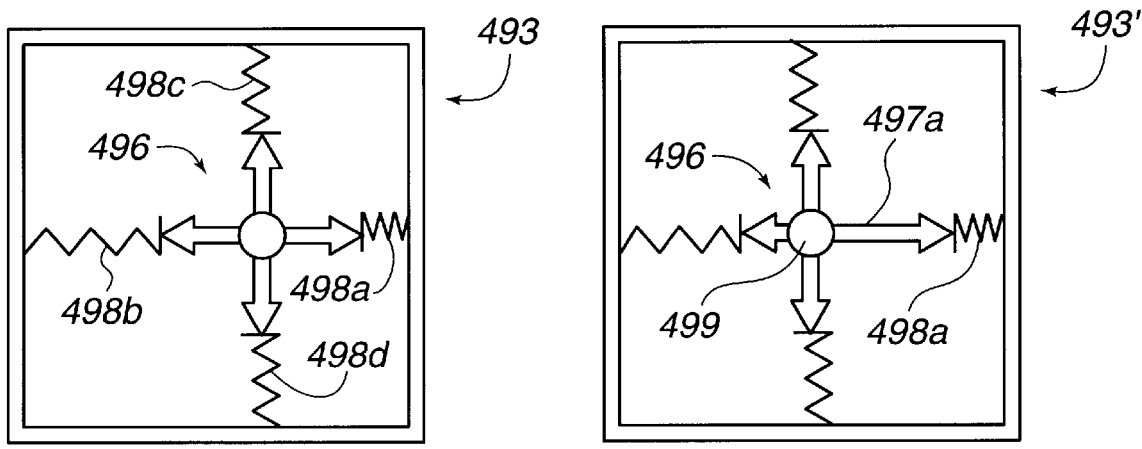

FIG. 15b indicates one embodiment of isometric indicator 493, in which the entire element 496 is moved on display screen 20 in accordance with movement of the user object 12. In FIG. 15b, the user object has been moved to the right, and element 496 has been moved a corresponding distance to the right. To indicate the amount of restoring spring forces felt by the user on user object 12, spring 498a is displayed compressed between the element 496 and frame 495. Spring 498b on the opposite side of element 496 is shown stretched out. Springs 498c and 498d can either be moved with element 496 or can be stretched/bent as if they were attached to frame 495. FIG. 15c indicates another embodiment, in which only arrows 497 are moved in accordance with user object 12 to compress an appropriate spring 497, while center element 499 remains fixed in place with respect to frame 495.

Referring back to FIG. 15, in the other contemplated embodiment of method 412, step 492 is omitted such that the display screen 20 (or other display) is not updated in accordance with the motion of the user object. This creates a dichotomy between what is felt and what is visually perceived by the user, i.e., a break in the mapping between the position of the user object and the position of the controlled graphical object, and is described in detail in co-pending patent application Ser. No. 08/664,086, which is hereby incorporated by reference herein. That application described the dichotomy with reference to an isotonic mode, and this dichotomy can be implemented in the isotonic mode of the present invention. This dichotomy may also be advantageously provided in isometric mode of the present invention. For example, when cursor 306 is moved against surface 358, isometric mode becomes active. The user then continues to move the user object 12 in the direction corresponding to the direction through surface 358. However, the visual display of the cursor is not updated, so that the cursor 306 is continued to be displayed fixed against a rigid, fixed surface 358, regardless of the magnitude of deviation. The user experiences movement of the user object, but the user does not experience this movement visually on screen 20.

This dichotomy between physical and visual experiences can be utilized to provide an illusion that the user is operating a pure isometric controller, i.e., that no movement of the user object in physical space has occurred. Since users are greatly influenced by what they perceive visually, they often do not notice small deviations of their hand or other physical member in physical space unless that small deviation has a corresponding visual component. The user has accepted a position control relationship when manipulating the user object; they expect that any motion of the user object will result in a corresponding visual motion. When that visual motion does not occur, they often assume that no physical motion has occurred as well, because humans are more visually sensitive than physically sensitive to small motions. The preferred button mode control embodiment likewise does not provide any visual update (or indicator) in accordance with the position of the user object.

In the preferred embodiment, step 492 is omitted in only some directions and/or degrees of freedom of user object 12, e.g., in which isometric mode is active. For example, if a cursor 306 is moved left into an isometric surface, then isometric mode is active and the step 492 can be omitted only for the left direction of movement into that surface. The other directions of movement, such as right, up, and down, are in isotonic mode, and can be updated on the display screen normally. In the button mode control embodiment, some directions or degrees of freedom can be updated on the screen while others are not updated. Isotonic mode can similarly have the visual-physical dichotomy in some directions or degrees of freedom, such as when the user moves cursor 306 against a virtual wall, where only the directions of movement along or away from the wall (not into the wall) are updated on the screen.

Since the user may still wish to have a visual indication of the magnitude of their input "force" in isometric mode, other graphical indications can be provided. For example, an indicator in a separate area of the display screen 20 can display a number value or bar graph indicative of the magnitude of input force or deviation. Or, colors can be similarly provided, e.g., violet indicates a low magnitude and red indicates the maximum magnitude. Alternatively, auditory information can be provided, such as the pitch of a tone to indicate magnitude. These magnitude indicators can also be provided in non-dichotomy embodiments that update the display in step 492.

The use of local microprocessor 200 in the present invention is ideally suited to the latter dichotomy embodiment to reduce the computational burden on the host computer 18. If no local microprocessor 200 is used, then the host computer 18 directly keeps track of positions of the user object and the cursor and must determine when to break the mapping between user object and cursor in isometric mode. However, local microprocessor 200 can be used to handle some of these tasks by "clipping" position data to the host such that the dichotomy is invisible to the host. For example, when the cursor 306 is moved against an isometric-sensitive object, the host can provide a simple command to the microprocessor 200, such as $X_{13}$WALL (to provide a restoring force in the x-direction). The local microprocessor then implements the restoring force and determines that isometric mode is active. As the user object is moved by the user in a direction corresponding to moving into the object, the local processor receives the sensor data indicating this movement in step 484. However, since the local processor knows that isometric mode is active, the local processor "clips" this data, i.e., does not report this sensor data to the host. From the host computer's point of view, no movement of the user object has been detected, so the cursor 306 should not be moved on the screen. The host computer does not have to keep track of a visual-physical dichotomy, since it simply does not receive user object movement data when the dichotomy is in operation.

In step 494, the process checks whether isometric mode is still active. Isometric mode would not still be active if the user activates or selects the mode switching device or process that is implemented in a particular embodiment. For example, the user might discontinue pressing a mode button or click a mode toggle button. Or, the user might move cursor 306 away from isometric surface 358, etc. If isometric mode is still active, the process returns to step 484 to sense the current position of the user object.

It should be noted that steps 488, 490, and 492 can each be performed independently of each other, since each step only requires the deviation data of step 486 to be performed. Thus, steps 488, 490 and 492 can be performed in any desired order, or, preferably, substantially simultaneously.

Figure 16:
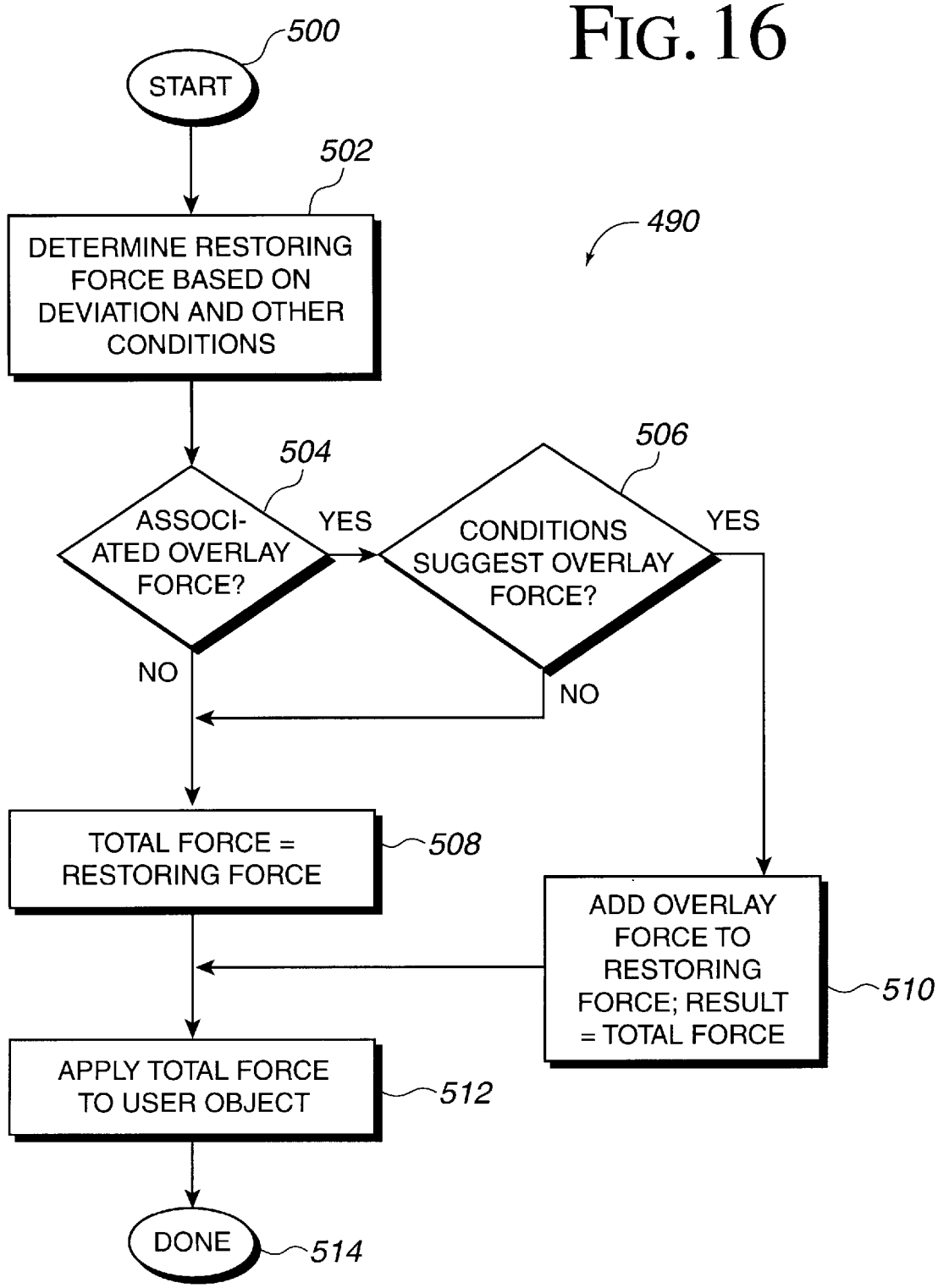
FIG. 16 is a flow diagram illustrating a step of FIG. 15 for applying a force to the user object in isometric mode.
Figure 16A:
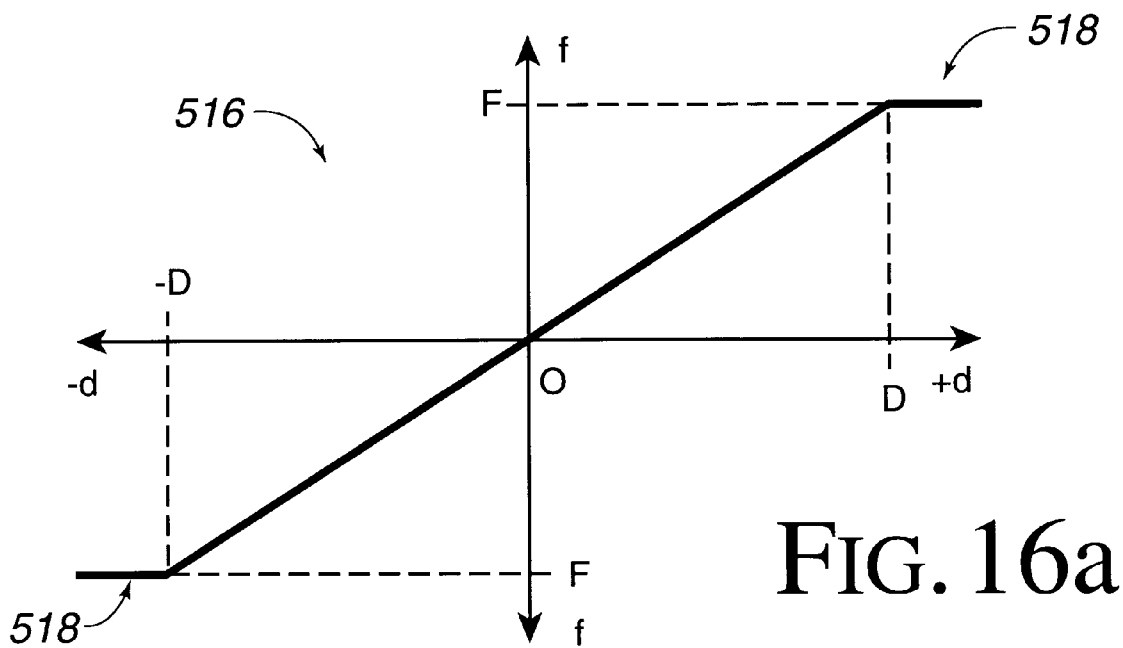
FIG. 16a is a diagram of a restoring force profile.

FIG. 16 is a flow diagram illustrating step 490 of FIG. 15, in which a resistive output force is applied to the user object 12. The process begins at 500, and in step 502, a restoring force is determined based on the deviation found in step 486 and any other applicable conditions. In the described embodiment, a restoring force is applied to the user object. A restoring force is a linear force vs. displacement relationship 516 and is shown in FIG. 16a. The restoring force increases in magnitude the further the object is moved from the local origin O, and is applied in a direction opposing the deviation of the user object from the local origin. A restoring force can be described as a "spring return", since it feels to the user as if a strong spring resists displacement of the user object. The restoring force provides a return sensation that forces or "restores" the user object to the local origin O. In the described example, the restoring force can be modeled using Hooke's Law, where resistance force F is proportional to the displacement or deviation d, such that:

$$F=k*d \tag{1}$$

where d is the deviation along an axis or degree of freedom (−d indicates an opposite direction to +d) and k is a spring constant defining the magnitude of force. In other embodiments, a spring restoring force can be modeled with an exponential stiffness or other relationship rather than the linear stiffness of Equation (1). Also, as shown in FIG. 16a, a saturation region 518 can be provided, where the magnitude of force generally remains constant when the user object is moved past a particular distance D. Positive and/or negative saturation regions can be defined for each degree of freedom. In some embodiments, the saturation force magnitude is can be limited to a predetermined percentage of the maximum possible output force in a the selected degree of freedom, so that overlay forces can be overlaid on top of the restoring force sensation (or, impulse shaping can perform this limiting function, as described in co-pending application Ser. No. 08/747,841 filed Nov. 13, 1996 by Rosenberg et al. and incorporated by reference herein).

Figure 16B:
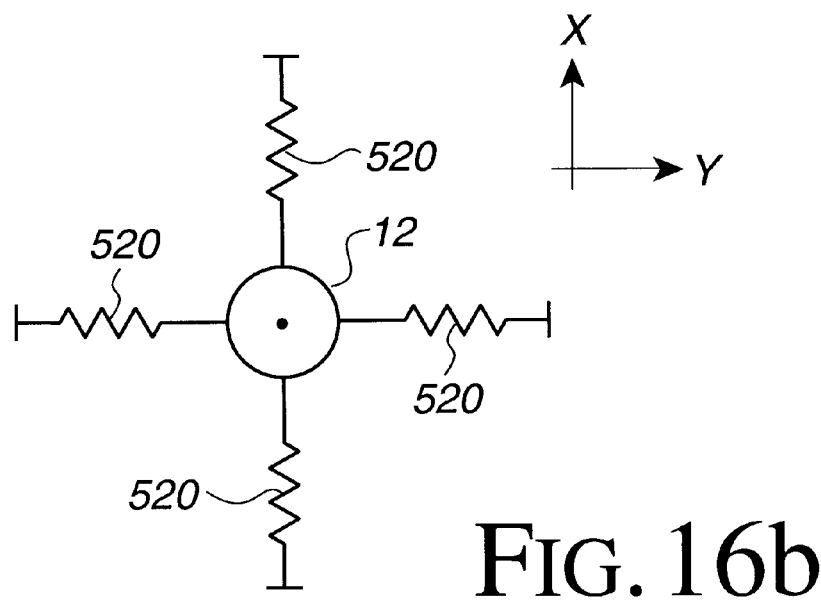
FIG. 16b is a schematic diagram of forces applied to the user object in isometric mode.

For example, FIG. 16b is a schematic diagram illustrating the forces on user object 12 in the button mode control (cursor-less) embodiment described above. Once the mode button is pressed and held down, isometric mode is active. The user object 12 then is provided with a local origin O and a four-way restoring force, indicated by the spring schematics 520. Thus, as long as the button is held by the user and isometric mode is active, the user object will be forced toward the origin position O by simulated springs 520. In other embodiments, isometric mode can be toggled by a button click, so that the button need not be held to maintain isometric mode. Also, different numbers of springs 520 can be simulated; for example, restoring forces might only be applied in the up and down directions. In the graphical object embodiment, typically one spring 520 is provided perpendicular to the surface 358 into which the cursor 306 is moved. The diagram of FIG. 16b assumes a user object having 2 degrees of freedom; the diagram can be, for example, a "cube" of springs in 3 degree of freedom embodiment, a line of springs in a 1 degree of freedom embodiment, etc.

Other characteristics or conditions can also affect the magnitude and/or direction of the restoring force. For example, the magnitude of the restoring force F can be changed by altering the spring constant k. For example, a different k can be used in each two available isometric modes. If isometric mode #1 is active from a press of button #1 on puck 22, a large k can be used to calculate F, thus providing the user with a large restoring force. A large restoring force opposes the user's motion more strongly in less distance d, and thus provides a coarse degree of control over an isometric function such as the speed of scrolling text. In contrast, if an isometric mode #2 is active from button #2 on the puck 22, a smaller k can be used, thus providing a smaller restoring force and a finer degree of control over an isometric function.

In the graphical mode control embodiments, k can be varied for different graphical objects or surfaces engaged by the cursor. For example, a surface 358 of one graphical object might be associated with a large k and coarse isometric input, and a surface 358 of a different object might be associated with a smaller k and fine isometric input. Alternatively, a graphical object or button associated with an isometric function such as scrolling text might have one k, while a graphical object or button associated with a different isometric function such as panning or zooming the view on screen 20 might have a different k. In other embodiments, k might be varied depending on a different characteristic or condition. For example, k can be proportional to the size of a controlled document (e.g., in bytes), so that a large document may be associated with a higher k and allow the user to easily control a higher speed of scrolling text. Likewise, a smaller-sized document may be associated with a smaller k and allow the user to more finely control the speed of scrolling. The detail or zoom level in a viewscreen might also determine a panning k; e.g., if a view displayed on the screen is a large zoom-out, showing little detail, then the panning rate can be made more coarse using a larger k. If the view is more detailed with a close zoom-in, the panning rate can be made more fine using a small k.

In other embodiments, different relationships or formulas can be used to determine the magnitude of the restoring force (or another type of force instead of a restoring force, if desired). For example, a damping force might be used instead of or in addition to a spring force for different types of objects, isometric functions, or modes. A friction force might be added to the restoring force of equation (1) for further effect, and/or an inertia force.

The direction of the deviation, as mentioned above in step 486, may also be used to provide different magnitudes of restoring forces. For example, k can be made different in different directions, e.g., +k can be different than −k in a degree of freedom such that it is much harder to push puck 22 forward than to pull it back. The direction of the deviation can also determine if the restoring force is to be applied or not. For example, in the second graphical object embodiment as shown in FIG. 10, the restoring force is only applied when the direction of the deviation is a direction toward the surface 358. If the deviation direction is away from the surface 358, then no restoring force is applied, since isometric mode has not been utilized by moving the cursor into the "isometric surface." In some button embodiments, the direction of the deviation might not affect whether the restoring force is applied or not. Also, in an alternate embodiment, the direction of the deviation can affect the magnitude of the restoring force. For example, if the deviation direction is approximately perpendicular to a surface 358 in FIG. 10 as shown by arrow 496, the maximum restoring force based on equation (1) can be applied. However, if the deviation direction is angularly incident on surface 358, then a fraction of the magnitude F of the restoring force calculated by equation (1) might be applied.

After the restoring force is determined in step 502, step 504 is implemented, in which the process checks whether one or more overlay forces are associated with the determined restoring force. Overlay forces, also known as "effects", are forces applied to the user object in addition to the restoring force and may be used to provide information to the user or provide some other effect. Overlay forces may include such force sensations as jolts, vibrations, wobbles, etc.

For example, a graphical surface 358 may provide a restoring force to control the scrolling of a text document, as described above. The restoring force associated with the scrolling is a background "condition" and can also include an overlay jolt "effect" when particular types of information scrolls by in the window. For example, when a page break 518 (see FIG. 10) in the document 352 scrolls by, a jolt can be overlaid on the restoring force to indicate this page break to the user through haptic means. The faster the document scrolls by, the faster are the jolts applied to the user object. Similarly, overlay jolts might be provided at the limits of movement, such as when a view is fully zoomed. Thus, the user can more easily track the progress of the isometric function through the use of these force cues combined with the user's visual sense. Also, the magnitude of such jolts can be varied for different situations. For example, when the end of the document is reached in a scrolling window, a larger magnitude jolt than a page break jolt can be output to indicate the end of the document. In other embodiments, a vibration overlay can be used to represent the velocity of scroll, pan, or zoom function. For example, the faster the document is scrolling by, the higher the frequency of the vibration. Other vibrations or jolts might be position related, i.e., when the cursor moves over a line or object, a jolt, texture, etc., is output. Some functions, objects, etc. may have two or more overlay forces associated with them, such as both jolts and vibration.

One or more overlay forces can be associated with a particular restoring force in isometric mode. For example, an overlay force might only be associated with the restoring force for a text scrolling function, and not, for example, a panning or zooming function. Likewise, a zooming function might have a texture or vibration overlay force associated with its restoring force.

If the determined restoring force has an associated overlay force, then the process continues to step 506, where the process checks whether the current conditions suggest the application of an overlay force. In the example above of providing jolts when a page break scrolls by, this step would check if a page break was currently in a position to dictate applying a jolt. For example, if a jolt is to be applied when page break 518 reaches the top (or center) of the window 350 in which the document is scrolling, then this step checks whether a page break is at the top of the window. Or, a texture or jolt force might be applied when the cursor 306 moves over lines of gradation displayed near surface 358 to indicate to the user the degree of deviation of the user object. Some overlays, such as a vibration proportional to speed of scrolling, might always be applied in isometric mode and not be specific to a condition.

If the current conditions do not suggest applying an overlay force, then the process continues to step 508, where a TOTAL FORCE is set equal to the restoring force determined in step 502. The process then continues to step 512, described below. If the conditions do suggest applying an overlay force, then in step 510 the process adds the applicable overlay forces to the restoring force determined in step 502, where the resulting force is equal to TOTAL FORCE. The process then continues to step 512.

In step 512, TOTAL FORCE is output to the user object 12 using actuators 222 in the appropriate directions and having the appropriate magnitude. The user experiences the restoring force as a resistance to motion, combined with any overlay forces included in the output force. The process is then complete at 514.

While this invention has been described in terms of several preferred embodiments, it is contemplated that alterations, permutations and equivalents thereof will become apparent to those skilled in the art upon a reading of the specification and study of the drawings. For example, many different types of forces can be applied to the user object 12 in accordance with different graphical objects or regions appearing on the computer's display screen. Also, many varieties of graphical objects in a GUI can be associated with particular isotonic and isometric forces, and many other types of computer and graphical environments can make use of the isotonic-isometric functionality disclosed herein. In addition, many types of user objects and mechanisms can be provided to transmit the forces to the user, such as a joystick, a mouse, a trackball, a stylus, or other objects. Furthermore, certain terminology has been used for the purposes of descriptive clarity, and not to limit the present invention. It is therefore intended that the following appended claims include all such alterations, permutations, and equivalents as fall within the true spirit and scope of the present invention.

What is claimed is:

1. A method for providing an indexing feature in a force feedback interface device coupled to a host computer system displaying a graphical environment, said method comprising:

sensing a position of a user-manipulated physical object in a planar workspace, wherein said position is relayed to said host computer system, said host computer system displaying a user-controlled graphical object on a display screen at a position derived from said position of said user-manipulated physical object in said planar workspace;

applying forces from at least one actuator of said force feedback interface device to said physical object;

receiving an indexing indication from said user that an indexing mode is active, wherein said user-controlled graphical object is displayed at a fixed position on said display screen by said host computer, regardless of said position of said physical object, while said indexing mode is active; and ceasing said application of said forces to said physical object while said indexing mode is active;

whereby said user is able to redefine an offset between said position of said physical object and said position of said user-controlled graphical object when said indexing mode is active.

2. A method as recited in claim 1 wherein said application of said forces to said physical object is ceased when a safety switch of said force feedback device is opened by said user.

3. A method as recited in claim 2 wherein said safety switch is closed when said user applies weight to said physical object when manipulating said physical object, and wherein said safety switch is open when said user removes said weight from said physical object.

4. A method as recited in claim 3 wherein said indexing indication is provided by opening said safety switch, thereby allowing said application of forces to cease while said user redefines said offset between said physical object and said user-controlled graphical object.

5. A method as recited in claim 1 wherein said position of said physical object is reported to said host computer system to update said position of said graphical object when said indexing mode is inactive, and wherein said position of said physical object is not reported to said host computer when said indexing mode is active.

6. A method as recited in claim 5 wherein said indexing indication from said user is a change of a state of a switch or button coupled to said physical object.

7. A method as recited in claim 1 wherein said indexing indication results from said user causing said physical object to move in a direction approximately perpendicular to said planar workspace, thereby causing a switch of said force feedback interface device to change state.

8. A method as recited in claim 1 wherein said indexing indication results from said user pressing a button coupled to said physical object.

9. A force feedback interface device for providing input from a force feedback interface device to a host computer system displaying a graphical environment, said force feedback interface device comprising:

a user manipulable physical object grasped by a user and moveable in a planar workspace, wherein a position of said physical object in said planar workspace determines a corresponding position of a user-controlled graphical object in said graphical environment;

an actuator coupled to said physical object operative to apply a force in said planar workspace to said physical object;

a sensor operative to a sense said position of said physical object in said planar workspace;

an indexing selector operative to activate an indexing mode of said physical object, wherein said user-controlled graphical object is not updated in said graphical environment according to said position of said physical object when said indexing mode is active; and a safety switch coupled to said actuator and operative to prevent said actuator from outputting said force on said user manipulable object when said safety switch is opened by said user, wherein said safety switch allows said user to additionally activate said indexing mode.

10. A force feedback interface device as recited in claim 9 wherein said user manipulable physical object is a puck, and wherein said safety switch is closed by the weight of said user's fingers or hand resting on said puck when manipulating said user manipulable physical object.

11. A force feedback interface device as recited in claim 9 wherein said physical object is a mouse, and wherein said safety switch is closed by the weight of said user's fingers or hand resting on said mouse when manipulating said physical object.

12. A force feedback interface device as recited in claim 9 wherein said position of said physical object is reported to said host computer system to update said position of said graphical object when said indexing mode is inactive, and wherein said position of said physical object is not reported to said host computer when said indexing mode is active.

13. A force feedback interface device as recited in claim 12 further comprising a microprocessor local to said force feedback interface device and separate from said host computer system, wherein said microprocessor reports said position of said physical object when said indexing mode is inactive.

14. A force feedback interface device as recited in claim 9 wherein said indexing selector includes a button operative to activate said indexing mode when pressed by said user.

15. A force feedback interface device as recited in claim 9 wherein said indexing selector includes a pressure sensor operative to sense a pressure of a user's hand or finger on said user manipulatable physical object.

16. A force feedback interface device as recited in claim 9 wherein said indexing selector is integrated with said safety switch in a single input device.

17. A force feedback interface device as recited in claim 9 wherein said indexing selector is a button separate from said safety switch.

18. A force feedback interface device as recited in claim 9 wherein said indexing selector includes a microprocessor separate from said host computer, said microprocessor detecting said state of said safety switch to determine when to activate said indexing mode.

19. A force feedback interface device for providing input from a force feedback interface device to a host computer displaying a graphical environment, said force feedback interface device comprising:

a user manipulable physical object grasped by a user and moveable in at least one degree of freedom, wherein a position of said physical object in said degree of freedom influences position of a user-controlled graphical object in said graphical environment;

an actuator coupled to said physical object operative to apply a force in said degree of freedom to said physical object;

a sensor operative to a sense said position of said physical object in said degree of freedom; and a microprocessor separate from said host computer and coupled to said actuator and to said sensor, said microprocessor outputting control signals to said actuator and receiving said position from said sensor, said microprocessor operative to activate and deactivate an indexing mode of said force feedback interface device, wherein said microprocessor reports said position of said physical object to said host computer when said indexing mode is inactive, and wherein said microprocessor does not report said position of said physical object to said host computer when said indexing mode is active.

20. A force feedback interface device as recited in claim 19 wherein said user-controlled graphical object is not updated in said graphical environment according to said position of said physical object when said position is not reported to said host computer.

21. A force feedback interface device as recited in claim 19 further comprising a safety switch coupled to said actuator and operative to prevent said actuator from outputting said force on said user manipulable object when said safety switch is opened by said user, wherein said safety switch allows said user to additionally activate said indexing mode.

22. A force feedback interface device as recited in claim 19 wherein said user manipulable physical object is a mouse and wherein said degree of freedom is provided in a planar workspace of said mouse.

23. A force feedback interface device as recited in claim 19 wherein said microprocessor activates said indexing mode when the activation of a switch or button coupled to said physical object by said user is detected by said microprocessor.

24. A force feedback interface device as recited in claim 23 wherein said activation of said switch coupled to said physical object includes causing said physical object to move in a direction away from a planar surface located under said physical object, thereby causing said switch of said physical object to change state.

25. A force feedback interface device for providing input from a force feedback interface device to a host computer displaying a graphical environment, said force feedback interface device comprising:
- a user manipulable physical object grasped by a user and moveable in at least one degree of freedom, wherein a position of said physical object in said degree of freedom determines a corresponding position of a user-controlled graphical object in said graphical environment;
- an actuator coupled to said physical object operative to apply a force in said degree of freedom to said physical object;
- a sensor operative to sense said position of said physical object in said degree of freedom; and
- a mode selector separate from said host computer and operative to select an indexing mode of said force feedback interface device, wherein said mode selector causes a signal to be output to said host computer, said signal indicating to said host computer whether said indexing mode is active, wherein when said indexing mode is active, said host computer does not update said position of said user-controlled graphical object in said graphical environment based on said position of said physical object in said degree of freedom, and wherein said force application by said actuator is disabled when said said indexing mode is active.

26. A force feedback interface device as recited in claim 25 wherein said mode selector includes a microprocessor separate from said host computer.

27. A force feedback interface device as recited in claim 25 wherein said mode selector includes a switch having a state changeable by said user to select said indexing mode.

28. A force feedback interface device as recited in claim 25 wherein said user manipulable physical object is a mouse and wherein said degree of freedom is provided in a planar workspace of said mouse.

* * * * *